(12) United States Patent
Doi

(10) Patent No.: US 9,440,871 B2
(45) Date of Patent: Sep. 13, 2016

(54) TREATMENT AGENT FOR SALT-CONTAINING ORGANIC WASTE LIQUID, SALT CONCENTRATION-REDUCING AGENT, TREATMENT METHOD FOR SALT-CONTAINING ORGANIC WASTE LIQUID, AND ENTRAPMENT IMMOBILIZATION CARRIER

(71) Applicant: Microbial Chemistry Research Foundation, Tokyo (JP)

(72) Inventor: Hiroyasu Doi, Tokyo (JP)

(73) Assignee: MICROBIAL CHEMISTRY RESEARCH FOUNDATION, Tokyo (JP)

( * ) Notice: Subject to any disclaimer, the term of this patent is extended or adjusted under 35 U.S.C. 154(b) by 162 days.

(21) Appl. No.: 13/942,847

(22) Filed: Jul. 16, 2013

(65) Prior Publication Data

US 2013/0299422 A1    Nov. 14, 2013

Related U.S. Application Data

(63) Continuation of application No. PCT/JP2012/050711, filed on Jan. 16, 2012.

(30) Foreign Application Priority Data

Jan. 20, 2011    (JP) .................................. 2011-010233

(51) Int. Cl.
*C02F 3/32* (2006.01)
*C02F 1/52* (2006.01)
(Continued)

(52) U.S. Cl.
CPC ............... *C02F 3/34* (2013.01); *C02F 1/5245* (2013.01); *B01D 21/01* (2013.01); *B01D 21/262* (2013.01);
(Continued)

(58) Field of Classification Search
CPC ........ C02F 3/34; C02F 1/5245; C02F 3/327; C02F 2103/32; C02F 2209/005; C02F 2209/02; C02F 2209/06; C02F 2209/08; B01D 21/01; B01D 21/262
USPC ............... 210/602, 615, 616, 631, 150, 151; 252/180
See application file for complete search history.

(56) References Cited

U.S. PATENT DOCUMENTS 6,593,128 B1    7/2003  Kiy et al.
7,875,180 B2 *  1/2011  Fry et al. ...................... 210/614
(Continued)

FOREIGN PATENT DOCUMENTS

GB    2353792 A    3/2001
JP    07-155791    6/1995
(Continued)

OTHER PUBLICATIONS

Doi et al., "Removal of CODMn from Jellyfish Wastewater by Bioreactor Using Microorganisms", Bulletin of the Society of Sea Water Science, 2007, pp. 342-351, vol. 61—issue No. 6, Japan.
(Continued)

*Primary Examiner* — Fred Prince
(74) *Attorney, Agent, or Firm* — Pergament Gilman & Cepeda LLP; Milagros A. Cepeda; Edward D. Pergament

(57) ABSTRACT

A treatment agent for salt-containing organic waste liquid, the treatment agent including: Scuticociliatida, wherein the treatment agent treats salt-containing organic waste liquid; and a treatment method for salt-containing organic waste liquid, the treatment method including: bringing Scuticociliatida and salt-containing organic waste liquid into contact with each other to treat the salt-containing organic waste liquid.

14 Claims, 24 Drawing Sheets

(51) Int. Cl.
*C02F 3/34* (2006.01)
*B01D 21/01* (2006.01)
*B01D 21/26* (2006.01)
*C02F 103/32* (2006.01)

(52) U.S. Cl.
CPC ............ *C02F 3/327* (2013.01); *C02F 2103/32* (2013.01); *C02F 2209/005* (2013.01); *C02F 2209/02* (2013.01); *C02F 2209/06* (2013.01); *C02F 2209/08* (2013.01)

(56) References Cited

U.S. PATENT DOCUMENTS

| 2005/0003382 | A1 | 1/2005 | Doi et al. | |
| 2011/0127215 | A1* | 6/2011 | Gencer et al. | 210/617 |

FOREIGN PATENT DOCUMENTS

| JP | 3028611 | U | 6/1996 |
| JP | 09-23785 | H | 1/1997 |
| JP | 10-000493 | | 1/1998 |
| JP | 10-137783 | | 5/1998 |
| JP | 11-179327 | | 7/1999 |
| JP | 11-244833 | | 9/1999 |
| JP | 2000-005738 | A | 1/2000 |
| JP | 2001-095564 | A | 4/2001 |
| JP | 2001-145875 | A | 5/2001 |
| JP | 2001-198566 | A | 7/2001 |
| JP | 2001-300505 | A | 10/2001 |
| JP | 2002-136952 | A | 5/2002 |
| JP | 2003-053303 | A | 2/2003 |
| JP | 2003-145196 | A | 5/2003 |
| JP | 2005-034152 | A | 2/2005 |
| JP | 2005-262105 | A | 9/2005 |
| JP | 2007-000863 | A | 1/2007 |

OTHER PUBLICATIONS

Doi et al., "Decomposition of Jellyfish by Bacterial Enzyme", Bulletin of the Society of Sea Water Science, 2006, pp. 426-433, vol. 60—issue No. 6, Japan.
International Search Report, dated Apr. 24, 2012, for corresponding International Patent Application No. PCT/JP2012/050711.
Extended European Search Report, dated Sep. 25, 2015, for corresponding European Application No. 12 73 6817.
Holubar, et al., "Effects of Bacterivorous Ciliated Protozoans on degradation efficiency of Petrochemical activated Sludge process", Water Research, 2000, pp. 2051 to 2059, vol. 34—issue No. 7, Elsevier Science Ltd, Great Britain.
Decamp and Warren, "Bacterivory in Ciliates isolated from constructed wetlands (Reed Beds) used for wasterwater treatment", Water Research, 1998, pp. 1989 to 1996, vol. 32—issue No. 7, Elsevier Science Ltd, Great Britain.
Puigagut, et al., "Comparison of microfauna communities in full scale subsurface flow constructed wetlands used as secondary and tertiary treatment", Water Research, 2007, pp. 1645 to 1652, vol. 41, Elsevier Ltd.

* cited by examiner

TREATMENT AGENT FOR SALT-CONTAINING ORGANIC WASTE LIQUID, SALT CONCENTRATION-REDUCING AGENT, TREATMENT METHOD FOR SALT-CONTAINING ORGANIC WASTE LIQUID, AND ENTRAPMENT IMMOBILIZATION CARRIER

CROSS-REFERENCE TO RELATED APPLICATION

This is a continuation application of PCT/JP2012/050711, filed on Jan. 16, 2012.

BACKGROUND OF THE INVENTION

1. Field of the Invention

The present invention relates to a treatment agent for salt-containing organic waste liquid, a salt concentration-reducing agent, a treatment method for salt-containing organic waste liquid, and an entrapment immobilization carrier.

2. Description of the Related Art

From the viewpoint of environmental protection, there has recently been an increased demand for a waste liquid treatment method capable of reducing a COD (chemical oxygen demand) value which is one index of water quality.

Methods for treating waste liquid include: biological treatment methods such as an activated sludge method and a rotating disc method; and physicochemical treatment methods such as an aggregation method, a precipitation method, an activated carbon filtration method, and a membrane filtration method. Among them, biological treatment methods, especially an activated sludge method, have recently been popular as a method for treating domestic waste liquid and industrial waste liquid.

In such biological treatment methods, waste liquid is cleaned by a mixed microorganism system such as bacteria, protozoan organisms and metazoan organisms.

In one method proposed as the biological treatment methods, organic contaminated waste liquid is brought into contact with activated sludge rich in metazoan microorganisms belonging to the *Philodina* sp. (see Japanese Patent Application Laid-Open (JP-A) No. 07-155791).

However, metazoan organisms generally have a problem that they grow more slowly than protozoan organisms do and have difficulty in rapidly treating waste liquid. Also, in use of an activated sludge method, there are problems such as occurrence of a so-called bulking phenomenon that involves degradation in aggregation or precipitation due to abnormal swelling of sludge, and generation of a large amount of extra sludge. Furthermore, the organisms belonging to the *Philodina* sp. are freshwater organisms belonging to Rotatoria, and when used to treat salt-containing organic waste liquid, the organisms belonging to the *Philodina* sp. are killed due to salt stress in activated sludge where they are a dominant species. As such, when salt is contained in waste liquid to be treated by the biological treatment methods, organisms used in the methods are plasmolyzed due to the difference in osmotic pressure and are killed, which raises a problem of considerably reducing their capability of treating waste liquid.

The salt-containing organic waste liquid is, for example, waste liquid of marine waste, and jellyfish has been problematic as the marine waste.

Jellyfish floating in, for example, seawater occurs in immense numbers mainly in warmer months, causing various damages. In particular, jellyfish has inflicted enormous damage on the coastal fishing industry such as set net fishery. In addition, seaside plant facilities such as power plants or steel plants require large amounts of cooling water and employ seawater as the cooling water. These facilities are therefore provided with water intakes for seawater. However, there have arisen problems associated with damage caused by jellyfish that clogs these water intakes to restrict or stop the taking of water so that the operation of the facility is hindered. Once such jellyfish has been landed, it becomes industrial waste which cannot be released or disposed of in ocean as is. Thus, various attempts have been made to develop various methods for disposing of the landed jellyfish (see, for example, JP-A Nos. 2001-300505, 2000-5738, 11-244833, 2003-145196, 2001-198566, 2003-53303, 11-179327, 2001-95564 and 2002-136952, and Doi Hiroyasu, Oka Tatuszo, Yoshiaki Nonomura, Bulletin of the Society of Sea Water Science, Japan, 2007, Vol. 61, No. 6, pp. 342-351).

Nevertheless, the salt contained in salt-containing organic waste liquid such as waste liquid of decomposed jellyfish prevents the salt-containing organic waste liquid from being efficiently decomposed and disposed of. Biological treatments using, for example, enzymes and/or microorganisms can perform decomposition disposal treatment more efficiently than in the mechanical disposal treatment, but involves problems due to the presence of salt that sufficient enzymatic activity cannot be obtained and microorganisms are killed.

Therefore, conventionally, waste liquid of decomposed jellyfish has been diluted with freshwater and then subjected to decomposition disposal treatment with, for example, activated sludge. In this case, a large amount of freshwater has to be used for dilution, which is not efficient.

In proposed alternative methods, a carrier on which yeast and/or bacteria have been immobilized is used to treat salt-containing organic waste liquid (see JP-A No. 2007-000863 and Doi Hiroyasu, Mikio Takeda, Oka Tatuszo, Yoshiaki Nonomura, Bulletin of the Society of Sea Water Science, Japan, 2006, Vol. 60, No. 6, pp. 426-433).

Even with this method, however, it takes 2 days to 3 days to reduce the COD value of waste liquid of enzymatically decomposed jellyfish by about 80%, which is problematic in view of long treatment time required.

Therefore, at present, demand has arisen for provision of a treatment agent for salt-containing organic waste liquid, a salt concentration-reducing agent, a treatment method for salt-containing organic waste liquid, and an entrapment immobilization carrier that are highly safe and can simply, efficiently and inexpensively treat organic waste liquid containing salt for a short time at low energy without the need of a special apparatus.

SUMMARY OF THE INVENTION

The present invention aims to solve the above existing problems and attain the following object. That is, an object of the present invention is to provide a treatment agent for salt-containing organic waste liquid, a salt concentration-reducing agent, a treatment method for salt-containing organic waste liquid, and an entrapment immobilization carrier that are highly safe and can simply, efficiently and inexpensively treat salt-containing organic waste liquid for a short time at low energy without the need of a special apparatus.

The present inventors conducted extensive studies to solve the above existing problems and have obtained the following finding. That is, they have found that a treatment agent for salt-containing organic waste liquid containing at least Scuticociliatida is highly safe and can simply, efficiently and inexpensively treat salt-containing organic waste liquid for a short time at low energy without the need of a special apparatus. The present invention has been accomplished on the basis of this finding.

The present invention is based on the above finding obtained by the present inventors. A means for solving the above problems is a treatment agent for salt-containing organic waste liquid containing at least Scuticociliatida.

The present invention can provide a treatment agent for salt-containing organic waste liquid, a salt concentration-reducing agent, a treatment method for salt-containing organic waste liquid, and an entrapment immobilization carrier that are highly safe and can simply, efficiently and inexpensively treat salt-containing organic waste liquid for a short time at low energy without the need of a special apparatus. These can solve the above existing problems and achieve the above object.

Figure 1:
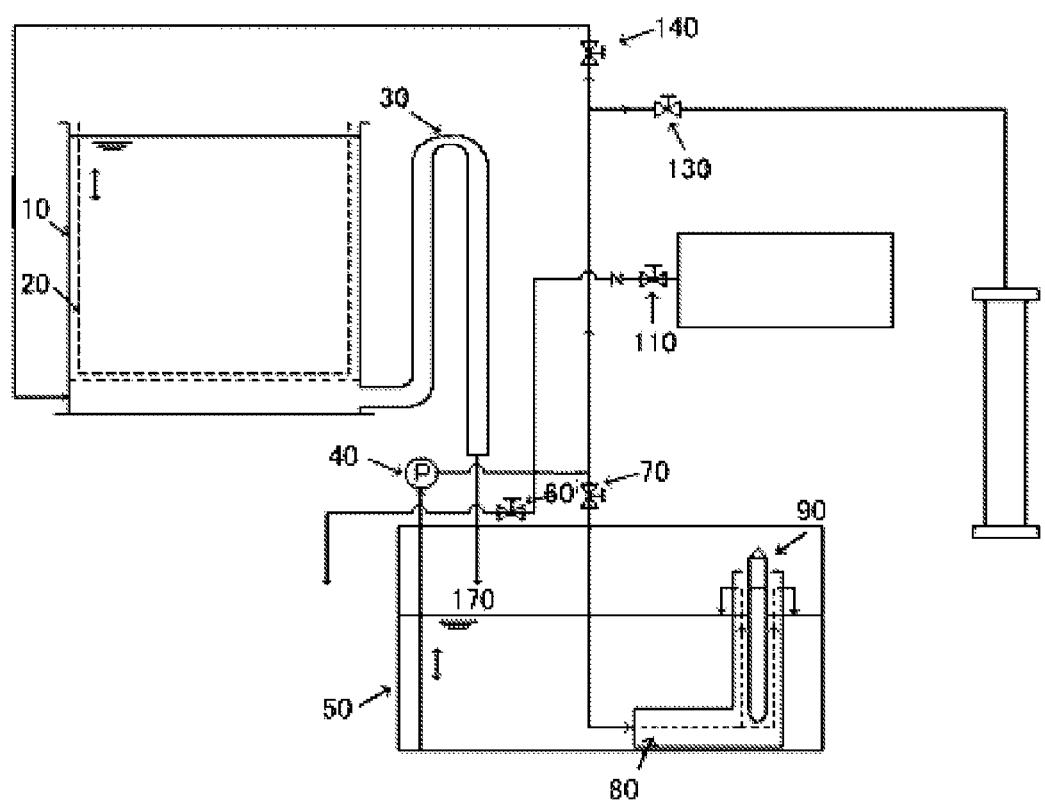
FIG. 1 is a schematic diagram illustrating one example of an apparatus used in a treatment method for marine waste.

DETAILED DESCRIPTION OF THE INVENTION (Treatment Agent for Salt-Containing Organic Waste Liquid)

A treatment agent for salt-containing organic waste liquid of the present invention contains at least Scuticociliatida; and, if necessary, further contains other ingredients such as a coagulant.

<Scuticociliatida>

Ciliophora is generally small- to middle-size protozoan organisms, which have cilia or ciliary complexes for at least a certain period of its life cycle. The cilia are localized on a part of the body surface or cover the entirety thereof. The ciliary complexes are cell organelles differentiated to perform special functions, and include membranelles, undulating membranes and cirri. Their forms and distribution are frequently used as important standards for classification. Ciliophora has tail cilia, and undulating membranes are noticeable in oral ciliature. One contractile vacuole is observed in the rear end of the body. The nucleus is differentiated into the large nucleus and the small nucleus. Asexual reproduction is performed by binary fission or budding. Sexual reproduction is performed by conjugation, autogamy or cytogamy. Upon formation of the oral region, scutica is formed (which is a unique cell organelle observed in Ciliophora and is a complex of motility base appearing temporally and significantly in the process of binary fission). About 7,500 kinds of Ciliophora have been reported, and many marine species and brackish water species have been known ("Observation and Experimental Method for Protozoan Organisms", editorial supervisor: Yoshinobu Sigenaka, KYORITSU SHUPPAN CO., LTD., the 1st edition published on 1988/6/1, p. 248; "Hausmann, Introduction of Protozoology", publisher: Etsuro Morita, KOUGAKU SHUPPAN CO., LTD., the 1st edition published on 1989 Jun. 20, pp. 70-88; "Revised Edition of Illustrated Handbook of Freshwater Planktons in Japan Made Easy", the revised 2nd edition published on 2009 Oct. 19, pp. 66-97; "The Ciliated Protozoa 2nd edition.", Corliss J. O., 1979, Pergamon press, Oxford, pp. 455; "Picture Book of Protozoa", editorial supervisor: Shozo Inoki, KODANSHA LTD., 1981; "Classification and Emersion Environment of Microorganisms (Summary)-1. Ciliophora-.water and waste", Takahiro Ouchiyama, 1999, Vol. 41(11), see pp. 46-56).

The Scuticociliatida has not only the above-described characteristics of Ciliophora but also the following characteristics. Specifically, the Scuticociliatida has a shape of pear, has a length of 20 μm to 45 μm, has 8 to 12 cilia arranged in a row along the major axis, and has 1 cilium at its tail end (see "Picture Book of Protozoa", 1981, editorial supervisor: Shozo Inoki, KODANSHA SCIENTIFIC LTD. and JP-A No. 2008-044862).

The Scuticociliatida contained in the treatment agent for salt-containing organic waste liquid has identical characteristics to the above Scuticociliatida. That is, it has a shape of pear, has a length of 20 μm to 25 μm, has 8 to 12 cilia arranged in a row along the major axis, and has 1 cilium at its tail end. Furthermore, the oral region is developed and provided with, for example, an undulating membrane, a membranelle and a peniculus (i.e., a belt-like arrangement of short cilia). The oral ciliature can be clearly distinguished from the body ciliature (Oligohymenophora). The structure inside the oral region is not usually noticeable, the body ciliature is regularly formed, and the cilia are uniformly formed on the body surface (Hymenostomata).

At present, there has still not been an established taxonomic view of classification of Ciliophora even among specialists. For example, as for *Paramecium* sp., belonging to Ciliophora similar to Scuticociliatida and known the most, its taxonomic position at the level of class has been varying depending on the times. Specifically, during the time when it was observed with an optical microscope, *Paramecium* sp. was classified into the class Ciliata. During the time when it was observed with an optical microscope and silver staining, *Paramecium* sp. was classified into the class Oligohymenophorea. During the time when it was observed with silver staining and an electron microscope, *Paramecium* sp. was classified into the class Nassophorea. During the time when it was classified based on gene analysis, *Paramecium* sp. was classified into the class Oligohymenophorea which is the same as the class during the time when it was observed with silver staining and an electron microscope (see Denis H. Lynn., 2008, The Ciliated Protozoa).

Classification of Ciliophora is mainly performed based on identification by observation of its morphology even today, and gene analysis is not common that has widely been used for claissification of bacteria, filamentous fungi and yeasts.

The amount of the Scuticociliatida in the treatment agent for salt-containing organic waste liquid is not particularly limited and can be selected appropriately according to the purpose. Also, the treatment agent for salt-containing organic waste liquid may be the Scuticociliatida itself.

The Scuticociliatida contained in the treatment agent for salt-containing organic waste liquid is preferably in motile form from the viewpoints of being high in activity of treating salt-containing organic waste liquid. However, since the Scuticociliatida in the treatment agent for salt-containing organic waste liquid can be changed from cyst form (i.e., a dormant state) to motile form by controlling conditions for treating salt-containing organic waste liquid such as the salt concentration of the treated liquid, the pH of the treated liquid, the treatment temperature, the presence or absence of pre-culturing, and the exposure conditions, the state of the Scuticociliatida contained in the treatment agent for salt-containing organic waste liquid is not particularly limited and can be selected appropriately according to the purpose.

<<Method for Obtaining the Scuticociliatida>>

The method for obtaining the Scuticociliatida is not particularly limited and can be selected appropriately according to the purpose. The Scuticociliatida may be one sampled and separated from the natural world, or may be one already separated (e.g., a commercially available product or assigned product).

—Sampling—

The method for sampling the Scuticociliatida from the natural world is not particularly limited and can be selected appropriately according to the purpose. Examples thereof include a method for sampling Scuticociliatida from aquatic animals or plants (e.g., marine animals, marine plants, freshwater animals and freshwater plants), seawater, freshwater or sludge, where Scuticociliatida is inhabited.

The sludge is not particularly limited and can be selected appropriately according to the purpose. The sludge is preferably sea-bottom sludge, more preferably sea-bottom sludge sampled from a layer close to the sea-bottom surface.

The layer close to the sea-bottom surface is, for example, a layer far from the sea-bottom surface by about 5 cm to about 20 cm, preferably about 5 cm to about 10 cm.

—Separation—

The method for separating the Scuticociliatida is not particularly limited and can be selected appropriately according to the purpose.

For example, the Scuticociliatida can be separated from the aquatic animals or plants as follows. Specifically, an appropriately selected solution is added to a certain amount of the aquatic animals or plants, to thereby prepare a suspension of the Scuticociliatida. Then, the aquatic animals or plants are removed and the suspension is centrifuged to separate the precipitates as the Scuticociliatida.

When the Scuticociliatida is separated from the seawater, freshwater or sludge, a capillary tube can be used to aspirate and separate the Scuticociliatida under a stereo microscope.

The number of the separated Scuticociliatida can be measured with, for example, a hemocytometer.

—Identification—

As described above, the Scuticociliatida is a microorganism that is not clearly classified at present and has many unclear properties. Thus, the method for indentifying the Scuticociliatida is a method for observing its morphology.

The method for observing the morphology of the Scuticociliatida is not particularly limited and can be selected appropriately according to the purpose. Examples thereof include: a method in which the separated Scuticociliatida is observed under an optical microscope without any previous treatment; a method in which the separated Scuticociliatida is subjected to staining such as silver staining before observation; a method in which the separated Scuticociliatida is observed under an electron microscope; and a method by gene analysis.

—Growth—

A medium used for the growth of the Scuticociliatida is not particularly limited and can be selected appropriately from known media. Examples of the medium include media containing: sugars such as glucose; nitrogen sources such as ammonium sulfate and ammonium chloride; inorganic salts such as potassium chloride and sodium phosphate; and grains such as unthreshed wheat, barley, rice, Japanese barnyard millet and foxtail millet. The Scuticociliatida may be made to grow in, for example, gelatin-containing artificial seawater, or may be made to grow directly the below-described salt-containing organic waste liquid. These may be used alone or in combination of two or more thereof.

The concentration of each ingredient in the medium is not particularly limited and can be selected appropriately according to the purpose.

The temperature at which the Scuticociliatida is made to grow is not particularly limited and can be selected appropriately according to the purpose. The temperature is preferably 0° C. to 45° C., more preferably 4° C. to 40° C., particularly preferably 27° C. to 37° C. When the temperature is lower than 0° C., the Scuticociliatida may not grow sufficiently. When the temperature is higher than 45° C., the Scuticociliatida may be died.

The period for which the Scuticociliatida is made to grow is not particularly limited and can be selected appropriately according to the purpose. The period is preferably 4 hours to 48 hours, more preferably 6 hours to 24 hours, particularly preferably 6 hours to 10 hours. When the period is shorter than 4 hours, the waste liquid treatment by the Scuticociliatida may be insufficient. When the period is longer than 48 hours, the Scuticociliatida may turn into a cyst or may be autolyzed.

The Scuticociliatida may be made to grow by shake culture or static culture. Also, the Scuticociliatida may be made to grow by aerobic culture or anaerobic culture. Aerobic culture is preferable since the Scuticociliatida can be made to grow efficiently. Particularly preferably, the Scuticociliatida is cultured under aeration (stirring with feeding air or oxygen).

An air flow rate in the aeration is not particularly limited and can be selected appropriately according to the purpose. The air flow rate is preferably 1 L/minute to 4 L/minute, more preferably 2 L/minute to 4 L/minute, particularly preferably 3 L/minute to 4 L/minute, relative to 1 L of the salt-containing organic waste liquid. When the air flow rate is less than 1 L/minute, the Scuticociliatida may not grow or may not turn into a motile form from a cyst form (i.e., a dormant state).

Note that, when the Scuticociliatida is cultured in the salt-containing organic waste liquid for 24 hours under aeration at 30° C. and an air flow rate of 3 L/minute, the Scuticociliatida can be grown to reach about $1.9 \times 10^4$ individuals/mL to about $3.0 \times 10^4$ individuals/mL.

The salt concentration of the medium is not particularly limited and can be selected appropriately according to the purpose. The salt concentration thereof as measured with an electroconductivity meter is preferably lower than 80, more preferably 10 to 70, particularly preferably 50 to 70. When the salt concentration of the medium is 80 or more, the Scuticociliatida turns into a cyst or dies, so that it cannot grow. As a result, it may be impossible to sufficiently obtain the effects of the treatment of the salt-containing organic waste liquid.

Examples of the electroconductivity meter include a seawater concentration meter (PAL-06S, manufactured by Atago Co., Ltd.).

The pH of the medium is not particularly limited and can be selected appropriately according to the purpose, but is preferably 4 to 11, more preferably 4.2 to 10.5, particularly preferably 4.5 to 10.

The amount of the Scuticociliatida in the treatment agent for salt-containing organic waste liquid is not particularly limited and can be selected appropriately according to the purpose. Also, the treatment agent for salt-containing organic waste liquid may be the Scuticociliatida itself.

<Other Ingredients>

The other ingredients in the treatment agent for salt-containing organic waste liquid are not particularly limited and can be selected appropriately according to the purpose. Examples thereof include water, seawater, sludge, inorganic salts, and various medium ingredients.

The amount of the other ingredients in the treatment agent for salt-containing organic waste liquid is not particularly limited and can be selected appropriately according to the purpose.

—Coagulant—

The treatment agent for salt-containing organic waste liquid preferably contains a coagulant.

The coagulant may be a commercially available product. Specific examples thereof include: inorganic coagulants such as polyaluminum chloride (PAC), 3-fold diluted polysilica iron coagulant, aluminum sulfate, slaked lime, calcined lime, iron sulfate, ferric ammonium sulfate, magnesium oxide, iron oxide, active silicic acid, sodium aluminate, iron chloride and polyiron sulfate; organic acid salts such as sodium alginate; linear aliphatic hydrocarbons such as polyamine; polypeptides such as polyglutamic acid; anionic polymer coagulants such as sodium acrylate; nonionic polymer coagulants such as acrylamide; cationic polymer coagulants such as dimethylaminoethyl methacrylate; and amphoteric polymer coagulants. These coagulants may be used alone or in combination of two or more thereof.

The dosage form of the treatment agent for salt-containing organic waste liquid is not particularly limited and can be selected appropriately according to the purpose. The dosage form thereof may be liquid or solid.

The treatment agent for salt-containing organic waste liquid of the present invention may be used alone, or in combination with another treatment agent as long as the effects of the present invention are not impaired.

<Salt-Containing Organic Waste Liquid>

The salt-containing organic waste liquid is not particularly limited and can be selected appropriately according to the purpose as long as the salt-containing organic waste liquid is waste liquid containing a salt and containing organic substances in such an amount that it cannot be disposed of as is. The salt-containing organic waste liquid may further contain ingredients such as persistent proteins, lipids, free amino acids, polysaccharides and inorganic substances. In other words, these ingredients contain a large amount of COD (chemical oxygen demand) ingredients, BOD (biochemical oxygen demand) ingredients, phosphorus ingredients, nitrogen ingredients, and suspended solids.

Examples of the salt-containing organic waste liquid include sewage, human waste, waste liquid from food factories, waste liquid from waterfront plant facilities such as power plants and ironworks, other industrial waste liquid, marine waste, and waste liquid from saltworks and water-treatment facilities. These can be used alone or in combination of two or more thereof.

The state of the organic substances in the salt-containing organic waste liquid is preferably a state of being easily decomposed by the Scuticociliatida. For example, when the organic substances are proteins, the proteins are preferably in a state where they are cleaved to amino acids by, for example, a protease.

Note that, in the present invention, although the objects treated by the treatment agent for salt-containing organic waste liquid are waste liquid containing salt, since the Scuticociliatida can grow in freshwater, the treatment agent for salt-containing organic waste liquid of the present invention can be used also for waste liquid containing no salt.

The salt concentration of the salt-containing organic waste liquid is not particularly limited and can be selected appropriately according to the purpose. The salt concentration thereof is preferably about a salt concentration of seawater, more preferably 5 or higher but lower than 80 as measured with an electroconductivity meter, still more preferably 10 to 70 as measured with an electroconductivity meter, particularly preferably 50 to 70 as measured with an electroconductivity meter. When the salt concentration of the salt-containing organic waste liquid is lower than 5, the treatment of waste liquid by the Scuticociliatida may be insufficient. When the salt concentration thereof is higher than 80, the Scuticociliatida turns into a cyst or dies, so that it cannot grow. As a result, it may be impossible to sufficiently obtain the effects of the treatment of the salt-containing organic waste liquid.

Note that, salt in seawater is defined as follows. Specifically, the salt in seawater is a total amount in gram (g) of solids dissolved in 1 kg of seawater, which is called absolute salinity (see Marine Environmental Microbiology, edited by Yusaburo Ishida and Haruo Sugita, KOUSEISHA KOU-SEIKAKU CO., LTD., 2005, pp. 48-49). In the present invention, for the sake of convenience, the salt in seawater is shown by practical salinity unit (psu) given by measuring a salt concentration with an electroconductivity meter. For example, when the salt concentration (practical salinity unit) measured with an electroconductivity meter of 5 is converted to the concentration of sodium chloride solution (absolute salinity), the absolute salinity is 0.5% by mass.

The marine waste is not particularly limited and can be selected appropriately according to the purpose. Examples thereof include jellyfish, fishery products, crustaceans, lysates thereof, processed residues, broth and wash liquid. These may be used alone or in combination of two or more thereof.

<<Lysate of Marine Waste>>

The lysate of the marine waste contains organic substances ranging from amino acid to organic molecules such as peptides. In terms of both technique and cost, it is quite difficult to further decompose organic molecules that are decomposed to such levels. However, the treatment agent for salt-containing organic waste liquid of the present invention can effectively decompose such organic substances contained in the lysate of the marine waste, which is advantageous.

The lysate of the marine waste is not particularly limited and can be selected appropriately according to the purpose. Examples of the lysate thereof include liquid where marine waste is decomposed with heat, liquid where marine waste is naturally decomposed, liquid where marine waste is autolyzed, and liquid where marine waste is decomposed with an enzyme. These may be used alone or in combination of two or more thereof.

Among them, the lysate of the marine waste is preferably liquid where marine waste is decomposed with an enzyme, from the viewpoints of high treatment efficiency, simplification of treatment, and high safety.

More preferably, the lysate of the marine waste is a lysate obtained by decomposing marine waste using an apparatus developed by the present inventor (see JP-A No. 2005-262105).

——Enzyme——

The enzyme that decomposes the marine waste is not particularly limited and can be selected appropriately according to the purpose. Examples thereof include a prionase enzyme and a thrombolytic enzyme. Note that, since these enzymes can decompose persistent proteins, they can be applied to other organic substances than the marine waste; i.e., various organic substances to be treated by the treatment method for salt-containing organic waste liquid of the present invention. Among the thrombolytic enzymes, nattokinase is particularly advantageousin that it can also decompose toxins of jellyfish to enhance safety of waste liquid.

——Prionase Enzyme——

The prionase enzyme is an enzyme developed by the present inventors (see JP-A No. 2005-34152) and suitably produced by 99-GP-2D-5 strain (FERM P-19336), which is Actinomycetes belonging to the genus *Streptomyces*, or a derivative strain thereof.

——Thrombolytic enzyme——

The thrombolytic enzyme is not particularly limited and can be selected appropriately according to the purpose. The thrombolytic enzyme is preferably a thrombolytic enzyme produced by *Bacillus subtilis* 104-1-3-1 strain (Accession No: NITE P-680), which is a microorganism belonging to the genus *Bacillus*, or a derivative strain thereof in terms of excellent decomposition efficiency of the marine waste.

Properties of the 104-1-3-1 strain or derivative strain thereof are as follows.

——Scientific Property——

The 104-1-3-1 strain is a gram-positive *bacillus* that exhibits a chain of cells and forms spores. The swelling of the bacterial spores is not observed. This strain is in a colony form that has a diameter of 2.0 mm to 3.0 mm, a color tone of cream color, a round shape, a lens-like elevation, a wavy margin, a rough surface shape, an opaque phenotype, and a butyrous texture and is found positive for catalase reaction and negative for oxidase reaction. This strain oxidizes L-arabinose, ribose, and glucose, etc., and does not oxidize erythritol, D-arabinose, and L-xylose, etc., in the API test. The strain does not grow under anaerobic conditions and grows in a medium containing 50% by mass or 10% by mass of sodium chloride. The strain hydrolyzes casein, but does not hydrolyze starch. As a result of search based on the nucleotide sequence of the 16S rRNA gene, the 104-1-3-1 strain was considered homologous to *Bacillus subtilis* and, however, differed in some physiological properties from general *Bacillus subtilis*. From these results, the 104-1-3-1 strain was presumed to be a novel strain of *Bacillus subtilis*.

———Taxonomic Position———

*Bacillus* sp.

———Culture Condition———

(1) Medium name: Nutrient agar
(2) Composition of medium: 0.5% by mass of peptone, 0.3% by mass of beef extracts, and 1.5% by mass of agar
(3) Medium pH: 7.0
(4) Condition for sterilization of medium: 121° C., 20 minutes
(5) Culture temperature: 30° C.
(6) Culture period: 7 days
(7) Oxygen requirement: aerobic ———Storage condition———

(1) Freezing condition: L-drying
(2) Protectant: 20% by volume of glycerol
(3) Recovery rate after freezing: 100%

———Deposition———

The 104-1-3-1 strain was deposited under Accession No: NITE P-680 with National Institute of Technology and Evaluation on Nov. 28, 2008.

———Derivative Strain———

The derivative strain of the 104-1-3-1 strain is not particularly limited as long as this derivative strain can produce a thrombolytic enzyme decomposing marine waste. The derivative strain can be selected appropriately according to the purpose. Examples thereof include microorganisms belonging to the genus *Bacillus*, which have properties of the 104-1-3-1 strain altered by mutation (spontaneous or induced), transformation, conjugation, gene recombination, ultraviolet rays, radiation, chemicals, or the like.

———Culture———

The microorganism belonging to the genus *Bacillus* can grow in a medium known in the art even under culture conditions other than those described above. This growth may be achieved by liquid culture or solid culture.

The composition of the medium is not particularly limited as long as this medium permits growth of the microorganism belonging to the genus *Bacillus* so as to produce the thrombolytic enzyme. The medium can be selected appropriately according to the purpose. Examples thereof include media containing medium components known in the art, such as carbon sources, nitrogen sources, and inorganic salts. These medium components may be used alone or in combination of two or more thereof.

The nitrogen sources are not particularly limited and can be selected appropriately according to the purpose. Examples thereof include commercially available soybean flour, peptone, yeast extracts, meat extracts, corn steep liquor, and ammonium sulfate.

The carbon sources are not particularly limited and can be selected appropriately according to the purpose. Examples thereof include hydrocarbons and fats, such as tomato paste, glycerin, starch, glucose, galactose, and dextrin.

The inorganic salts are not particularly limited and can be selected appropriately according to the purpose. Examples thereof include common salt, and calcium carbonate.

The medium may also be supplemented, if necessary, with a trace amount of a metal salt or a component known in the art to enhance the amount of the thrombolytic enzyme produced.

These materials are not limited as long as the materials can be utilized by the microorganism belonging to the genus *Bacillus* and help the microorganism produce the thrombolytic enzyme. Any of culture materials known in the art can be used.

The culture method is not particularly limited and can be selected appropriately according to, for example, the type of the microorganism belonging to the genus *Bacillus*, from among methods known in the art. Examples thereof include various methods such as batch culture, semicontinuous culture, and continuous culture methods. Methods known in the art for promoting the growth of the microorganism belonging to the genus *Bacillus* may be used in combination for the culture.

Conditions for culture using the liquid medium are not particularly limited as long as the microorganism belonging to the genus *Bacillus* can produce the thrombolytic enzyme without being killed under these conditions. The conditions can be selected appropriately according to the purpose.

The culture temperature is not particularly limited and can be selected appropriately according to the purpose. The culture temperature is preferably 10° C. to 45° C., more preferably 27° C. to 40° C., particularly preferably 27° C. to 30° C. This particularly preferable range is advantageous because the thrombolytic enzyme is produced in large amounts.

The culture time is not particularly limited and can be selected appropriately according to the purpose. The culture time is preferably 12 hours to 120 hours, more preferably 48 hours to 96 hours.

The culture may be aerobic culture or anaerobic culture. The aerobic culture is preferable because the microorganism belonging to the genus *Bacillus* efficiently grows. Also, shake culture or static culture may be performed.

The method for confirming the successful growth of the microorganism belonging to the genus *Bacillus* in the liquid medium is not particularly limited and can be selected appropriately according to the purpose. Examples thereof include: a method which involves confirming, by visual observation or absorbance measurement, change in the turbidity of a liquid medium for enrichment culture or change in color caused by an added reagent; a method which involves confirming the growth of the microorganism by gel permeation chromatography measurement; and a method which involves confirming the growth of the microorganism by the measurement of a chemical oxygen demand.

The state of the thrombolytic enzyme is not particularly limited and can be selected appropriately according to the purpose. Examples thereof include a culture liquid containing the microorganism belonging to the genus *Bacillus*, a culture supernatant after removal of the bacterial cells of the microorganism belonging to the genus *Bacillus*, a purified thrombolytic enzyme, a fermentation product obtained by fermenting a mixture of the microorganism belonging to the genus *Bacillus* and a proteinaceous raw material, and a dried thrombolytic enzyme.

The thrombolytic enzyme-producing microorganism belonging to the genus *Bacillus* may be used for decomposition in a state immobilized on a carrier.

The carrier is not particularly limited, and its shape, structure, size, material, and the like can be selected appropriately according to the purpose, etc.

Examples of the shape of the carrier include spherical, granular, massive (pellet), sheeted, columnar, net-like, and capsule shapes. These shapes may be used alone or in combination of two or more thereof.

The structure of the carrier may be constituted of one member alone or may be constituted of two or more members. The carrier may have a single-layer structure or a multilayer structure. These structures may be used alone or in combination of two or more thereof.

The microstructure of the carrier is not particularly limited as long as, for example, this structure allows the microorganism belonging to the genus Bacillus to come into contact with the marine waste. For example, a porous or net-like structure is preferable. The carrier having this structure can increase the area of the contact between the microorganism belonging to the genus Bacillus immobilized on the carrier and the waste and is thus advantageous in terms of excellent decomposition efficiency of the marine waste.

The size of the carrier can be selected appropriately according to the size, etc. of a container or the like housing the carrier. A plurality of the carriers may have an equal (constant) size or may differ in size from each other.

Preferable examples of the material of the carrier include polysaccharides, proteins, synthetic polymers, and inorganic substances. These materials may be used alone or in combination of two or more thereof.

Examples of the polysaccharides include cellulose, dextran, agarose, sodium alginate, agar, and carrageenan. Among them, agar is preferable because the agar can retain the microorganism belonging to the genus *Bacillus* at a high concentration while it is excellently permeable to components in waste liquid and is easily granulated and easily treated or disposed of, with little toxicity.

The proteins are preferably, for example, inactivated proteins. Examples thereof particularly include gelatin, albumin, and collagen.

Examples of the synthetic polymers include acrylamide, polyvinyl alcohol, polyethylene glycol, sodium polyacrylate, polyvinyl chloride, polystyrene, polyurethane, and photo-curable resins.

Examples of the inorganic substances include silica gel, activated carbon, sand, zeolite, porous glass, anthracite, zeolite, expanded-clay, and liquid slag. Among them, the porous material silica gel or activated carbon is preferable.

The method for immobilizing the microorganism belonging to the genus *Bacillus* onto the carrier is not particularly limited. The method can be performed according to a method known in the art and can be selected appropriately according to the purpose. Preferable examples thereof include a deposition method (carrier binding method), a cross-linking method, and an entrapment method. These methods may be adopted alone or may be used in combination of two or more thereof.

The deposition method (carrier binding method) involves immobilizing the microorganism belonging to the genus *Bacillus* onto the surface of the carrier insoluble in water. The cross-linking method involves cross-linking the microorganism belonging to the genus *Bacillus* to a reagent having two or more functional groups. The entrapment method involves entrapping the microorganism belonging to the genus *Bacillus* in the lattice of a gel (lattice type) or coating the microorganism with a polymer film (microcapsule).

When the microorganism belonging to the genus *Bacillus* is immobilized onto the carrier, the position at the microorganism belonging to the genus *Bacillus* is immobilized is not particularly limited and can be selected appropriately according to the purpose, etc. Since the microorganism belonging to the genus *Bacillus* is aerobic, the microorganism is preferably immobilized on or near the surface of the carrier.

The production of a carrier gel as the carrier for immobilization using agar will be described below.

For the carrier, the agar is preferably granulated at a concentration of, for example, 3% by mass that reduces the leakage of the immobilized microorganism belonging to the genus *Bacillus* or the invasion thereof into the inside of the carrier and renders the carrier excellently durable, long-life, and highly stable.

The agar is mixed with water to adjust the agar concentration to 3% by mass. The agar is dissolved therein with stirring at 60° C. or higher. For the stable immobilization of the heat-labile microorganisms belonging to the genus *Bacillus*, the resulting agar is preferably mixed with the microorganisms belonging to the genus *Bacillus* at the lowest possible temperature (e.g., 55° C. or lower) without being solidified.

The microorganisms belonging to the genus *Bacillus* used can be collected, for example, by operation such as centrifugation.

The agar mixed with the microorganisms belonging to the genus *Bacillus* is solidified by cooling to room temperature, then placed in a molding container, and cut into the desired shape to thereby obtain a carrier with the immobilized microorganisms belonging to the genus *Bacillus*.

The carrier with the immobilized microorganisms belonging to the genus *Bacillus* (hereinafter, also referred to as a "*Bacillus* microorganisms-immobilized carrier") is preferably housed in a container for contact with the marine waste. The carrier thus housed in the container is preferable because the carrier can be contacted with the marine waste efficiently and in a controlled manner.

The container is not particularly limited, and its shape, structure, size, material, and the like can be selected appropriately according to the purpose.

Preferable examples of the shape of the container include a cylindrical shape.

The material of the container is preferably a salt-tolerant material. More preferably, the container is made of glass, a resin, stainless, or the like. Among them, a material that renders the inside of the container visible is preferable.

The filling rate of the *Bacillus* microorganisms-immobilized carrier in the container is not particularly limited and can be selected appropriately according to the purpose. The filling rate may be 100% or may be less than 100%.

A plurality of the containers may be connected in parallel or in series according to the load of marine waste.

———Decomposition Method of Marine Waste by Thrombolytic Enzyme———

The marine waste can be decomposed by its contact with the thrombolytic enzyme.

When the culture liquid containing the microorganism belonging to the genus *Bacillus* is directly used as the thrombolytic enzyme, the decomposition may involve causing the microorganism belonging to the genus *Bacillus* to produce the thrombolytic enzyme in a liquid mixture of the microorganism belonging to the genus *Bacillus*, the marine waste, and preferably a medium suitable for culture of the microorganism belonging to the genus *Bacillus*, while decomposing the marine waste. This method is preferable in terms of convenient operation and the treatment of the marine waste achieved in a short time.

The amount of the marine waste used is not particularly limited and can be selected appropriately according to the purity of the thrombolytic enzyme, the titer of the thrombolytic enzyme, etc.

The amount of the thrombolytic enzyme used is not particularly limited and can be selected appropriately according to the purity of the thrombolytic enzyme, the titer of the enzyme, etc. The amount is preferably 0.1% by volume or more, more preferably 1% by volume or more, further preferably 1% by volume to 2% by volume, with respect to the volume of the marine waste. The thrombolytic enzyme used in an amount less than 0.1% by volume may require a longer time for the marine waste treatment or may reduce decomposition efficiency. The thrombolytic enzyme used in an amount exceeding 2% by volume may no longer enhance treatment efficiency and is thus disadvantageous in terms of cost. The upper limit, however, is not critically significant for the decomposition treatment.

Preferably, the thrombolytic enzyme is further added in an amount required for the decomposition of the marine waste, if necessary, during the decomposition treatment to thereby keep its concentration constant in the treatment liquid.

The amount of water in the treatment liquid during the decomposition treatment is not particularly limited and can be selected appropriately according to the purpose. The amount is preferably 25% by volume or more, more preferably 50% by volume to 70% by volume. The water in an amount less than 25% by volume may impede the enzyme-mediated decomposition reaction due to the insufficient contact between marine waste and the enzyme. The water in an amount exceeding 70% by volume may dilute the enzyme to thereby slow down the decomposition reaction rate.

The temperature of the decomposition treatment is not particularly limited as long as the marine waste can be decomposed at this temperature. The temperature can be selected appropriately according to the type of the thrombolytic enzyme, the amount of the marine waste, etc., and is preferably 20° C. to 70° C., more preferably 30° C. to 60° C., particularly preferably 40° C. to 53° C. A decomposition temperature of lower than 20° C. may require a longer time for the treatment or may reduce decomposition efficiency. A decomposition temperature exceeding 70° C. may inactivate the thrombolytic enzyme, resulting in unsuccessful decomposition of the marine waste.

When the marine waste is easily decomposable and can be decomposed through reaction in a short time, the temperature is preferably 45° C. to 70° C., more preferably 50° C. to 60° C., in terms of the high initial enzyme activity of the thrombolytic enzyme.

When the marine waste is poorly decomposable and requires long-time reaction for its decomposition, the temperature is preferably 30° C. to 50° C., more preferably 40° C. to 47° C., in terms of the stability of the thrombolytic enzyme.

The pH of the decomposition treatment is not particularly limited and can be selected appropriately according to the type of the thrombolytic enzyme, etc. The pH is preferably 6 to 12, more preferably 6 to 9. A pH less than 6 or exceeding 12 may inactivate the thrombolytic enzyme, resulting in insufficient decomposition of the marine waste.

The time of the decomposition treatment is not particularly limited and can be selected appropriately according to the type or amount of the thrombolytic enzyme, the type or amount of the marine waste, etc. The time is preferably 5 minutes or longer, more preferably 10 minutes or longer.

The upper limit of the reaction time is not particularly limited and can be selected appropriately according to the purpose. The time is preferably 2 hours or shorter. In most cases, the marine waste, depending on its type, is completely decomposed within 2 hours. Thus, reaction for a time exceeding 2 hours may be inefficient.

The method for purifying the thrombolytic enzyme is not particularly limited and can be selected appropriately according to the purpose. Examples thereof include a method which involves fractionating, for example, the thrombolytic enzyme-containing culture supernatant of the microorganism belonging to the genus *Bacillus*, by hydrophobic interaction chromatography, then desalting the desired fractions by gel filtration chromatography, and purifying the desalted fractions by density gradient isoelectric focusing.

The method for preparing the fermentation product is not particularly limited and can be selected appropriately according to the purpose. Examples thereof include a method which involves mixing a proteinaceous raw material with the microorganism belonging to the genus *Bacillus* and fermenting the proteinaceous raw material by a method known in the art.

The proteinaceous raw material is not particularly limited and can be selected appropriately according to the purpose. Examples thereof include: plant-derived raw materials such as soybeans, red beans, kidney beans, peas, fava beans, mottled kidney beans, red kidney beans, and peanuts; and animal-derived raw materials such as butcher meat, fish meat, and chicken meat. These materials may be used alone or in combination of two or more thereof.

The fermentation temperature is not particularly limited and can be selected appropriately according to the purpose. The fermentation temperature is preferably 10° C. to 50° C., more preferably 27° C. to 40° C.

The fermentation time is not particularly limited and can be selected appropriately according to the purpose. The fermentation time is preferably 20 hours to 72 hours, more preferably 48 hours to 72 hours.

The method for separating the fermentation product is not particularly limited and can be selected appropriately according to the purpose. Examples thereof include a method which involves separating the fermentation product by salting out or various chromatography techniques.

The method for drying the thrombolytic enzyme is not particularly limited and can be performed by an approach known in the art. A usual method can be used, for example, freeze-drying, circulation drying, drying by heating, or drying under reduced pressure.

Alternatively, the thrombolytic enzyme may be re-melted in a solvent suitable for the purpose after freeze-drying. The thrombolytic enzyme has stable enzymatic activity even after freeze-drying and is thus advantageous in terms of high storage stability.

Here, examples of the dried thrombolytic enzyme include dried products of a culture liquid containing the microorganism belonging to the genus *Bacillus*, the culture supernatant of the microorganism belonging to the genus *Bacillus*, the fermentation product, and the thrombolytic enzyme purified from the fermentation product.

Hereinafter, one exemplary method of treating the marine waste using an apparatus will be described with reference to the drawing. An employable apparatus in the present invention is not limited to this apparatus. In the description below, the method for treating jellyfish as the marine waste will be described as an example. However, the marine waste used in the method using the apparatus may be any marine waste and is not limited to the jellyfish.

FIG. 1 is a schematic diagram illustrating one example of an apparatus (wet treatment apparatus) for use in the method for treating marine waste. The apparatus is based on a siphon system. The features of this apparatus are that, for example, (1) it does not require a stirring apparatus in a decomposition tank, (2) since it is operable with one pump, running cost can be reduced and maintenance management can be simplified, (3) a lysate does not flood from the decomposition tank, (4) the manner of decomposition can be observed easily, (5) the size of the apparatus can be increased easily, and (6) continuous decomposition can be achieved.

In the apparatus shown in FIG. 1, a treatment liquid containing the above enzyme (hereinafter, this treatment liquid is also referred to as a "composition for jellyfish decomposition") is contained in advance in a circulation/heating tank 50. A gate valve 140 in the piping is "opened", while a gate valve 60, a gate valve 70, a gate valve 110, and a gate valve 130 are "closed". In this state, a liquid feed pump 40 disposed in the piping is driven to pump the composition for jellyfish decomposition and transfer it into a decomposition tank 10. The resulting composition for jellyfish decomposition is flowed into the decomposition tank 10 from the liquid inlet to come into contact with jellyfish contained in a partitioning tank 20 so that the jellyfish is contact-treated by the composition for jellyfish decomposition. In this treatment, the jellyfish is contact-treated so as to be pushed up by the composition for jellyfish decomposition flowed into the decomposition tank 10 from below. In other words, the jellyfish drops in the direction of gravitational force, whereas the composition for jellyfish decomposition comes in contact with this dropping jellyfish to push up the jellyfish. Therefore, the contact treatment is effectively performed by the synergistic effects of the gravity applied to the jellyfish and the fluid pressure of the composition for jellyfish decomposition to thereby efficiently decompose the jellyfish.

A portion of the composition for jellyfish decomposition flowed into the decomposition tank 10 is discharged into a siphon tube 30 from the liquid outlet disposed at the bottom of the decomposition tank 10. Then, with increase in the fluid volume (rise in water level) of the composition for jellyfish decomposition flowed into the decomposition tank 10, the fluid volume of the composition for jellyfish decomposition is also increased (water level is raised) at a similar rate in the siphon tube 30, which is connected to the liquid outlet of the decomposition tank 10 so as to extend upward from near the liquid outlet and be curved downward in the neighborhood of the upper region of the decomposition tank 10. When the fluid volume (water level) of the composition for jellyfish decomposition in the siphon tube 30 reaches the curved portion of the siphon tube 30, the composition for jellyfish decomposition in the decomposition tank 10 is continuously transferred to the outside through the siphon tube 30 from the liquid outlet by the principles of siphon and continuously transferred into the circulation/heating tank 50 from an outlet for treated liquid passed through siphon tube (an end of the siphon tube 30) 170. In the partitioning tank 20, the jellyfish drops by the self-weight along with decrease in the amount of the composition for jellyfish decomposition. When the composition for jellyfish decomposition is completely transferred to the outside, the jellyfish collides with the bottom surface of the partitioning tank 20 and is broken into pieces due to this collision or the like.

The composition for jellyfish decomposition transferred into the circulation/heating tank 50 is lifted again by the driven liquid feed pump 40 disposed in the piping and transferred again into the decomposition tank 10. As a result, the second contact treatment is performed in the decomposition tank 10. In this treatment, the gate valve 140 in the piping is "opened", while the gate valve 60, the gate valve 70, the gate valve 110, and the gate valve 130 are "closed". The liquid feed pump 40 disposed in the piping can be continuously driven to thereby continuously repeat the re-transfer into the decomposition tank 10 and the re-contact treatment in decomposition tank 10. A plurality of runs of this contact treatment completely decompose the jellyfish contained in the partitioning tank 20 so that the jellyfish is lysed into the composition for jellyfish decomposition.

In the circulation/heating tank 50, the composition for jellyfish decomposition transferred through the siphon tube 30 can be passed, if necessary, through a heating tube 80 and circulated to thereby achieve heating or reaction. In other words, the composition for jellyfish decomposition is uniformly mixed by passing through the heating tube 80 and circulation in the circulation/heating tank 50. In addition, the composition for jellyfish decomposition is heated by a heater 90 to the optimum temperature for the thrombolytic enzyme contained therein (this operation of the heater 90 is not necessary if the temperature of the composition for jellyfish decomposition has already reached the optimum temperature for the enzyme contained therein) to thereby completely and efficiently decompose undecomposed jellyfish debris, etc. (jellyfish protein) contained in the composition for jellyfish decomposition. The resulting composition for jellyfish decomposition is prepared as a solution containing a uniform lysate of the jellyfish protein. In order to pass the composition for jellyfish decomposition in the circulation/heating tank 50 through the heating tube 80 and circulate it in the circulation/heating tank 50, the liquid feed pump 40 disposed in the piping can be driven in a state where the gate valve 70 in the piping is "opened", while the gate valve 60, the gate valve 130, and the gate valve 140 are "closed". In this case, the whole composition for jellyfish decomposition in the circulation/heating tank 50 may be passed through the heating tube 80 and circulated in the circulation/heating tank 50. Alternatively, a portion of the composition for jellyfish decomposition in the circulation/heating tank 50 may be passed through the heating tube 80 and circulated in the circulation/heating tank 50, while the remaining portion may be transferred into the decomposition tank 10.

<Use>

The treatment agent for salt-containing organic waste liquid of the present invention can efficiently and simply treat salt-containing organic waste liquid in a short time, and is highly safe and can continuously treat the salt-containing organic waste liquid for a long time. Therefore, the treatment agent for salt-containing organic waste liquid can suitably be used for purification of waste liquid such as sewage, human waste, waste liquid from food factories, waste liquid from waterfront plant facilities such as power plants and ironworks, other industrial waste liquid, and salt-containing waste liquid such as marine waste. In particular, the treatment agent for salt-containing organic waste liquid can be used for purification of a lysate of jellyfish.

(Salt Concentration-Reducing Agent)

A salt concentration-reducing agent of the present invention contains at least the Scuticociliatida, and, if necessary, further contains other ingredients.

<Scuticociliatida>

The Scuticociliatida in the salt concentration-reducing agent is not particularly limited and can be selected appropriately according to the purpose. The Scuticociliatida therein is, for example, one similar to the Scuticociliatida in the treatment agent for salt-containing organic waste liquid.

The amount of the Scuticociliatida in the treatment agent for salt-containing organic waste liquid is not particularly limited and can be selected appropriately according to the purpose. Also the salt concentration-reducing agent may be the Scuticociliatida itself.

The Scuticociliatida contained in the salt concentration-reducing agent is preferably in motile form from the viewpoints of being high in salt concentration-reducing activity. However, since the Scuticociliatida in the salt concentration-reducing agent can be changed from cyst form (i.e., a dormant state) to motile form by controlling conditions for reducing the salt concentration such as the pH of the treated liquid, the treatment temperature, the presence or absence of pre-culturing, and the exposure conditions, the state of the Scuticociliatida contained in the salt concentration-reducing agent is not particularly limited and can be selected appropriately according to the purpose.

<Other Ingredients>

The other ingredients in the salt concentration-reducing agent are not particularly limited and can be selected appropriately according to the purpose. Examples thereof include water, seawater, sludge, inorganic salts, and various medium ingredients.

The amount of the other ingredients in the salt concentration-reducing agent is not particularly limited and can be selected appropriately according to the purpose.

The dosage form of the salt concentration-reducing agent is not particularly limited and can be selected appropriately according to the purpose. The dosage form thereof may be liquid or solid.

The salt concentration-reducing agent of the present invention may be used alone, or in combination with another treatment agent as long as the effects of the present invention are not impaired.

<Method for Reducing Salt>

A method for reducing the salt concentration of an object such as a salt-containing solution using the salt concentration-reducing agent is not particularly limited and can be selected appropriately according to the purpose as long as the Scuticociliatida is used. Examples thereof include a method where the salt concentration-reducing agent is brought into contact with an object such as a salt-containing solution.

A method with which the salt concentration-reducing agent is brought into contact with the object is not particularly limited and can be selected appropriately according to the purpose.

<Use>

Since the salt concentration-reducing agent can suitably reduce the salt concentration of a system containing salt such as seawater, the salt concentration-reducing agent can be used for reducing the salt concentration to a desired level in treating, for example, salt-containing organic waste liquid. When organic substances contained in the salt-containing organic waste liquid are decomposed by, for example, an enzyme, the salt concentration of the salt-containing organic waste liquid can be adjusted by the salt concentration-reducing agent to such a level not to inhibit the activity of the enzyme, which is advantageous.

(Treatment Method for Salt-Containing Organic Waste Liquid)

A treatment method for salt-containing organic waste liquid of the present invention includes at least a salt-containing organic waste liquid treating step; and, if necessary, further includes other steps such as a solid-liquid separating step, a coagulating step, a disinfecting step, a desalting step, a temperature controlling step, a filtrating step and a recycling step. The treatment method for salt-containing organic waste liquid of the present invention can efficiently decompose organic substances in the salt-containing organic waste liquid for a short time, and can purify the salt-containing organic waste liquid.

The treatment method for salt-containing organic waste liquid may be performed using an apparatus. The apparatus is not particularly limited and can be selected appropriately according to the purpose from known apparatus. An apparatus may also be used that can continuously allow untreated organic substances (e.g., a solid of jellyfish) to undergo pre-treatment to purification of waste liquid, with being connected with an apparatus for treating organic substances in the salt-containing organic waste liquid so that they turn into a suitable state for the treatment of the present invention (e.g., an apparatus for decomposing the jellyfish). The treatment method for salt-containing organic waste liquid may be performed using the below-described entrapment immobilization carrier of the present invention.

The apparatus preferably includes a salt-containing organic waste liquid treating unit; and, more preferably, further includes a solid-liquid separating unit, a coagulating unit, a disinfecting unit, a desalting unit, a temperature controlling unit, a filtrating unit and a recycling unit, if necessary.

Here, the salt-containing organic waste liquid treating step is suitably performed by the salt-containing organic waste liquid treating unit. The solid-liquid separating step is suitably performed by the solid-liquid separating unit. The disinfecting step is suitably performed by the disinfecting unit. The desalting step is suitably performed by the desalting unit. The temperature controlling step is suitably performed by the temperature controlling unit. The irradiating step is suitably performed by the irradiating unit. The filtrating step is suitably performed by the filtrating unit. The recycling step is suitably performed by the recycling unit.

Hereinafter, description will be given to the apparatus as well as the treatment method for salt-containing organic waste liquid.

<Salt-Containing Organic Waste Liquid Treating Step and Salt-Containing Organic Waste Liquid Treating Unit>

The salt-containing organic waste liquid treating step is a step of bringing the Scuticociliatida and the salt-containing organic waste liquid into contact with each other to treat the salt-containing organic waste liquid. In use of the above apparatus, the salt-containing organic waste liquid treating step is suitably performed by the salt-containing organic waste liquid treating unit.

In the salt-containing organic waste liquid treating step, Scuticociliatida itself may be used, or the treatment agent for salt-containing organic waste liquid of the present invention may be used.

The method for treating the salt-containing organic waste liquid is not particularly limited and can be selected appropriately according to the purpose as long as the Scuticociliatida is used. Examples thereof include a method where the salt-containing organic waste liquid is brought into contact with the Scuticociliatida.

The method with which the salt-containing organic waste liquid is brought into contact with the Scuticociliatida is not particularly limited and can be selected appropriately according to the purpose as long as the salt-containing organic waste liquid can be brought into contact with the Scuticociliatida. Examples thereof include: a method of adding the Scuticociliatida and/or the treatment agent for salt-containing organic waste liquid to the salt-containing organic waste liquid; and an activated sludge method using activated sludge containing the Scuticociliatida (preferably, activated sludge where the Scuticociliatida is a dominant species).

The amount of the Scuticociliatida used is not particularly limited and can be selected appropriately according to the purpose, but is preferably $1.2 \times 10^4$ individuals/mL to $3.2 \times 10^6$ individuals/mL, more preferably $4.0 \times 10^4$ individuals/mL to $1.2 \times 10^5$ individuals/mL, particularly preferably $8.0 \times 10^4$ individuals/mL to $1.2 \times 10^5$ individuals/mL, as the number of individuals of Scuticociliatida in motile form relative to the salt-containing organic waste liquid. When the amount of the Scuticociliatida used is less than $1.2 \times 10^4$ individuals/mL, there may be a case where organic substances in the salt-containing organic waste liquid cannot sufficiently be decomposed, so that treatment efficiency may be degraded or treatment time may be extended. When the amount of the Scuticociliatida used is more than $3.2 \times 10^6$ individuals/mL, the Scuticociliatida start to autolyze, potentially increasing parameters of waste liquid such as COD value.

The number of individuals of the Scuticociliatida can be measured with, for example, a hemocytometer.

The treating temperature is not particularly limited and can be selected appropriately according to the purpose, but is preferably lower than 45° C., more preferably 3° C. or higher but lower than 45° C., particularly preferably 37° C. to 40° C. When the treating temperature is 45° C. or higher, the Scuticociliatida may be in a dormant state, so that the COD value is not sufficiently decreased in some cases. When the treating temperature is lower than 3° C., the growth rate of the Scuticociliatida is slow, so that waste liquid is not sufficiently purified in some cases.

The treating time is not particularly limited and can be selected appropriately according to, for example, parameters of waste liquid. The upper limit is preferably within 48 hours, more preferably within 10 hours, particularly preferably within 7 hours. When the treating time is longer than 48 hours, the treatment takes too long a time, which is not preferred because of poor efficiency.

The lower limit of the treating time is not particularly limited and can be selected appropriately according to the purpose, preferably 4 hours or longer, more preferably 5 hours or longer, particularly preferably 6 hours or longer. When the treating time is shorter than 4 hours, organic substances in the salt-containing organic waste liquid cannot sufficiently be decomposed, potentially leading to poor treatment efficiency.

The treatment method for salt-containing organic waste liquid of the present invention can reduce parameters of waste liquid to favorable levels for a short time, which is advantageous.

The treatment conditions are not particularly limited and can be selected appropriately according to the purpose as long as they are conditions under which the Scuticociliatida can grow. The treatment is preferably performed under an aerobic condition, more preferably performed under aeration.

The air flow rate under aeration is not particularly limited and can be selected appropriately according to the purpose, but is preferably 1 L/minute to 4 L/minute, more preferably 2 L/minute to 4 L/minute, particularly preferably 3 L/minute to 4 L/minute, relative to 1 L of the salt-containing organic waste liquid. When the air flow rate is less than 1 L/minute, the Scuticociliatida cannot grow in some cases, or cannot change from cyst form (i.e., a dormant state) to motile form.

The salt concentration in the treatment is not particularly limited and can be selected appropriately according to the purpose. The salt concentration measured with an electroconductivity meter is more preferably 5 or more but less than 80, still more preferably 10 to 70, particularly preferably 50 to 70, relative to the total volume of a treatment liquid containing the salt-containing organic waste liquid, the Scuticociliatida, and other ingredients further added, if necessary. When the salt concentration is lower than 5, the treatment of waste liquid by the Scuticociliatida may be insufficient. When the salt concentration is higher than 80, the Scuticociliatida turns into a cyst or dies, so that it cannot grow. As a result, it may be impossible to sufficiently obtain the effects of the treatment of the salt-containing organic waste liquid.

The pH in the treatment is not particularly limited and can be selected appropriately according to the purpose, but is preferably 4 to 11, more preferably 4.2 to 10.5, particularly preferably 4.5 to 10.

In the treatment process in the salt-containing organic waste liquid treating step, when the Scuticociliatida cannot grow well due to the small amount of ingredients in the salt-containing organic waste liquid, one or two or more kinds selected from sugars such as glucose; nitrogen sources such as ammonium sulfate and ammonium chloride; inorganic salts such as potassium chloride and sodium phosphate; and various medium ingredients may further be added to and mixed with the salt-containing organic waste liquid. These additional ingredients allow the Scuticociliatida to actively grow, being able to maintain the efficiency of the organic substances.

In the present invention, the activated sludge where Scuticociliatida is dominant refer to sludge containing Scuticociliatida in motile form preferably at $1.2 \times 10^4$ individuals/mL to $3.2 \times 10^6$ individuals/mL, more preferably at $4.0 \times 10^4$ individuals/mL to $1.2 \times 10^5$ individuals/mL, particularly preferably at $8.0 \times 10^4$ individuals/mL to $1.2 \times 10^5$ individuals/mL.

The activated sludge method has a problem of a bulking phenomenon where sludge becomes difficult to precipitate and as a result purified water becomes difficult to obtain. One possible cause for the bulking phenomenon is that bacteria such as *Sphaerotilus* filamentous fungi abnormally grow and such filamentous bacteria are tangled to prevent precipitation.

When the activated sludge method is used in the salt-containing organic waste liquid treating step of the treatment method for salt-containing organic waste liquid of the present invention, advantageously, the bulking phenomenon can be prevented since the activated sludge contains Scuticociliatida existing dominantly therein (i.e., it contains almost no other bacteria such as filamentous fungi) as well as the Scuticociliatida eats bacteria in the salt-containing organic waste liquid.

In use of the activated sludge method, the Scuticociliatida is preferably acclimated in the sludge before use.

The conditions for acclimation such as temperature, pH and enzyme are not particularly limited and can be selected appropriately according to the purpose. They are preferably conditions under which the Scuticociliatida can suitably grow.

The treatment method for salt-containing organic waste liquid of the present invention can decompose and purify organic substances in the salt-containing organic waste liquid at the salt-containing organic waste liquid treating step Whether the salt-containing organic waste liquid has been purified can be judged from, for example, parameters of waste liquid.

The parameters of waste liquid are not particularly limited and can be selected appropriately according to the purpose. Examples of the parameters thereof include COD, BOD, total phosphorus (T-P), total nitrogen (T-N), suspended solids (SS), normal-hexane extract, and pH. Whether the salt-containing organic waste liquid has been purified may be judged from one of the parameters of waste liquid, or from two or more of the parameters of waste liquid. The COD, BOD, SS, T-N and T-P can be measured according to JIS K 0102.

The COD value is not particularly limited and can be selected appropriately according to the purpose. The COD value of the salt-containing organic waste liquid after the Scuticociliatida and the salt-containing organic waste liquid have been brought into contact with each other (after treatment) is preferably 30% or less, more preferably 20% or less, further preferably 10% or less, relative to the COD value of the salt-containing organic waste liquid before the Scuticociliatida and the salt-containing organic waste liquid are brought into contact with each other in the bringing (before treatment). Particularly preferably, the COD value becomes 30% or less relative to the COD value before treatment within 7 hours after the Scuticociliatida and the salt-containing organic waste liquid are brought into contact with each other.

The COD value is preferably 160 mg/L or less, more preferably 120 mg/L or less, particularly preferably 100 mg/L or less.

The salt-containing organic waste liquid treating unit is not particularly limited and can be selected appropriately according to the purpose as long as it can bring the salt-containing organic waste liquid and the Scuticociliatida into contact with each other. Examples of the salt-containing organic waste liquid treating unit include: a waste liquid vessel for retaining the salt-containing organic waste liquid; a microorganism vessel for retaining the Scuticociliatida; a contact vessel for bringing the salt-containing organic waste liquid and the Scuticociliatida into contact with each other; and a transfer member for transferring the salt-containing organic waste liquid from the waste liquid vessel to the contact vessel and transferring the Scuticociliatida from the microorganism vessel to the contact vessel.

The shape, structure, size, material, etc. of the waste liquid vessel, microorganism vessel and contact vessel are not particularly limited and can be selected appropriately according to the purpose. The contact vessel is preferably provided such that the salt-containing organic waste liquid and the Scuticociliatida are brought into contact with each other under aeration.

The transfer member is not particularly limited and can be selected appropriately according to the purpose. Examples of the transfer member include a pipe for feeding the salt-containing organic waste liquid therethrough, a pump for feeding the salt-containing organic waste liquid, a pipe for feeding the Scuticociliatida therethrough, and a pump for feeding the Scuticociliatida.

The shape, structure, size, material, etc. of the transfer member are not particularly limited and can be selected appropriately according to the purpose. The pump may be designed so that its drive can be controlled with a controlling unit such as a computer.

<Solid-Liquid Separating Step and Solid-Liquid Separating Unit>

The solid-liquid separating step is a step of precipitating the Scuticociliatida after the salt-containing organic waste liquid treating step, to thereby separate a solid phase containing the Scuticociliatida (excess sludge) and a liquid phase containing purified water (waste liquid) from each other. When the above apparatus is used, the solid-liquid separating step is suitably performed with the solid-liquid separating unit.

The method for precipitating the solid phase is not particularly limited and can be selected appropriately according to the purpose. Examples thereof include a method by spontaneous precipitation and a method by centrifugal separation.

The method for separating the solid phase and the liquid phase from each other is not particularly limited and can be selected appropriately according to the purpose.

After the solid-liquid separation, the liquid phase, where the organic substances have been decomposed and purified, may be disposed of as is, or may be disposed of after being subjected to the below-described disinfecting step, desalting step, and filtrating step, etc. Furthermore, various advanced treatments may be performed after coagulation/precipitation followed by a filtrating step.

The solid-liquid separating unit may be the above contact vessel when the solid-liquid separation is performed by spontaneous precipitation. When the solid-liquid separation is performed by centrifugal separation, the solid-liquid separating unit is, for example, a rotating body capable of applying centrifugal force. The shape, structure, size, material, etc. of the rotating body are not particularly limited and can be selected appropriately according to the purpose.

<Coagulating Step and Coagulating Unit>

The coagulating step is a step of coagulating formed sludge in the treatment liquid treated in the salt-containing organic waste liquid treating step or the liquid phase separated in the solid-liquid separating step. The coagulating step is preferably performed after the separation in solid-liquid separating step, from the viewpoint of increasing transparency of the liquid phase.

The coagulating unit is not particularly limited and can be selected appropriately according to the purpose as long as the coagulating unit can coagulate the formed sludge. Examples thereof include the coagulants exemplified for the treatment agent for salt-containing organic waste liquid.

The amount of the coagulating unit added is not particularly limited and can be selected appropriately according to, for example, the type of the coagulating unit.

For example, when the coagulating unit is polyaluminum chloride (PAC), the amount of the PAC added to the treatment liquid or the liquid phase is preferably 0.9 g/L or less, more preferably 0.3 g/L or less. When the amount of the PAC added is more than 0.9 g/L, the amount of sludge formed may be large.

Also, when the coagulating unit is 3-fold diluted polysilica iron coagulant, the amount of the 3-fold diluted polysilica iron coagulant added to the treatment liquid or the liquid phase is preferably 0.04 g/L or less, more preferably 0.11 g/L or less. When the amount of the 3-fold diluted polysilica iron coagulant added is more than 0.11 g/L, the amount of sludge formed may be large.

<Recycling Step and Recycling Unit>

Since the Scuticociliatida-containing solid phase separated from the liquid phase in the solid-liquid separating step can be reused, preferably, the treatment method for salt-containing organic waste liquid further includes a recycling step of bringing the solid phase and new salt-containing organic waste liquid into contact with each other. The recycling step allows the treatment method to continuously treat the salt-containing organic waste liquid for a long time, advantageously preventing formation of excess sludge.

If necessary, the Scuticociliatida may appropriately be added to the recycling step.

The recycling unit is not particularly limited and can be selected appropriately according to the purpose. Examples thereof include transfer members for transferring the liquid phase and the solid phase.

Examples of the transfer member include a pipe for feeding the liquid phase therethrough and a pump for feeding the liquid phase. When the solid phase is reused, examples of the transfer member include a pipe for feeding the solid phase precipitated in the contact vessel to the microorganism vessel, and a pump for feeding the solid phase to the microorganism vessel.

The shape, structure, size, material, etc. are not particularly limited and can be selected appropriately according to the purpose. The pump may be designed so that its drive can be controlled with a controlling unit such as a computer.

<<Disinfecting Step and Disinfecting Unit>>

The disinfecting step is a step of disinfecting the salt-containing organic waste liquid treated by being brought into contact with the Scuticociliatida in the salt-containing organic waste liquid treating unit.

When the above apparatus is used, the disinfecting step is suitably performed with the disinfecting unit.

Specific examples of the disinfecting unit include: a voltage-applying member for applying voltage to the salt-containing organic waste liquid; an ozone-contacting member for contacting ozone with the salt-containing organic waste liquid; and a UV ray-irradiating member for irradiating the salt-containing organic waste liquid with UV rays. These units may be used alone or in combination of two or more thereof.

<<Desalting Step and Desalting Unit>>

The desalting step is, for example, a step of desalting the salt-containing organic waste liquid treated by being brought into contact with the Scuticociliatida in the salt-containing organic waste liquid treating step. When the above apparatus is used, the desalting step is suitably performed with the desalting unit.

Specific examples of the desalting unit include: a voltage-applying member for applying voltage to the salt-containing organic waste liquid. When the above apparatus has a voltage-applying member as the disinfecting unit, desalting can be achieved by the voltage-applying member.

<<Temperature Controlling Step and Temperature Controlling Unit>>

The temperature controlling step is a step of controlling the temperature of the salt-containing organic waste liquid, which has been brought into contact with the Scuticociliatida in the salt-containing organic waste liquid treating step, to such a temperature that does not inhibit growth of the Scuticociliatida and decomposition reaction.

When the above apparatus is used, the temperature controlling step is suitably performed with the temperature controlling unit.

Specific examples of the temperature controlling unit include a thermostat, a heater, and an air blower. These units may be used alone or in combination of two or more thereof.

<<Filtrating Step and Filtrating Unit>>

The filtrating step is a step of filtrating the salt-containing organic waste liquid treated by being brought into contact with the Scuticociliatida in the salt-containing organic waste liquid treating step. When the above apparatus is used, the filtrating step is suitably performed with the filtrating unit.

Specific examples of the filtrating unit include a column using activated carbon.

Figure 2:
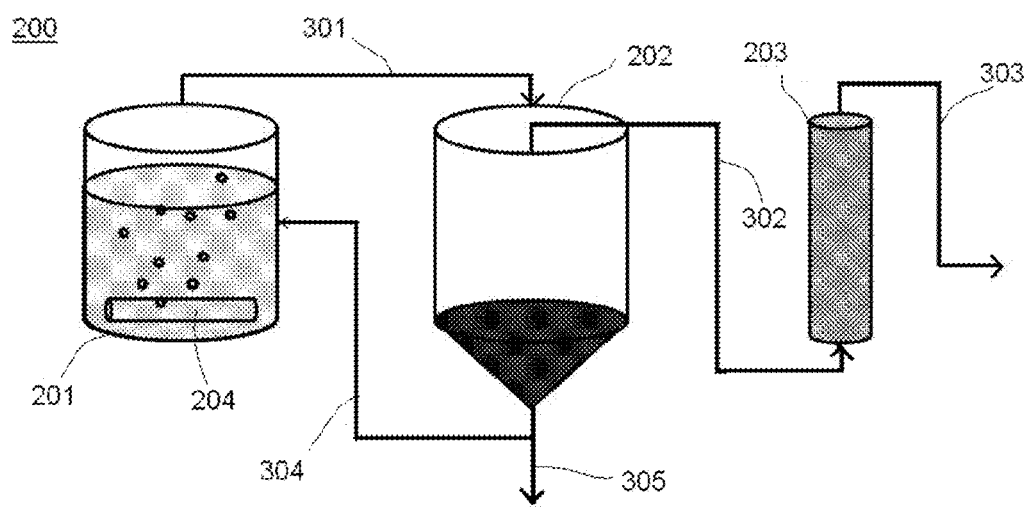
FIG. 2 is a schematic diagram illustrating one example of a treatment method for salt-containing organic waste liquid of the present invention.

Hereinafter, one exemplary treatment method for salt-containing organic waste liquid of the present invention will be described with reference to the drawing. FIG. 2 is a diagram illustrating one example of a treatment apparatus for working the treatment method for salt-containing organic waste liquid. An employable apparatus in the present invention is not limited to this apparatus.

A treatment apparatus 200 includes a salt-containing organic waste liquid treating unit 201, a solid-liquid separating unit 202, and a filtrating unit 203.

Salt-containing organic waste liquid is added to the salt-containing organic waste liquid treating unit 201 which retains Scuticociliatida, and the salt-containing organic waste liquid and the Scuticociliatida are brought into contact with each other in the salt-containing organic waste liquid treating unit 201. The salt-containing organic waste liquid treating unit 201 contains therein a stirring unit 204 configured to stir the Scuticociliatida and the salt-containing organic waste liquid. Upon the treatment in the salt-containing organic waste liquid treating unit 201, the salt-containing organic waste liquid treating unit 201 is preferably controlled in temperature with an unillustrated temperature controlling unit. After completion of the treatment of the salt-containing organic waste liquid, a treatment liquid containing the Scuticociliatida and the salt-containing organic waste liquid is transferred via a feeding pipe 301 to the solid-liquid separating unit 202, where the treatment liquid is separated into a solid phase and a liquid phase. The solid-liquid separating unit 202 may include an unillustrated coagulating unit.

The separated liquid phase (containing the treated salt-containing organic waste liquid) is transferred via a feeding pipe 302 to the filtrating unit 203, where it is filtrated. The liquid phase treated by the filtrating unit may be disposed of via a feeding pipe 303 as is, or may be disposed of after being treated with an unillustated disinfecting unit, desalting unit, etc.

Meanwhile, the Scuticociliatida-containing solid phase separated with the solid-liquid separating unit 202 is returned via a feeding pipe 304 to the salt-containing organic waste liquid treating unit 201, where it is reused. Also, precipitates formed by the coagulating unit are disposed of via a feeding pipe 305.

The method for feeding liquid between the units is not particularly limited and can be selected appropriately according to the purpose. For example, the feeding pipes 301 to 305 may have an unillustrated pump which feeds liquid.

<Use>

The treatment method for salt-containing organic waste liquid of the present invention can simply, efficiently and inexpensively treat salt-containing organic waste liquid for a short time at low energy without the need of a special apparatus, and is highly safe and can continuously treat the salt-containing organic waste liquid for a long time. Therefore, the treatment method for salt-containing organic waste liquid can suitably be used for purification of waste liquid such as sewage, human waste, waste liquid from food factories, waste liquid from waterfront plant facilities such as power plants and ironworks, other industrial waste liquid, and salt-containing waste liquid such as marine waste. In particular, the treatment method for salt-containing organic waste liquid can be used for purification of a lysate of jellyfish.

(Entrapment Immobilization Carrier)

An entrapment immobilization carrier of the present invention contains Scuticociliatida and a carrier, at least the Scuticociliatida being entrapped and immobilized on the carrier. If necessary, other ingredients may further be carried on the carrier.

<Scuticociliatida>

The Scuticociliatida in the entrapment immobilization carrier is not particularly limited and can be selected appropriately according to the purpose. The Scuticociliatida therein is, for example, one similar to the Scuticociliatida in the treatment agent for salt-containing organic waste liquid.

The amount of the Scuticociliatida in the entrapment immobilization carrier is not particularly limited and can be selected appropriately according to the purpose. Also the salt concentration-reducing agent may be the Scuticociliatida itself.

The Scuticociliatida contained in the entrapment immobilization carrier is preferably in motile form from the viewpoints of being high in treatment efficiency of salt-containing organic waste liquid and salt concentration-reducing effects. However, since the Scuticociliatida in the entrapment immobilization carrier can be changed from cyst form (i.e., a dormant state) to motile form by controlling conditions for use of the entrapment immobilization carrier such as the salt concentration of a sample to be added to the entrapment immobilization carrier, the pH of the sample, and the temperature at the addition of the sample, the state of the Scuticociliatida contained in the entrapment immobilization carrier is not particularly limited and can be selected appropriately according to the purpose.

<Carrier>

The carrier is not particularly limited, and its shape, structure, size, material, and the like can be selected appropriately according to the purpose, etc.

Examples of the shape of the carrier include spherical, granular, massive (pellet), sheeted, columnar, net-like, and capsule shapes. These shapes may be used alone or in combination of two or more thereof.

The structure of the carrier may be constituted of one member alone or may be constituted of two or more members. The carrier may have a single-layer structure or a multilayer structure. These structures may be used alone or in combination of two or more thereof.

The microstructure of the carrier is not particularly limited as long as, for example, this structure allows the Scuticociliatida to come into contact with objects to be treated such as the salt-containing organic waste liquid. For example, a porous or net-like structure is preferable. The carrier having this structure can increase the area of the contact between the Scuticociliatida immobilized on the carrier and the objects to be treated and is thus advantageous in terms of excellent decomposition efficiency of the objects to be treated.

The size of the carrier can be selected appropriately according to the size, etc. of a container or the like housing the carrier. A plurality of the carriers may have an equal (constant) size or may differ in size from each other.

Preferable examples of the material of the carrier include polysaccharides, proteins, synthetic polymers, and inorganic substances. These materials may be used alone or in combination of two or more thereof.

Examples of the polysaccharides include cellulose, dextran, agarose, sodium alginate, agar, and carrageenan.

Among them, agar is preferable because the agar can retain the Scuticociliatida at a high concentration while it is excellently permeable to components in waste liquid and is easily granulated and easily treated or disposed of, with little toxicity.

The proteins are preferably, for example, inactivated proteins. Examples thereof particularly include gelatin, albumin, and collagen.

Examples of the synthetic polymers include acrylamide, polyvinyl alcohol, polyethylene glycol, sodium polyacrylate, polyvinyl chloride, polystyrene, polyurethane, and photo-curable resins.

Examples of the inorganic substances include silica gel, activated carbon, sand, zeolite, porous glass, anthracite, zeolite, expanded-clay, and liquid slag. Among them, the porous material silica gel or activated carbon is preferable.

The method for immobilizing the Scuticociliatida onto the carrier is not particularly limited. The method can be performed according to a method known in the art and can be selected appropriately according to the purpose. Preferable examples thereof include a deposition method (carrier binding method), a cross-linking method, and an entrapment method. These methods may be adopted alone or may be used in combination of two or more thereof.

The deposition method (carrier binding method) involves immobilizing the Scuticociliatida onto the surface of the carrier insoluble in water. The cross-linking method involves cross-linking the Scuticociliatida to a reagent having two or more functional groups. The entrapment method involves entrapping the Scuticociliatida in the lattice of a gel (lattice type) or coating the microorganism with a polymer film (microcapsule).

When the Scuticociliatida is immobilized onto the carrier, the position at the Scuticociliatida is immobilized is not particularly limited and can be selected appropriately according to the purpose, etc. Since the Scuticociliatida is aerobic, the Scuticociliatida is preferably immobilized on or near the surface of the carrier.

The production of a carrier gel as the carrier for immobilization using agar will be described below.

For the carrier, the agar is preferably granulated at a concentration of, for example, 3% by mass that reduces the leakage of the immobilized Scuticociliatida or the invasion thereof into the inside of the carrier and renders the carrier excellently durable, long-life, and highly stable.

The agar is mixed with water to adjust the agar concentration to 3% by mass. The agar is dissolved therein with stirring at 60° C. or higher. For the stable immobilization of the heat-labile Scuticociliatida, the resulting agar is preferably mixed with the Scuticociliatida at the lowest possible temperature (e.g., 55° C. or lower) without being solidified.

The Scuticociliatida used can be collected, for example, by operation such as centrifugation.

The agar mixed with the Scuticociliatida is solidified by cooling to room temperature, then placed in a molding container, and cut into the desired shape to thereby obtain a carrier with the immobilized Scuticociliatida.

The carrier with the immobilized Scuticociliatida (hereinafter, also referred to as a "Scuticociliatida-immobilized carrier") is preferably housed in a container for contact with the objects to be treated such as the salt-containing organic waste liquid. The carrier thus housed in the container is preferable because the carrier can be contacted with the objects to be treated efficiently and in a controlled manner. The container is not particularly limited, and its shape, structure, size, material, and the like can be selected appropriately according to the purpose.

Preferable examples of the shape of the container include a cylindrical shape.

The material of the container is preferably a salt-tolerant material. More preferably, the container is made of glass, a resin, stainless, or the like. Among them, a material that renders the inside of the container visible is preferable.

The filling rate of the Scuticociliatida-immobilized carrier in the container is not particularly limited and can be selected appropriately according to the purpose. The filling rate may be 100% or may be less than 100%.

A plurality of the containers may be connected in parallel or in series according to the load of marine waste.

<Other Ingredients>

The other ingredients in the entrapment immobilization carrier are not particularly limited and can be selected appropriately according to the purpose. Examples thereof include water, seawater, sludge, inorganic salts, and various medium ingredients.

The amount of the other ingredients in the entrapment immobilization carrier is not particularly limited and can be selected appropriately according to the purpose.

<Use>

Use of the entrapment immobilization carrier is not particularly limited and can be selected appropriately according to the purpose. The entrapment immobilization carrier can be used for, for example, treating salt-containing organic waste liquid and reducing salt in water or the like.

It is preferable to use the entrapment immobilization carrier in the treatment method for salt-containing organic waste liquid, since the entrapment immobilization carrier is easy to use for repeated treatments (e.g., the recycle step of the treatment method for salt-containing organic waste liquid).

EXAMPLES

Hereinafter, the present invention will be described specifically with reference to Examples of the present invention. However, the present invention is not limited to these Examples by any means.

Preparation Example 1

Preparation of Waste Liquid of Enzymatically Decomposed Jellyfish

—Sampling of Jellyfish—

Aurelia aurita taken from Tokyo Bay was used. Specifically, jellyfish was taken on a ship using a spoon-net, and immersed in ethylene glycol to prevent breakage of the body composition of jellyfish after thawing of jellyfish. The thus-treated jellyfish was divided into plastic bags for storage, followed by storing with freezing using dry ice. Within 3 hours after that, the jellyfish was transferred to an experimental laboratory and was stored at −60° C.

—Enzymatic Treatment of Jellyfish—

After the storage at −60°, the Aurelia aurita in the plastic bags was thawed with running water. Next, a beaker was placed on a hot stirrer, and 2 L of freshwater and a protease (a crude prionase prepared by the following method) were added to and mixed together in the beaker so that the concentration of the protease was 0.1% by mass to 0.2% by mass. After that, the resultant mixture was heated to 50° C., and the thawed Aurelia aurita was decomposed with constant stirring at a low speed.

A solution of the decomposed jellyfish (hereinafter, this solution is also referred to as "waste liquid of enzymatically decomposed jellyfish") was transferred to a plastic container and stored at 6° C. This waste liquid of enzymatically decomposed jellyfish was found to have a pH of 8.2 and a salt concentration of 25. Note that, the salt concentration was measured with a seawater concentration meter (PAL-06S, manufactured by Atago Co., Ltd.) and the measurement obtained with this meter was shown as the salt concentration. In the following Test Examples, all of the salt concentrations were measured in the same manner.

——Preparation of Crude Prionase——

The prionase is an enzyme disclosed by the applicant (see JP-A No. 2005-262105) and produced by Streptomyces sp. 99-GP-2D-5 strain which is Actinomycetes belonging to the genus Streptomyces (FERM P-19336: deposited to the National Institute of Advanced Industrial Science and Technology, International Patent Organism Depositary).

Cells of Streptomyces sp. 99-GP-2D-5 strain were cultured in an FG medium having the following composition. After culturing, the bacterial cells were removed through centrifugation to obtain a culture supernatant. The culture supernatant was saturated with 80% by mass ammonium sulfate, followed by centrifugation. The resultant precipitate saturated with ammonium sulfate was dialyzed against 0.05M phosphate buffer (pH 6.8) to thereby prepare a crude product of a prionase.

[Composition of FG Medium (pH 7.0)]

Fish meat extract (manufactured by KYOKUTO PHARMACEUTICAL INDUSTRIAL CO., LTD.): 1.0 g Yeast extract (manufactured by Difco Co., Ltd.): 1.0 g Glucose (manufactured by Wako Pure Chemical Industries, Ltd.): 2.0 g Magnesium sulfate heptahydrate (manufactured by Wako Pure Chemical Industries, Ltd.): 0.05 g Calcium carbonate (manufactured by Wako Pure Chemical Industries, Ltd.): 0.32 g Deionized water: 100 mL Example 1

Preparation of Scuticociliatida

—Separation of Scuticociliatida—

Bottom sediment was sampled from the bottom of Tokyo Bay and diluted with artificial seawater (Daigo's Artificial Seawater SP, manufactured by NIHON PHARMACEUTICAL CO., LTD.). Then, Scuticociliatida was separated from the diluted bottom sediment under a stereo microscope using a capillary tube.

Figure 3:
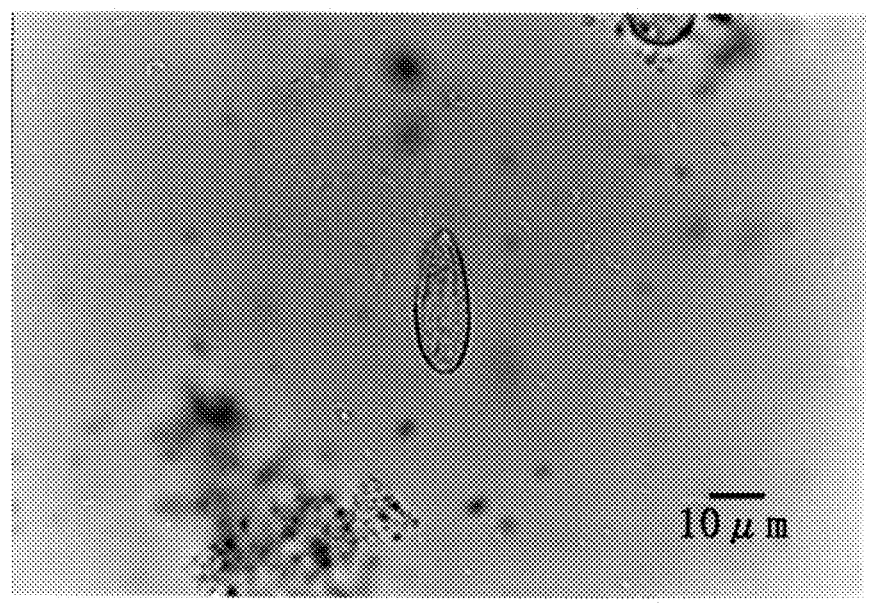
FIG. 3 is a phase contrast micrograph of Scuticociliatida used for a treatment method for salt-containing organic waste liquid of the present invention. The scale bar is 10 μm.

FIG. 3 is a phase contrast micrograph of the separated microorganisms, showing their forms. The separated microorganisms had a shape of pear, had a length of 20 μm to 25 μm, had 8 to 12 cilia arranged in a row along the major axis, and had 1 cilium at its tail end. Furthermore, the oral region was developed and provided with, for example, an undulating membrane, a membranelle and a peniculus (i.e., a belt-like arrangement of short cilia). The oral ciliature could be clearly distinguished from the body ciliature (Oligohymenophora). The structure inside the oral region was not usually noticeable, the body ciliature was normally formed, and the cilia were uniformly formed on the body surface (Hymenostomata).

Based on these morphological characteristics, the separated microorganisms were identified as Scuticociliatida (Scuticociliatida).

—Growth of Scuticociliatida—

The separated Scuticociliatida was cultured and grown in a medium of the waste liquid of enzymatically decomposed jellyfish prepared in Preparation Example 1 at 30° C. under aeration with an air flow rate of 3 L/minute for 10 hours. The number of the Scuticociliatida in the culture liquid was measured by the following method and was found to be $1.2 \times 10^4$ individuals/mL.

—Acclimation of Scuticociliatida—

The separated Scuticociliatida was added to the waste liquid of enzymatically decomposed jellyfish prepared in Preparation Example 1 so as to have a concentration of $1.2 \times 10^4$ individuals/mL, followed by acclimating at 30° C. under aeration with an air flow rate of 3 L/minute for 10 hours, to thereby prepare activated sludge where the Scuticociliatida was a dominant species). Note that, the number of the Scuticociliatida in the activated sludge were measured by the following method and was found to be $1.2 \times 10^5$ individuals/mL.

The Scuticociliatida prepared here was used in Test Examples.

[Measurement Method for the Number of Individuals of Scuticociliatida]

The number of individuals of the Scuticociliatida was measured by counting the number of individuals on a hemocytometer. Specifically, a sample liquid containing the Scuticociliatida was mixed thoroughly and dispenced to 1.5-mL volume Eppendorf tubes. In order to immobilize the Scuticociliatida, 10 μL of 10% by mass formalin solution was added to the sample liquid so that the final concentration thereof was 0.1% by mass, followed by mixing. Then, 10 μL of the thus-prepared Scuticociliatida-immobilizing liquid was dropped on a Thoma hemocytometer (manufactured by Ikemoto Scientific Technology Co., Ltd.). A cover glass having a thickness of 0.4 mm was placed thereon and both ends of the cover glass were pressed. After confirmation of Newton's rings, the adhesion between the hemocytometer and the cover glass was confirmed. After placement of the cover glass, a phase contrast microscope was used at a magnification of ×200 to count the Scuticociliatida. The number of individuals of the Scuticociliatida (individuals/mL) was determined according to the following equation.

Individuals/mL=$N$(number of individuals per 0.1 mm$^3$ in 16 lots)/0.1×10$^{-3}$ mL (volume)=$N$×10$^4$ individuals In the following Test Examples, all of the numbers of individuals of the Scuticociliatida were measured in the same manner.

Comparative Example 1

Preparation of Microorganisms-Immobilized Carrier (Pellet)

As a method for treating waste liquid of decomposed jellyfish, there has been proposed a method for treating waste liquid of decomposed jellyfish with salt-tolerant marine bacteria and/or marine yeasts (hereinafter may be referred to as "organic substance-utilizing salt-tolerant microorganisms") (see JP-A No. 2007-000863).

The organic substance-utilizing salt-tolerant microorganisms were used as a control with respect to the Scuticociliatida. The organic substance-utilizing salt-tolerant microorganisms were prepared according to the method described in JP-A No. 2007-000863, and a microorganisms-immobilized carrier (pellet) was prepared by the following method.

(1) Preparation of Salt-Containing Organic Waste Liquid (Organic Waste Liquid of Jellyfish)

A thrombolytic enzyme that is a protease produced by *Bacillus subtilis* 104-1-3-1 strain (Accession No: NITE P-680) or derivative strain thereof was added in an amount of 2.0% by mass to and mixed with 30 kg of *Aurelia aurita*. After that, the mixture was heated to 50° C. and decomposed for about 1 hour with constant stirring at a low speed. After complete dissolution (decomposition), the mixture was cooled to room temperature to prepare waste liquid of jellyfish.

Note that, the enzymatic activity of the original liquid of the thrombolytic enzyme was 5,633 FLV, and the enzymatic activity of the thrombolytic enzyme was 113 FLV upon enzymatic treatment.

(2) Acclimation of Organic Substance-Utilizing Salt-Tolerant Microorganisms 100 mL of the jellyfish-derived salt-containing organic waste liquid prepared in (1) above was added to a 500-mL conical flask, and mixed with 10 g of the bottom sediment. Also, the mixture was treated at 27° C. and 180 rpm/minute to acclimate organic substance-utilizing salt-tolerant microorganisms contained in the bottom sediment.

(3) Preparation of Micoorganisms 1 mL of the solution obtained in (2) above containing the organic substance-utilizing salt-tolerant microorganisms was mixed with 100 mL of organic waste liquid of jellyfish prepared in the same manner as in (1) above, and the mixture was repeatedly acclimated in the same manner. The repeated acclimation was able to accumulate a high concentration of high-active microorganisms suitable for the treatment method for salt-containing organic waste liquid.

Note that, it was confirmed under a stereo microscope and a phase contrast microscope that no Scuticociliatida was contained in the acclimated organic waste liquid of jellyfish.

(4) Preparation of Microorganisms-Immobilized Carrier

The organic substance-utilizing salt-tolerant microorganisms obtained in (3) above was centrifuged (10 minutes, 10,000×g) to collect bacterial cells of the microorganisms, which were suspended in physiological saline. 20 mL of the bacterial cells of the microorganisms ($1.0 \times 10^8$ individuals/mL) and 20 mL of the organic waste liquid of jellyfish were mixed with 180 mL of a mixture containing 0.3% by mass of sodium polyacrylate and 2.0% by mass of sodium alginate. The resultant mixture was transferred to a column (chromatograph tube, manufactured by AGC TECHNO GLASS CO., LTD.) and 500 mL of 3.0% by mass calcium chloride was added dropwise thereto through the column, to thereby prepare a spherical pellete entrapping and immobilizing the bacterial cells of the microorganisms.

Note that, the microorganisms-immobilized carrier contains a group of bacteria including those belonging to the genus *Sphingobacterium*, those belonging to the genus *Pseudomonas*, those belonging to the genus *Flavobacterium*, and those belonging to the genus *Bacillus* (see Japanese Patent Application Laid-Open (JP-A) No. 2007-000863).

Test Example 1

10 mL of Scuticociliatida ($0.3 \times 10^3$ individuals/mL) was added to 100 mL of the waste liquid of enzymatically decomposed jellyfish. The mixture was treated at 22° C., 30° C. or 37° C. for 20 hours under aeration with an air flow rate of 3 L/minute, and measured for COD value by the following method.

—Measurement of COD Value—

The COD value was measured with a digital reactor block model DRB200 (hereinafter referred to as a "digital block") according to the Japanese Industrial Standards (JIS).

Specifically, 1 mL of a measurement sample was taken in an Eppendorf tube from each test group before treatment or after treatment under the above conditions. The Eppendorf tube containing the sample was centrifuged (15,000 rpm, 10 minutes, 4° C.) to remove the solid matter. Then, 30 µL of a sample supernatant resulting from the centrifugation was added to a test tube, and 5,970 µL of Milli-Q water was added thereto, to thereby prepare a 200-fold diluted sample of the original liquid of sample. After the preparation of the diluted sample, 5 mL of the diluted sample was added to a test tube (kit for COD measurement, glass tube with a cap) and 0.5 mL of reagent A liquid (kit for COD measurement, $KMnO_4$ solution) was added thereto. The test tube was capped and mixed by being inverted. After mixed by being inverted, the test tube was subjected to reaction using a digital block heated to 100° C.

After 30 minutes, the test tube was taken from the digital block and cooled with ice. After it was confirmed that the test tube had been cooled, the test tube was centrifuged (3,500 rpm, 5 minutes) to remove the solid matter in the tube. Then, zero adjustment was made using Milli-Q water as a control on a water quality analyzer (model DR/2400: manufactured by Hack Co., Ltd.). Next, the test tube containing each measurement sample was measured for COD value. In the following Test Examples, all of the numbers of individuals of Scuticociliatida were measured in the same manner.

Note that, in order to how much the above treatment was able to reduce the COD value, the reduction rate in the COD value after the treatment was calculated from the following calculation formula.

> Reduction rate in the COD value after the treatment (%)=100−(the COD value of the waste liquid of enzymatically decomposed jellyfish after the treatment)/the COD value of the waste liquid of enzymatically decomposed jellyfish before treatment)×100

In the above calculation formula, "the COD value of the waste liquid of enzymatically decomposed jellyfish after the treatment" is a COD value of the waste liquid of enzymatically decomposed jellyfish after a certain period passed from the time when the waste liquid of enzymatically decomposed jellyfish and the Scuticociliatida had been brought into contact with each other, and "the COD value of the waste liquid of enzymatically decomposed jellyfish before treatment" is a COD value of the waste liquid of enzymatically decomposed jellyfish before contact with the Scuticociliatida.

Figure 4:
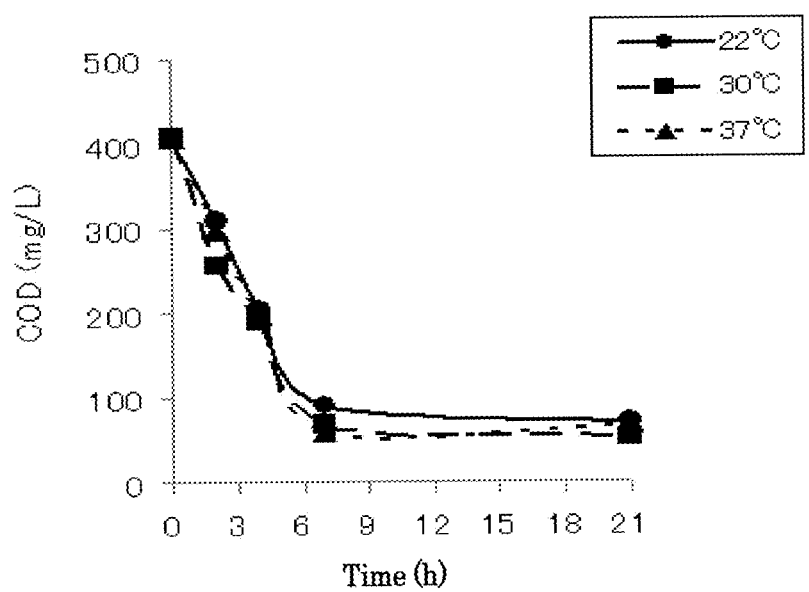
FIG. 4 is a graph of results of Test Example 1, showing an effect of treatment temperatures in a treatment method for salt-containing organic waste liquid of the present invention. The ordinate denotes COD (mg/L). The abscissa denotes time (h).

The results are shown in FIG. 4. Although the greatest reduction rate in the COD value; i.e., 85.2%, was observed in the test group at 37° C. after 7 hours passed, no substantial difference could be found between the test groups treated at the respective temperatures.

Test Example 2

The treatment was performed with shaking in the same manner as in Test Example 1 except that the temperature condition was changed to 37° C., 40° C. or 45° C. to measure the COD value.

Figure 5:
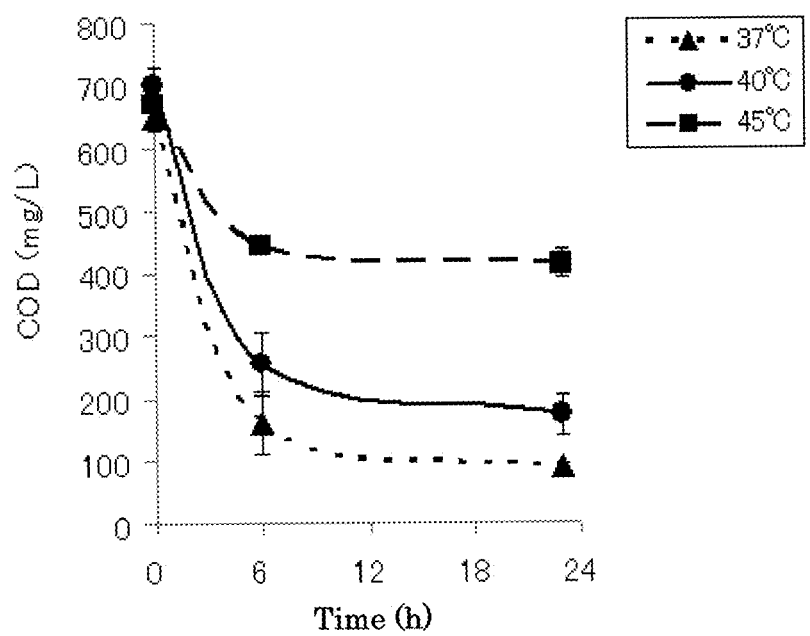
FIG. 5 is a graph of results of Test Example 2, showing an effect of treatment temperatures in a treatment method for salt-containing organic waste liquid of the present invention. The ordinate denotes COD (mg/L). The abscissa denotes time (h).

The results are shown in FIG. 5. The COD reduction rate of the test group of 40° C. was lower by about 11% than that of the test group of 37° C., and was also lower by about 31% than that of the test group of 45° C. Furthermore, in the test group of 45° C., most of the Scuticociliatida were in a dormant state (i.e., a cyst form).

Figure 6A:
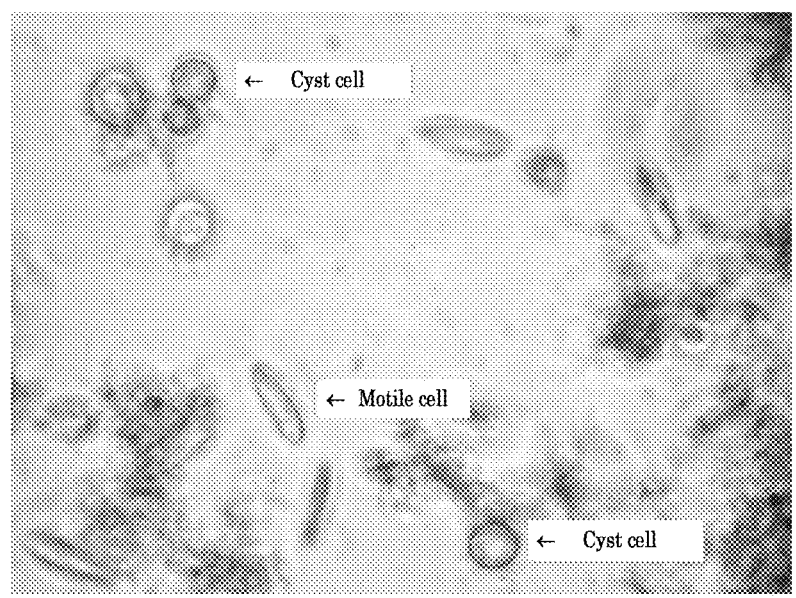
FIG. 6A is a phase contrast micrograph of motile cells and cyst cells of Scuticociliatida.
Figure 6B:
FIG. 6B is an enlarged micrograph of the cyst cells of Scuticociliatida of FIG. 6A.

FIG. 6A is a phase contrast micrograph showing forms of the motile cells and the cyst cells. FIG. 6B is an enlarged micrograph of the cyst cells only.

Test Example 3

The following high-temperature resistance test of the Scuticociliatida was performed in order to study whether the Scuticociliatida heated at a predetermined temperature for a certain period could treat waste liquid at a temperature at which the Scuticociliatida can grow.

10 mL ($6.0 \times 10^4$ individuals/mL) (n=2) of the Scuticociliatida was prepared and heated at a temperature of 40° C., 45° C. or 50° C. for 30 minutes or 60 minutes. After heating, the above Scuticociliatida solution (10 mL) was mixed with 90 mL of the waste liquid of enzymatically decomposed jellyfish. The mixture was aerobically treated at 22° C. with shaking at 180 rpm to measure a change in the COD value over time.

Figure 7A:
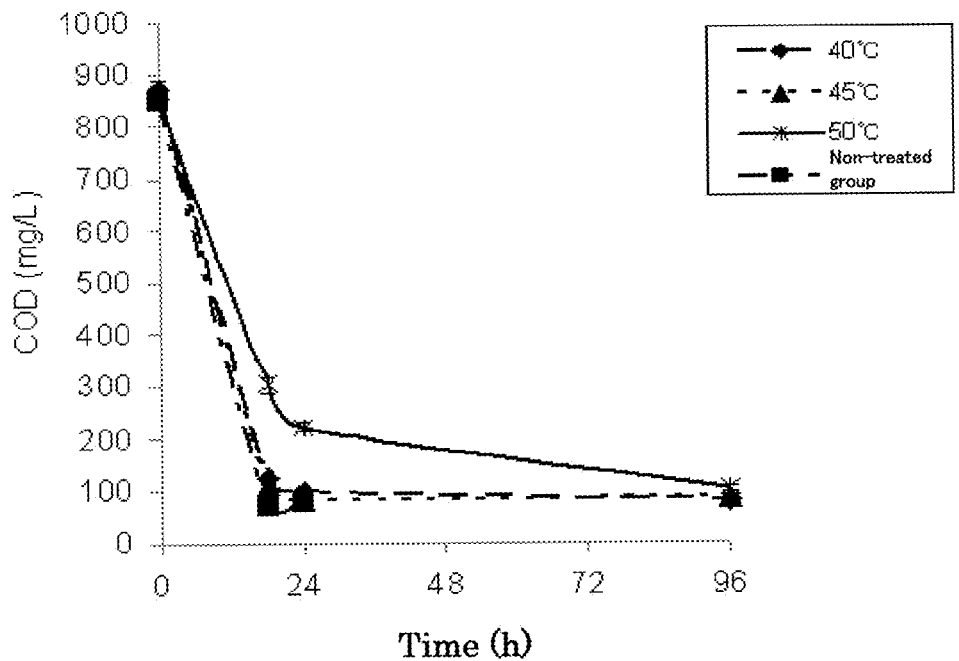
FIG. 7A is a graph of results of Test Example 3, showing results of a high-temperature resistance test of Scuticociliatida. The ordinate denotes COD (mg/L). The abscissa denotes time (h).
Figure 7B:
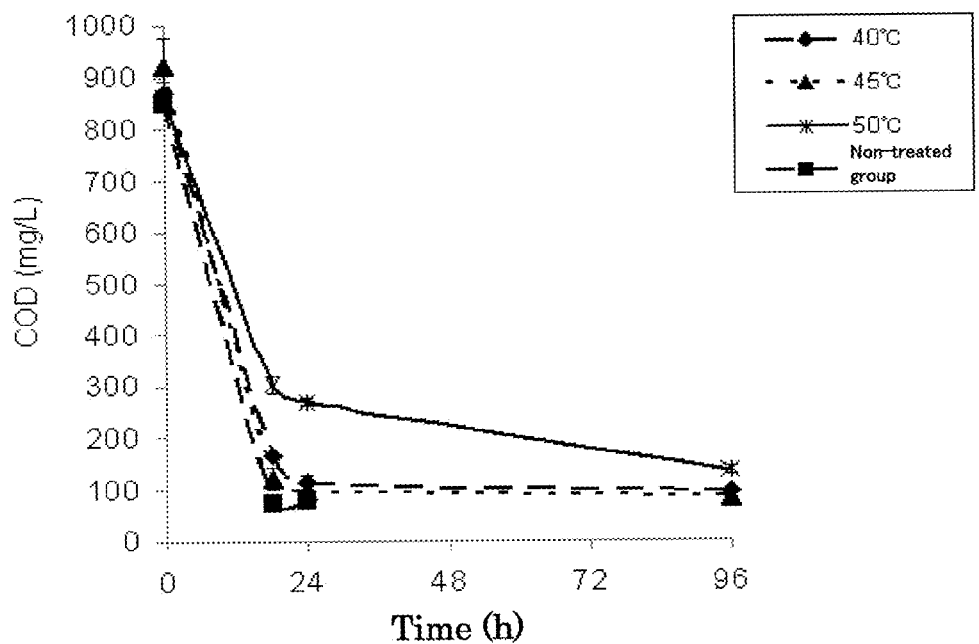
FIG. 7B is a graph of results of Test Example 3, showing results of a high-temperature resistance test of Scuticociliatida. The ordinate denotes COD (mg/L). The abscissa denotes time (h).

The results obtained when the heating was performed for 30 minutes are shown in FIG. 7A, and the results obtained when the heating was performed for 60 minutes are shown in FIG. 7B.

As is clear from the results of FIG. 7A, after the heating treatment, the Scuticociliatida turned into a cyst in each of the test groups treated at the respective temperatures, and no motile Scuticociliatida was observed. However, within 18 hours after treatment under aeration at 22° C., the Scuticociliatida returned to motile form from cyst form (i.e., a dormant state). Even after the form of the Scuticociliatida returned to motile form from cyst form, there was observed for a while motile Scuticociliatida bulked more than the normal state. However, the motile Scuticociliatida returned to the normal form 4 days after the start of the treatment under aeration. The COD value in the test group of 50° C. was reduced more slowly than the other test groups, but after 96 hours, the COD value was reduced to about 100 mg/L similar to the test groups of 40° C. and 45° C. The test groups of 40° C. and 45° C. exhibited almost the same COD reduction profile as the non-treated test group; i.e., the COD value was reduced to about 100 mg/L within 24 hours.

As is clear from the results of FIG. 7B, after the heating treatment, the Scuticociliatida turned into a cyst in each of the test groups treated at the respective temperatures, and no motile Scuticociliatida was observed. However, within 18 hours after treatment under aeration at 22° C., the Scuticociliatida returned to motile form from cyst form (i.e., a dormant state). Even after the form of the Scuticociliatida returned to motile form from cyst form, there was observed for a while motile Scuticociliatida bulked more than the normal state. However, the motile Scuticociliatida returned to the normal state 4 days after the start of the treatment under aeration. The test groups of 40° C. and 45° C. exhibited almost the same COD reduction profile as the non-treated test group; i.e., the COD value was reduced to about 100 mg/L within 24 hours. The COD value in the test group of 50° C. was reduced more slowly than the other test groups, but after 96 hours, the COD value was reduced to about 130 mg/L similar to the test groups of 40° C. and 45° C. Since the period of heating was longer than by 30 minutes than the treatment test heated for 30 minute shown in FIG. 7A, it took a longer time for the Scuticociliatida to recover from cyst form to motile form than in the treatment test heated for 30 minutes. In particular, the COD value of the test group of 50° C. was reduced slowly.

Test Example 4

The high-temperature resistance test of Scuticociliatida was performed in the same manner as in Test Example 3 except that the time of the heating treatment was changed to 180 minutes and the treatment temperature was changed to 45° C., 50° C., 55° C. or 60° C., to thereby measure the COD value. Note that, a control group for the test groups treated at the respective temperatures was room temperature (about 25° C.).

Figure 8:
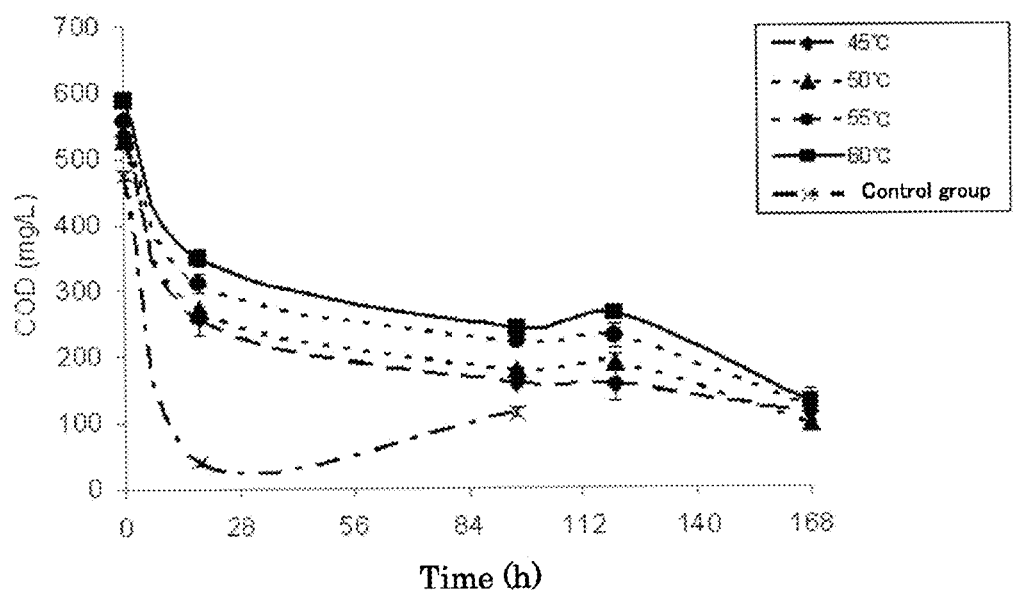
FIG. 8 is a graph of results of Test Example 4, showing results of a high-temperature resistance test of Scuticociliatida. The ordinate denotes COD (mg/L). The abscissa denotes time (h).

The results are shown in FIG. 8. As is clear from the results of FIG. 8, most of the Scuticociliatida, which were heated at each test temperature for 180 minutes and used to treat the waste liquid of enzymatically decomposed jellyfish under aeration at 22° C., turned into a cyst for 4 days after the treatment under aeration in all the test groups except the control group. Motile Scuticociliatida was observed from after 4 days to 5 days, indicating that it took 5 days for the Scuticociliatida heated at 45° C. or higher for 180 minutes to return to motile form even after the conditions had been returned to the normal grow temperature. In addition, the Scuticociliatida returned to motile form was bulked more than the normal form. The COD value was reduced to about 200 mg/L only on the 5th day, and the solid-liquid separation was insufficient and the transparency of the supernatant was low. Presumably, the COD reduction until the 4th day in the test groups treated at 45° C. or higher was caused by bacteria co-existing with the Scuticociliatida.

After the Scuticociliatida completely returned to motile form and grew, the COD value of the salt-containing organic waste liquid was further reduced to about 100 mg/L to about 200 mg/L, and the solid-liquid separation was sufficient and the transparency of the supernatant was high.

Test Example 5

Studies were made on the reduction in the COD by the Scuticociliatida and the growth of the Scuticociliatida under low-temperature conditions. The low-temperature conditions were set to 4° C. The reduction in the COD by the Scuticociliatida and the growth of the Scuticociliatida at this temperature were compared with those at 30° C. which is optimal temperature conditions for treatment with the Scuticociliatida shown in Test Example 1.

Specifically, the Scuticociliatida was pre-cultured with shaking at 30° C. and 180 rpm for one day under aerobic conditions and then was used for the following test. 5 mL of the pre-cultured liquid of the Scuticociliatida was mixed with 95 mL of the waste liquid of enzymatically decomposed jellyfish. The mixture was aerobically treated with shaking at 180 rpm and 4° C. or 30° C., and the COD value was measured.

Figure 9:
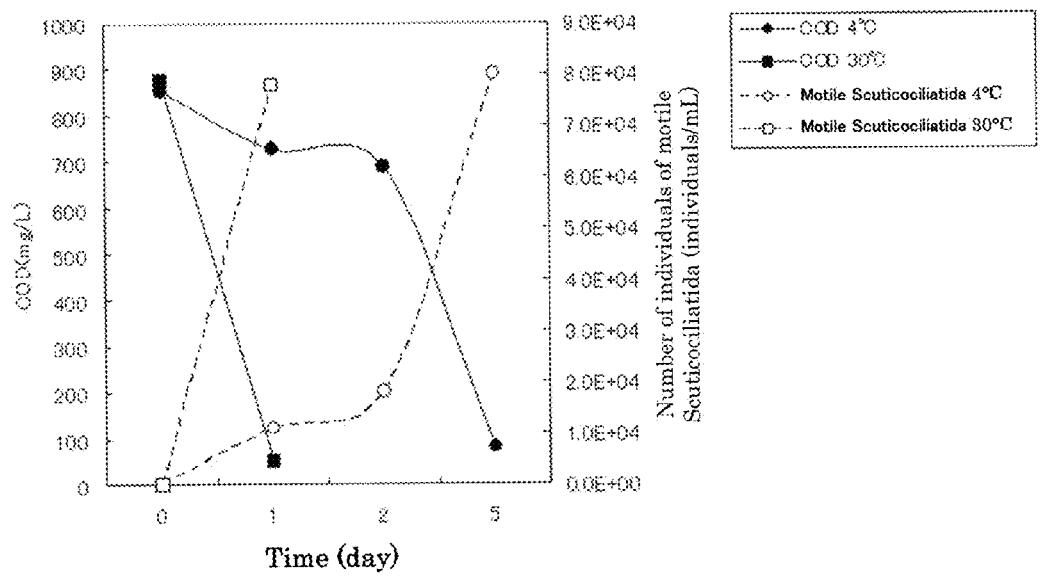
FIG. 9 is a graph of results of Test Example 5, showing an effect of treatment temperatures in a treatment method for salt-containing organic waste liquid of the present invention on reduction of COD and growth of Scuticociliatida. The left-hand ordinate denotes COD (mg/L). The right-hand ordinate denotes the number of individuals of motile Scuticociliatida (individuals/mL). The abscissa denotes time (h).

FIG. 9 shows the measurements of the COD value and the number of individuals of motile Scuticociliatida. In the test group of 4° C., it took 5 days for the COD value to become 100 mg/L or lower, while in the test group of 30° C. which is optimal conditions, the COD value became about 50 mg/L within 1 day. Furthermore, in the test group of 4° C., it took 5 days for the number of individuals of motile Scuticociliatida to reach about 80,000 per 1 mL, while in the test group of 30° C., the individuals of motile Scuticociliatida reached almost the same number in 1 day.

The above results indicate that the reduction in the COD value is related to the number of individuals of motile Scuticociliatida, and the COD value is reduced as the Scuticociliatida grows. The test group of 4° C. required more time for growth and COD reduction than the test group of 30° C. From the above results, although it takes a longer treatment time than usual, the Scuticociliatida can survive, grow, and change from cyst form to motile form even at 4° C., enabling the COD reduction of the salt-containing organic waste liquid.

Test Example 6

In the same manner as in Test Example 5 except that the COD value was measured 21 hours or 96 hours after, the Scuticociliatida was allowed to grow at 4° C. and the COD value was measured at each point of time. The measurement results of the COD value are shown in FIG. 10.

Figure 10:
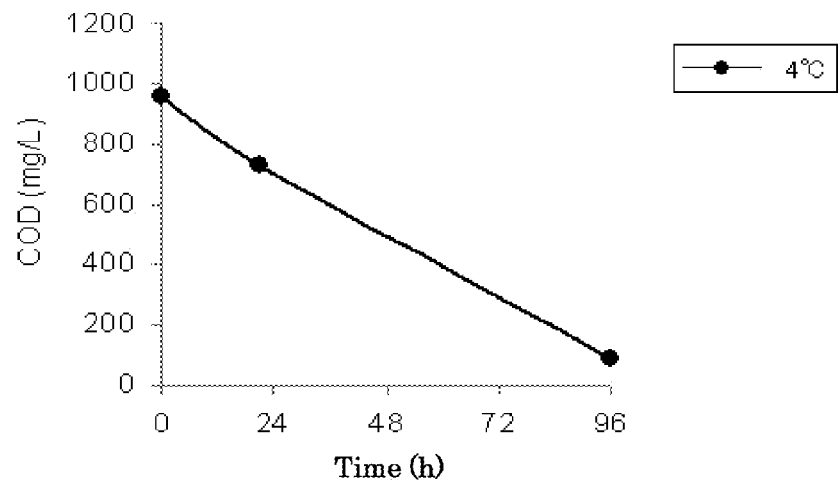
FIG. 10 is a graph of results of Test Example 6, showing results of treatment at a low temperature in a treatment method for salt-containing organic waste liquid of the present invention. The ordinate denotes COD (mg/L). The abscissa denotes time (h).

As is clear from FIG. 10, it was found that the COD value became 80 mg/L at 96 hours after the start of the test at 4° C. This result indicates that the treatment by Scuticociliatida at 4° C. for 4 days could reduce the COD value of the salt-containing organic waste liquid to be 100 mg/L or lower.

Test Example 7

Studies were made on the effects of the pH of the salt-containing organic waste liquid on the COD reduction by treatment with Scuticociliatida.

The pH of the waste liquid of enzymatically decomposed jellyfish was adjusted with hydrochloric acid and/or sodium hydroxide to pH 3.0, pH 4.0, pH 4.2, pH 4.5, pH 4.8, pH 5.0, pH 6.5, pH 8.0, pH 9.0, pH 10.0, pH 10.5, pH 11.0 or pH 11.5. 95 mL of the waste liquid of enzymatically decomposed jellyfish adjusted to each pH was mixed with 5 mL of the Scuticociliatida. The mixture was aerobically treated with shaking at 180 rpm and 30° C. and was measured for COD value and pH at 20 hours after the treatment. Note that, the COD value at the time when the salt-containing organic waste liquid started was found to be 1,003±55 (n=3) mg/L.

Figure 11:
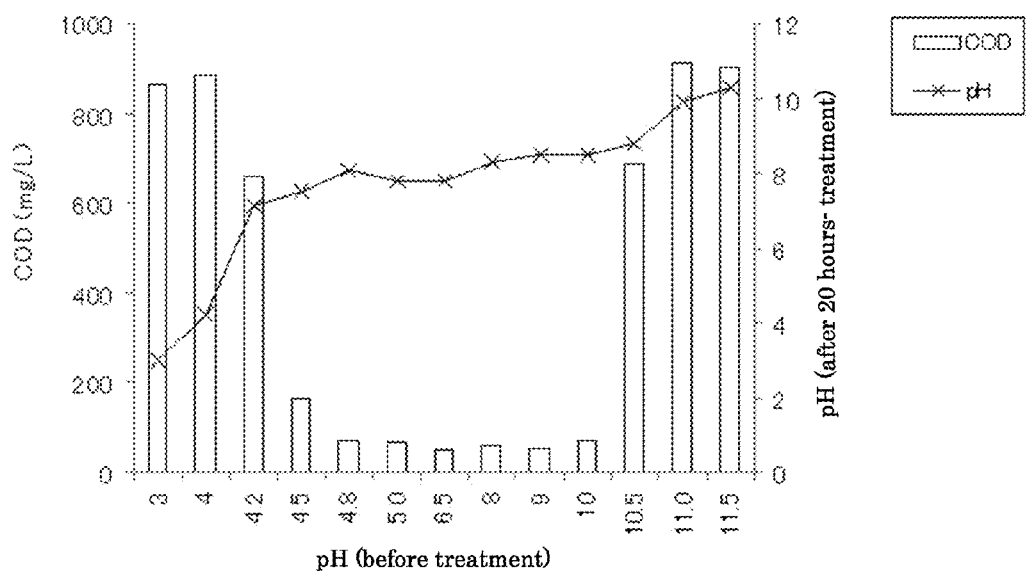
FIG. 11 is a graph of results of Test Example 7, showing an effect of pH in a treatment method for salt-containing organic waste liquid of the present invention. The left-hand ordinate denotes COD (mg/L). The right-hand ordinate denotes pH twenty hours after treatment. The abscissa denotes treatment pH (before treatment).

The results are shown in FIG. 11. As is clear from the results of FIG. 11, in the test groups of pH 4.8 to pH 10.0, the COD value was reduced to be 100 mg/L or lower at about 20 hours after the start of the treatment. Also, these test groups had almost the same pH at about 20 hours after that. Almost no reduction in the COD value was observed in the test groups of pH 3.0, pH 4.0, pH 11.0 and pH 11.5. In the test groups of pH 4.5 and pH 10.5, the COD reduction rate was found to be about 30%.

The above results indicate that the boundary pH at the COD can be reduced is pH 4.5 on the acid side and pH 10.5 on the alkali side.

Also, although this is not shown in FIG. 11, the Scuticociliatida was observed in the salt-containing organic waste liquid treated for 20 hours at pH 4.2 to pH 10.5, indicating that this range of pH was a pH range over which the Scuticociliatida can grow. Meanwhile, in the control group the pH of which was not adjusted, the pH thereof was 6.5 upon the start of the test and was 7.8 after the treatment. Also, the COD value was reduced to 48 mg/L.

Test Example 8

The following test was performed to study the salt concentration at which the Scuticociliatida can treat waste liquid.

The salt concentration of the waste liquid of enzymatically decomposed jellyfish was measured with a seawater concentration meter (PAL-06S, manufactured by Atago Co., Ltd.) and adjusted to 0, 5, 10, 25, 50, 60, 70, 80 or 90.

The salt-containing organic waste liquids having the salt concentrations of 0 to 25 were prepared as followed. Specifically, 0.5% by mass of gelatin and 0.1% by mass of glycerol were added to and dissolved in distilled water. Then, sodium chloride was added to the resultant solution so as to have each of the salt concentrations.

The salt-containing organic waste liquids having the salt concentrations of 5 to 90 were prepared by adding sodium chloride to the waste liquid of enzymatically decomposed jellyfish so as to have each of the salt concentrations.

The Scuticociliatida was pre-cultured with shaking at 180 rpm and 30° C. under aerobic conditions.

Figure 12:
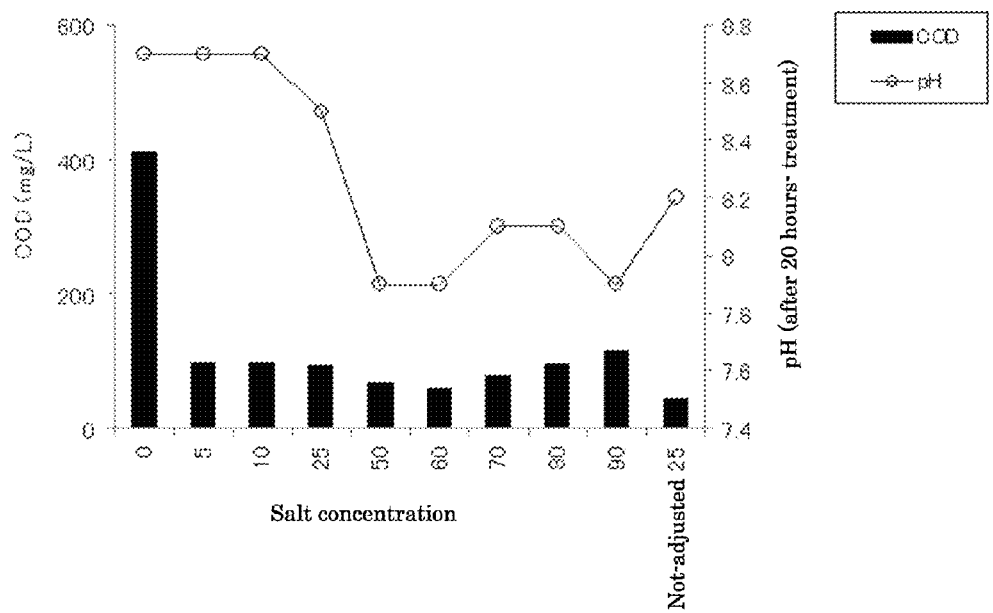
FIG. 12 is a graph of results of Test Example 8, showing an effect of salt concentration in a treatment method for salt-containing organic waste liquid of the present invention. The left-hand ordinate denotes COD (mg/L). The right-hand ordinate denotes pH twenty hours after treatment. The abscissa denotes salt concentration.

95 mL of each of the waste liquids of enzymatically decomposed jellyfish adjusted so as to have the respective salt concentrations was mixed with 5 mL of the Scuticociliatida. The mixture was aerobically treated with shaking at 30° C. and 180 rpm. Note that, a control group was the waste liquid of enzymatically decomposed jellyfish that was not treated. The salt concentration of the control group was found to be 25, and the COD value thereof was found to be 938 mg/L (n=4). The results are shown in FIG. 12. The results of FIG. 12 indicate that the COD value became 100 mg/L or lower at the salt concentrations of 5 to 80 after about 20 hours had passed.

However, although this is not shown in FIG. 12, no Scuticociliatida was observed under a microscope at the salt concentrations of 80 or higher. The Scuticociliatida grew and reduced the COD value at the salt concentrations of lower than 80, but presumably the Scuticociliatida turned into a cyst or died since the salt concentration reached the highest salt concentration at which the Scuticociliatida can grow. At the salt concentration of 0, the COD value could be reduced by only about 56%. As a result of microscopic observation at the salt concentration of 0, only three individuals of motile Scuticociliatida were observed in 15 µL.

The above results indicate that the highest salt concentration at which the Scuticociliatida can grow is lower than 80. Meanwhile, the salt concentration of waste liquid that can be treated was found to be 5 or higher but lower than 80. When the salt concentration is 80 or higher, it is thought that the Scuticociliatida is difficult to repeatedly use for treatment by recycling.

Test Example 9

Studies were made on the relationship between a starter amount (the number of individuals of Scuticociliatida) and COD reduction in treatment of waste with Scuticociliatida.

Scuticociliatida was grown previously and stored at 4° C. The following test was performed after the Scuticociliatida had been stored for 6 days. Note that, the Scuticociliatida after storage at 4° C. for 6 days turned into a cyst, and almost no motile Scuticociliatida was observed.

The Scuticociliatida was mixed with 100 mL of the waste liquid of enzymatically decomposed jellyfish in an amount of 0.1% by volume, 0.5% by volume, 1.0% by volume, 5.0% by volume, 10.0% by volume, 15.0% by volume or 20.0% by volume. The mixture was aerobically treated with shaking at 30° C. and 180 rpm. In the meantime, the COD value was measured over time. The treatment under aeration was performed until the COD value was reduced to a desired value.

The numbers of cysts of Scuticociliatida in the starter amounts are shown in Table 1. The units are all individuals/mL.

TABLE 1

| Amount of Scuticociliatida solution to liquid of enzymatically decomposed jellyfish (% by volume) | Number of cysts in starter amount of Scuticociliatida (individuals/mL) |
| --- | --- |
| 0.1 | $6.0 \times 10^2$ |
| 0.5 | $3.0 \times 10^3$ |
| 1.0 | $6.0 \times 10^3$ |
| 5.0 | $3.0 \times 10^4$ |
| 10.0 | $6.0 \times 10^4$ |
| 15.0 | $9.0 \times 10^4$ |
| 20.0 | $1.2 \times 10^5$ |

Figure 13:
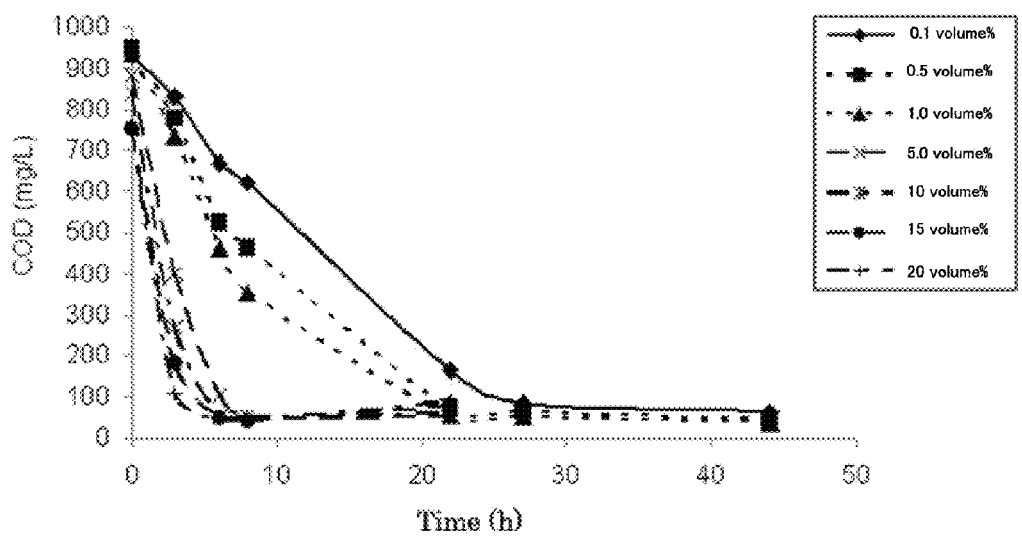
FIG. 13 is a graph of results of Test Example 9, showing an effect of a starter amount of Scuticociliatida in a treatment method for salt-containing organic waste liquid of the present invention. The ordinate denotes COD (mg/L). The abscissa denotes time (h).

The results are shown in FIG. 13. The results of FIG. 13 indicate that the more the starter amount is, the faster the COD reduction is. In the test groups of the starter amounts of 10.0% by volume or more, the COD value was reduced to 100 mg/L or lower at 6 hours after the start of the treatment. After 8 hours had passed, the COD value was reduced to be 100 mg/L or lower in the test groups of the starter amount of 5.0% by volume or more.

However, in the test groups of the starter amounts of 10.0% by volume or more, a slight increase in the COD value was observed at 22 hours after the start of the treatment. This is likely because excess Scuticociliatida was decomposed to increase the COD value of the salt-containing organic waste liquid.

Test Example 10

In order to study the relationship between a starter amount (the number of individuals of Scuticociliatida) and reduction in the COD value in treatment of waste with Scuticociliatida, the same procedure as in Test Example 9 was repeated except that the salt-containing organic waste liquid was changed from the waste liquid of enzymatically decomposed jellyfish to a broth of *Mytilus galloprovincialis*.

Specifically, in terms of reduction in the COD value of the broth of *Mytilus galloprovincialis*, a comparison was made among a case where the starter amount of the Scuticociliatida relative to the broth of *Mytilus galloprovincialis* was 1% by volume ($6.0 \times 10^3$ individuals/mL), a case where the starter amount thereof was 5% by volume ($3.0 \times 10^4$ individuals/mL) and a case where the starter amount thereof was 10% by volume ($6.0 \times 10^4$ individuals/mL).

The broth of *Mytilus galloprovincialis* was prepared as follows. Specifically, *Mytilus galloprovincialis* was immersed in distilled water so as to be 20% by mass, and treated with high-pressure steam at 121° C. for 20 minutes. The salt concentration of the broth of *Mytilus galloprovincialis* was 8, and the pH thereof was 7.0.

The Scuticociliatida stored at 4° C. was mixed with the broth of *Mytilus galloprovincialis* so as to have respective starter concentrations, and the mixtures were aerobically treated with shaking at 22° C. and 180 rpm.

Figure 14:
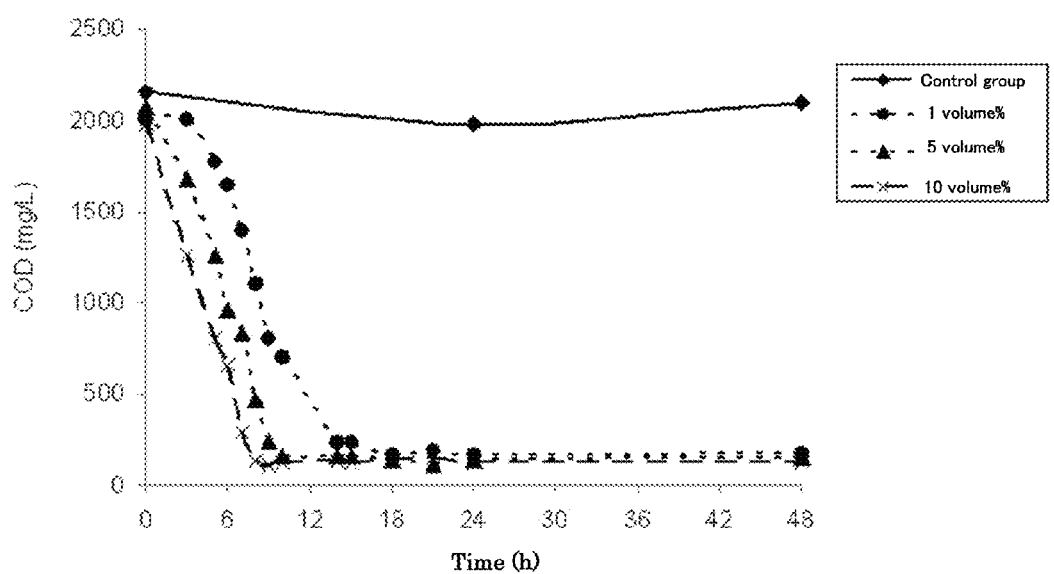
FIG. 14 is a graph of results of Test Example 10, showing an effect of a starter amount of Scuticociliatida in a treatment method for salt-containing organic waste liquid of the present invention. The ordinate denotes COD (mg/L). The abscissa denotes time (h).

The measurement results of the COD value are shown in FIG. 14. The results of FIG. 14 indicate that the COD value was reduced at 3 hours after the start of the treatment and that the more the starter amount of the Scuticociliatida is, the faster the reduction in the COD value is. The COD value was minimum 24 hours after the start of the treatment in the test group of 1% by volume, 21 hours after the start of the treatment in the test group of 5% by volume, and 9 hours after the start of the treatment in the test group of 10% by volume. The above results indicate that even when the salt-containing organic waste liquid is the broth of *Mytilus*

*galloprovincialis*, the more the starter amount is, the faster the reduction in the COD value is, similar to the results of Test Example 9.

Test Example 11

Studies were made about effects of presence or absence of pre-culturing of Scuticociliatida on the COD reduction of the salt-containing organic waste liquid, and on the relationship between a change in the COD value and the number of individuals of Scuticociliatida in each test group.

The pre-culturing of Scuticociliatida was performed under aeration for 1 day with shaking at 22° C. and 180 rpm under aerobic conditions. In the test group without pre-culturing, the previously-grown Scuticociliatida stored at 4° C. was used. In each of the test groups, Scuticociliatida was added to the salt-containing organic waste liquid so as to be 5% by volume ($3.0 \times 10^4$ individuals/mL), followed by treating under aeration at 22° C.

Figure 15A:
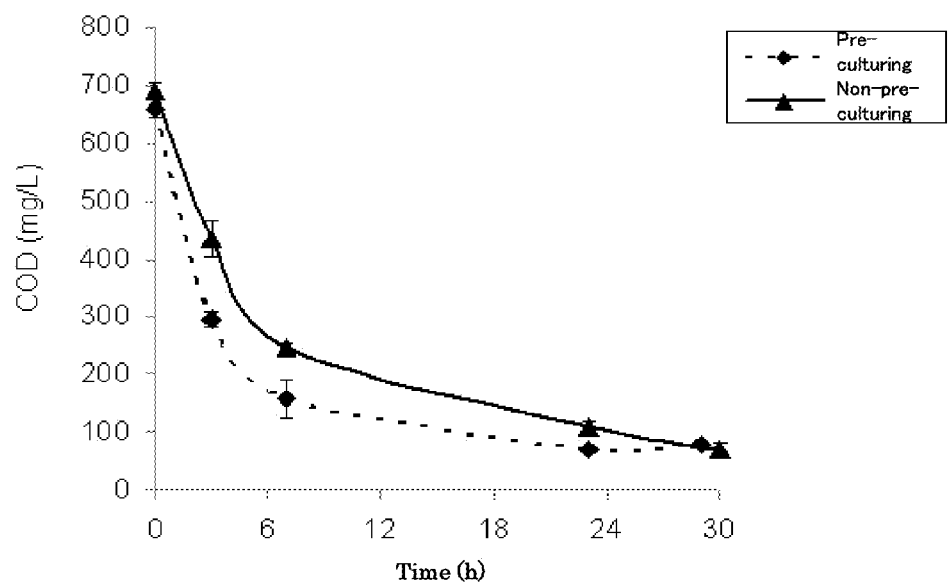
FIG. 15A is a graph of results of Test Example 11, showing an effect of presence or absence of pre-culturing Scuticociliatida in a treatment method for salt-containing organic waste liquid of the present invention. The ordinate denotes COD (mg/L). The abscissa denotes time (h).

FIG. 15A shows comparison results between presence and absence of pre-culturing of the starter of Scuticociliatida in terms of the reduction in the COD value of the salt-containing organic waste liquid in Test Example 11.

In the presence of pre-culturing, the COD value was reduced to be 100 mg/L or lower at 23 hours after the start of the treatment. However, in the test group without pre-culturing, it took about 23 hours for the COD value to become 100 mg/mL or lower. Even 7 hours after the start of the treatment, the COD value of the test group without pre-culturing was higher by about 100 mg/L than that of the test group with pre-culturing.

Figure 15B:
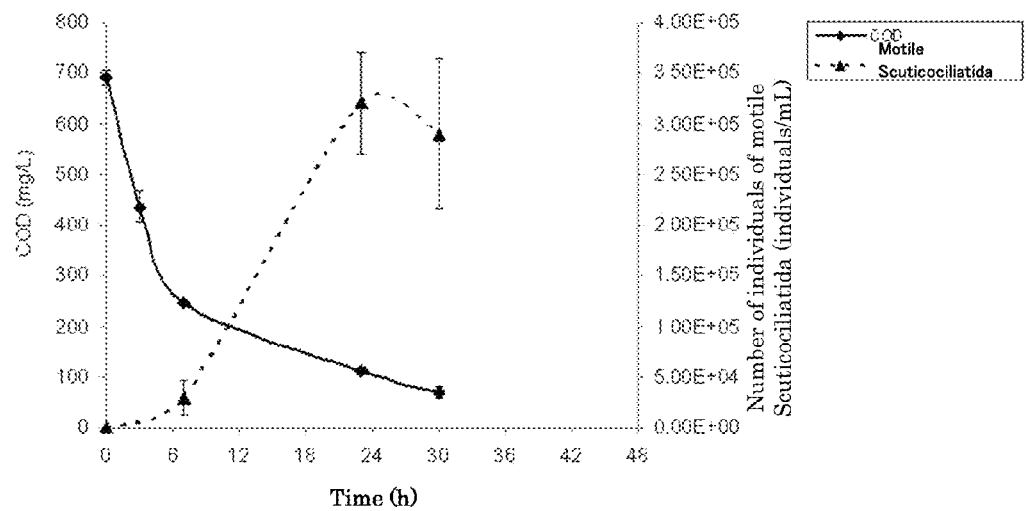
FIG. 15B is a graph of results of Test Example 11, showing an effect of presence or absence of pre-culturing Scuticociliatida in a treatment method for salt-containing organic waste liquid of the present invention. The left-hand ordinate denotes COD (mg/L). The right-hand ordinate denotes the number of motile Scuticociliatida. The abscissa denotes time (h).

FIG. 15B shows the relationship between the treatment time of the salt-containing organic waste liquid and the COD value and the number of individuals of motile Scuticociliatida in the case of Test Example 11 where the starter of the Scuticociliatida was not pre-cultured. In the test group without pre-culturing, the number of individuals of motile Scuticociliatida was maximum 23 hours after and then was reduced.

Figure 15C:
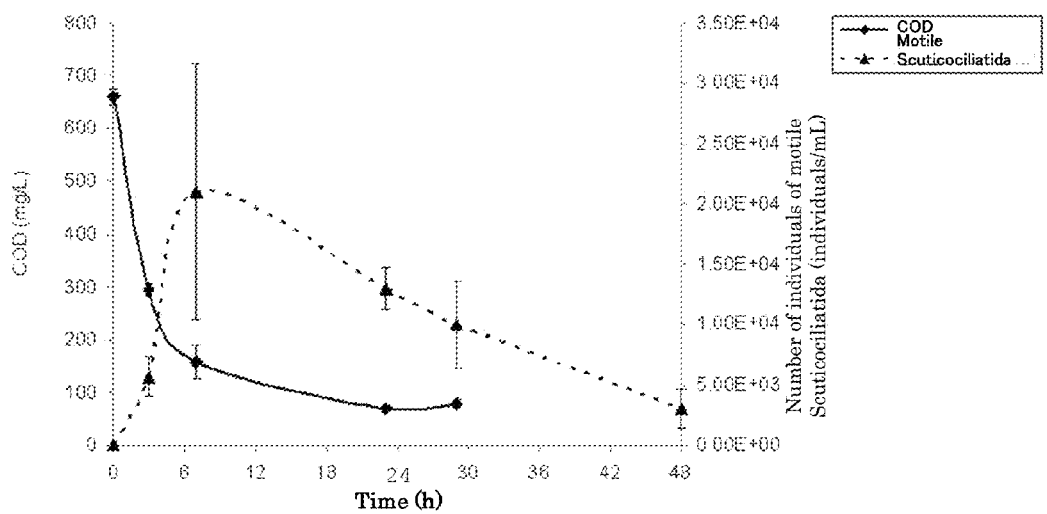
FIG. 15C is a graph of results of Test Example 11, showing an effect of presence or absence of pre-culturing Scuticociliatida in a treatment method for salt-containing organic waste liquid of the present invention. The left-hand ordinate denotes COD (mg/L). The right-hand ordinate denotes the number of motile Scuticociliatida. The abscissa denotes time (h).

FIG. 15C shows the relationship between the treatment time of the salt-containing organic waste liquid and the COD value and the number of individuals of motile Scuticociliatida in the case of Test Example 11 where the starter of the Scuticociliatida was pre-cultured. In the test group with pre-culturing, the number of individuals of motile Scuticociliatida was maximum 7 hours after and then was reduced. In view that it took 23 hours for the number of individuals of motile Scuticociliatida to be maximum in the test group without pre-culturing, it was found that the pre-culturing could make their growth rate faster and also, similar to the results of FIG. 15A, the pre-culturing could make the COD reduction faster in the test group with pre-culturing.

Test Example 12

In terms of reduction in the COD value of the salt-containing organic waste liquid, a comparison was made between presence and absence of a stirring treatment in treating the salt-containing organic waste liquid with Scuticociliatida.

Specifically, a 3-L mini jar fermenter (TSO-MS3L, manufactured by TAKASAKI SCIENTIFIC INSTRUMENTS Co.) was used to stir at 300 rpm a test group with stirring. Note that, in both of the test group with stirring and the test group without stirring, the treatment under aeration was performed at 30° C. and an air flow rate of 3 L/minute, and the COD value and the number of individuals of the Scuticociliatida were measured. Also, the starter amount of Scuticociliatida was set to 2.3% by volume ($1.38 \times 10^4$ individuals/mL) relative to the salt-containing organic waste liquid.

Figure 16A:
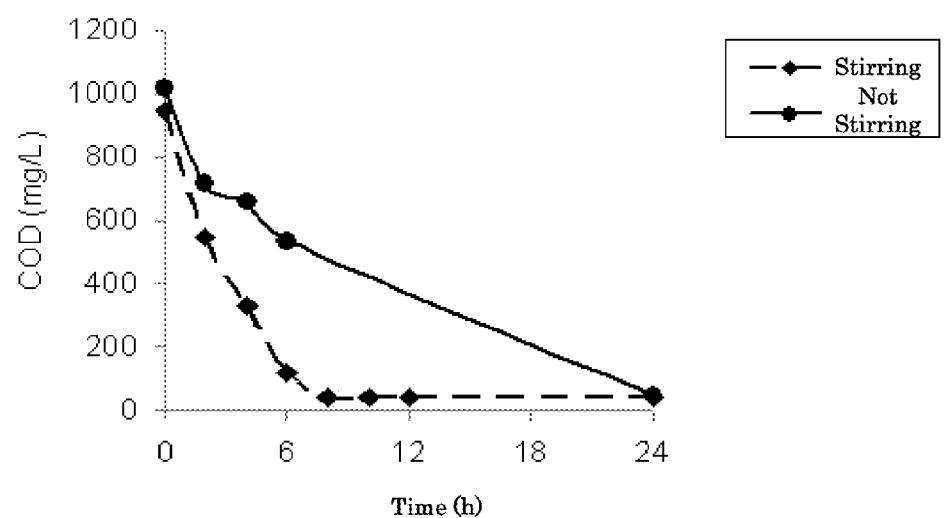
FIG. 16A is a graph of results of Test Example 12, showing an effect of presence or absence of a stirring treatment in a treatment method for salt-containing organic waste liquid of the present invention. The ordinate denotes COD (mg/L). The abscissa denotes time (h).
Figure 16B:
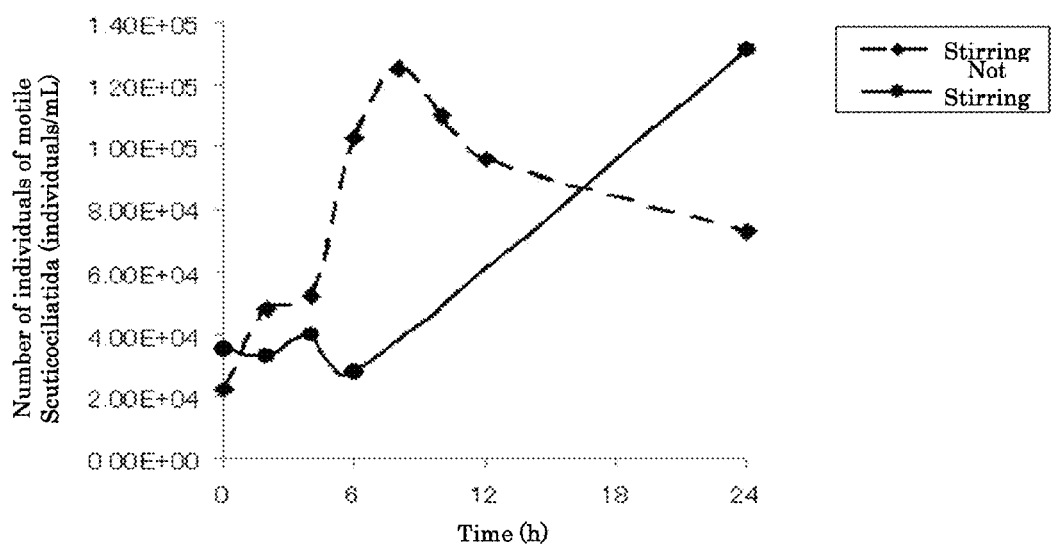
FIG. 16B is a graph of results of Test Example 12, showing an effect of presence or absence of a stirring treatment in a treatment method for salt-containing organic waste liquid of the present invention. The ordinate denotes the number of motile Scuticociliatida. The abscissa denotes time (h).

FIG. 16A shows the relationship between the treatment time of the salt-containing organic waste liquid and the measurement results of the COD value. FIG. 16B shows the relationship between the treatment time of the salt-containing organic waste liquid and the number of individuals of motile Scuticociliatida.

The results of FIG. 16A indicate that 6 hours after the start of the treatment, the COD value was about 120 mg/L in the test group with stirring but was about 530 mg/L in the test group without stirring.

Also, the results of FIG. 16B indicate that the number of individuals of motile Scuticociliatida in the test group with stirring was maximum; i.e., $1.25 \times 10^5$ individuals/mL, 8 hours after the start of the treatment. Meanwhile, in the test group without stirring, the number of individuals of motile Scuticociliatida was $2.8 \times 10^4$ individuals/mL even 6 hours after the start of the treatment, and was about 30% of the number of the Scuticociliatida in the test group with stirring after the same period had passed. However, 24 hours after the start of the treatment, the number of individuals of motile Scuticociliatida in the test group without stirring was almost the same as the maximum number of individuals of motile Scuticociliatida in the test group with stirring.

The mini jar fermenter used in Test Example 12 is provided with two air inlet (inner diameter: 5 mm) at the central portion of the bottom of the fermentation chamber. In test group without stirring, presumably, sufficient effects of aeration were not obtained especially at the circumference of the bottom of the jar fermenter, which prevented supply of oxygen necessary for the growth of Scuticociliatida and the ensuing reduction in the COD value.

Test Example 13

In terms of COD reduction effects on the salt-containing organic waste liquid, a comparison was made between Scuticociliatida and activated sludge actually used in a sewage treatment plant. Routinely-used activated sludge was kindly provided by Yamazaki purification center in Kamakura city.

Specifically, routinely-used activated sludge or Scuticociliatida was mixed with the salt-containing organic waste liquid so as to be 5% by volume, and the mixtures were treated under aeration at 30° C. for 17 hours. After that, the COD value was measured. Note that, as a control group, only the salt-containing organic waste liquid without activated sludge or Scuticociliatida was used.

Figure 17:
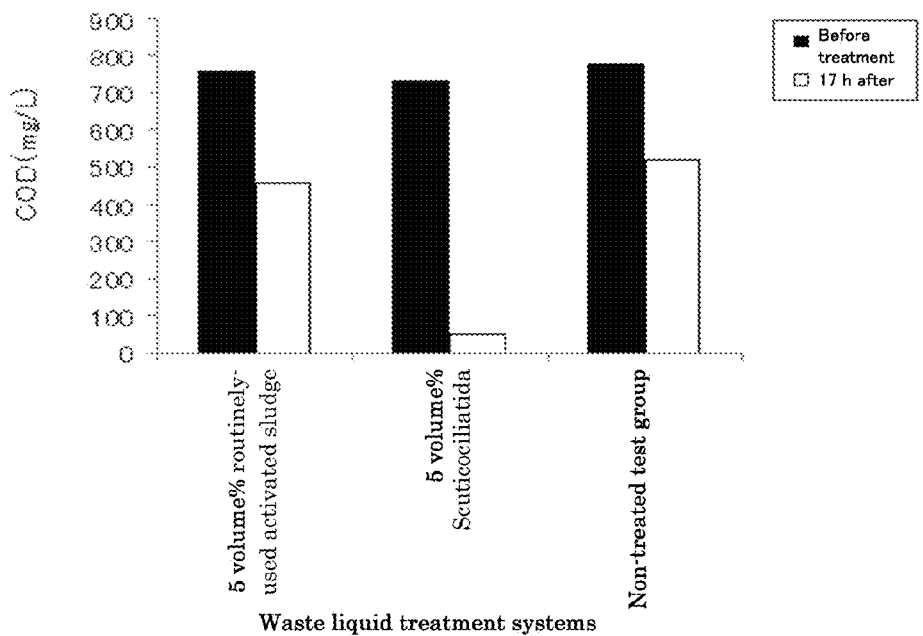
FIG. 17 is a graph of results of Test Example 13, showing results obtained by comparing a treatment method for salt-containing organic waste liquid of the present invention with a conventional treatment method using routinely-used activated sludge. The ordinate denotes COD (mg/L). The abscissa denotes waste liquid treatment system.

The results are shown in FIG. 17. The results of FIG. 17 indicate that after 17 hours had passed, the test group of routinely-used activated sludge showed about 40% COD reduction rate, while the test group of Scuticociliatida showed about 93% COD reduction rate. The control group without activated sludge or Scuticociliatida showed about 33% COD reduction rate. Although this is not shown in the figure, cysts of individuals of protozoan organisms were somewhat observed under a microscope in the waste liquid after 17 hours had passed in the test group of routinely-used activated sludge, but no protozoan organism having a normal state was observed. Also, sufficient growth of bacteria was observed under a microscope. In the test group of Scuticociliatida, active growth of the Scuticociliatida was observed, but only a few bacteria were observed.

In the control group, neither protozoan organisms nor metazoan organisms were observed, and growth of bacteria was observed.

One possible reason why the protozoan organisms and the metazoan organisms cannot grow in the test group of routinely-used activated sludge is that the osmotic pressure of the salt-containing organic waste liquid in the presence of salt was higher than normal waste freshwater, which inhibits their growth.

Test Example 14

The bacterial pellets of Comparative Example 1 was added to 60 L of the waste liquid of enzymatically decomposed jellyfish in an amount of 0.2% by mass, 1.3% by mass, 2.7% by mass or 4.0% by mass. Separately, Scuticociliatida was added to 60 L of the waste liquid of enzymatically decomposed jellyfish in an amount of 10% by mass.

Each test group was treated under aeration at room temperature (about 25° C.) for 72 hours (3 days) at an air flow rate of 3 L/minute, and then measured for COD value.

Figure 18:
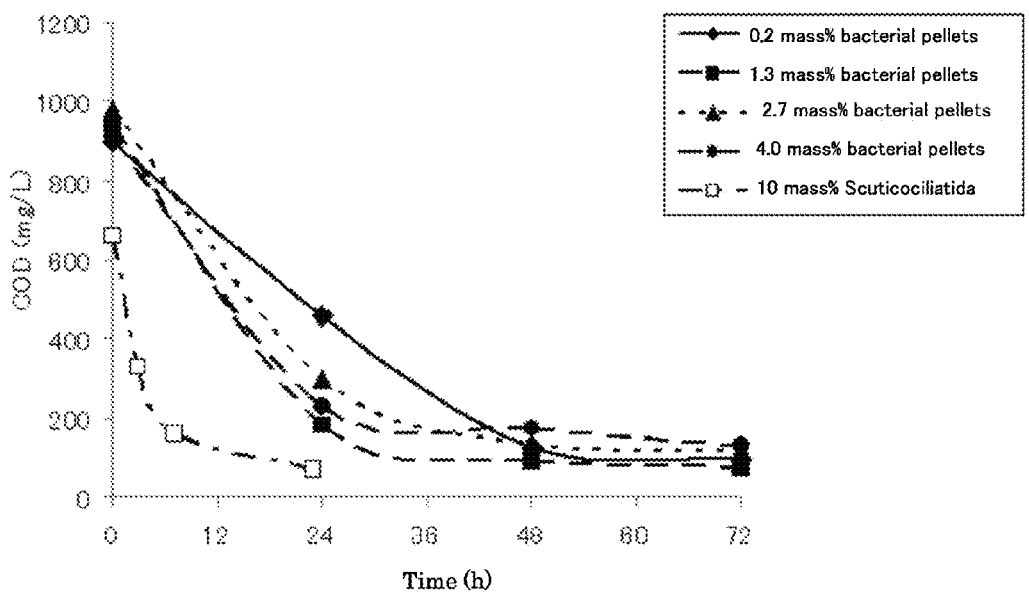
FIG. 18 is a graph of results of Test Example 14, showing results obtained by comparing a treatment method for salt-containing organic waste liquid of the present invention with a conventional treatment method using bacterial pellets. The ordinate denotes COD (mg/L). The abscissa denotes time (h).

The results are shown in FIG. 18. Regardless of the amount of the bacterial pellets, all the test groups of bacterial pellets took 72 hours (3 days) for making the COD reduction rate about 80% or more. Meanwhile, the test group of Scuticociliatida could make the COD reduction rate about 80% or more within 6 hours.

Test Example 15

Studies were made on the relationship between the treatment time and the COD reduction in treating the salt-containing organic waste liquid using as a starter bacteria of 5% by volume or Scuticociliatida of 5% by volume.

The bacteria were prepared by aerobically treating the bacteria described in JP-A No. 2007-863 in the waste liquid of enzymatically decomposed jellyfish with shaking at 27° C. and 180 rpm.

The number of starter individuals of bacteria was set to $3.7 \times 10^9$ individuals/mL, and the number of starter individuals of motile Scuticociliatida was set to $5.7 \times 10^4$ individuals/mL. In both of the test group of bacteria and the test group of Scuticociliatida, 5 mL of bacteria or Scuticociliatida as a starter amount was mixed with 95 mL of the waste liquid of enzymatically decomposed jellyfish, and the mixtures were aerobically treated with shaking at 27° C. and 180 rpm for 30 hours. Then, the COD value and the number of individuals of motile Scuticociliatida were measured.

Figure 19:
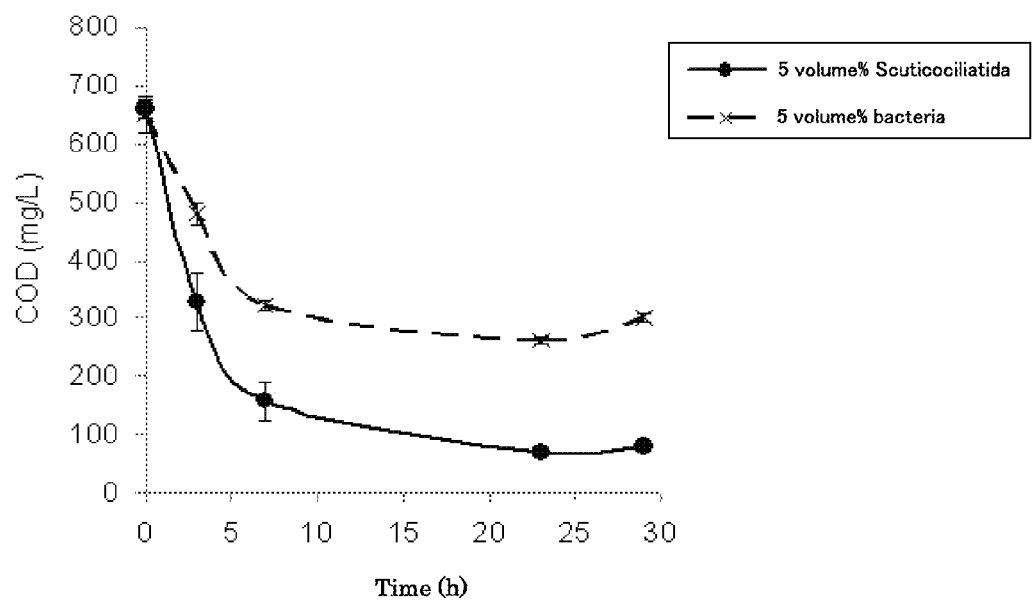
FIG. 19 is a graph of results of Test Example 15, showing results obtained by comparing a treatment method for salt-containing organic waste liquid of the present invention with a conventional treatment method using bacteria. The ordinate denotes COD (mg/L). The abscissa denotes time (h).

The results are shown in FIG. 19. The results of FIG. 19 indicate that 3 hours after the start of the treatment, the COD value of the test group of bacteria was higher by about 150 mg/L than that of the test group of Scuticociliatida, that 7 hours after that, the COD value of the test group of bacteria was higher by about 180 mg/L than that of the test group of Scuticociliatida, and that 23 hours after that, the COD value of the test group of bacteria was higher by about 190 mg/L than that of the test group of Scuticociliatida.

These results indicate that the Scuticociliatida is much superior to the bacteria in treatment performances such as COD reduction rate and treatment speed.

Test Example 16

Each of the following test groups (I) to (III) was treated under aeration at 22° C. and an air flow rate of 2 L/minute and was measured for COD value by the following method. The treatment time was appropriately selected depending on the measurements of the COD value, and the test group (I) was treated for 7 days and the test groups (II) and (III) were treated for 3 days.

(I) Test group where 5 g of the bacterial pellets of Comparative Example 1 was added to 100 mL of the waste liquid of enzymatically decomposed jellyfish (bacterial pellets test group)

(II) Test group where 5 g of the bacterial pellets of Comparative Example 1 and 5 mL of the Scuticociliatida of Example 1 were added to 100 mL of the waste liquid of enzymatically decomposed jellyfish (bacterial pellets+Scuticociliatida test group)

(III) Test group where 5 mL of the Scuticociliatida ($3.0 \times 10^4$ individuals/mL) was adde to 100 mL of the waste liquid of enzymatically decomposed jellyfish
(Scuticociliatida Test Group)

Figure 20:
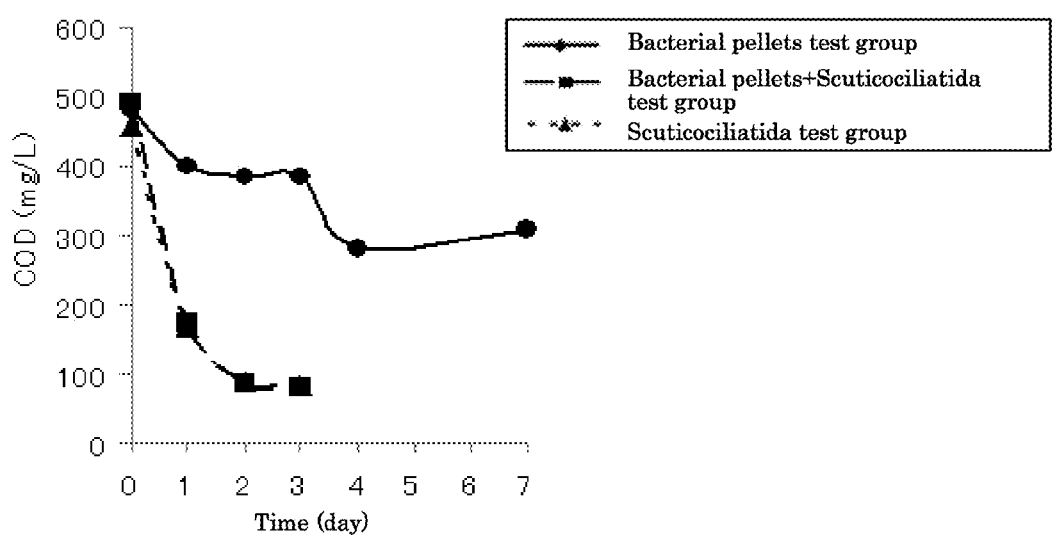
FIG. 20 is a graph of results of Test Example 16, showing results obtained by comparing a treatment method for salt-containing organic waste liquid of the present invention with a conventional treatment method using bacterial pellets. The ordinate denotes COD (mg/L). The abscissa denotes time (h).

The results are shown in FIG. 20. FIG. 20 indicates that in the bacterial pellets test group (I), the COD value was reduced only by about 300 (COD reduction rate: 41.3%) 4 days after the start of the treatment (when the waste liquid of enzymatically decomposed jellyfish and the bacterial pellets were brought into contact with each other), but in the Scuticociliatida test group (III), the COD value was reduced to be 100 or lower at 2 days after the start of the treatment (COD reduction rate: 83.5%). The COD reduction in the bacterial pellets+Scuticociliatida test group (II), where the Scuticociliatida and the bacterial pellets had been mixed together, was almost the same as that in the Scuticociliatida test group (III).

Test Example 17

Each of the test groups (I) to (III) was treated in the same manner as in Test Example 16 except that the temperature conditions were changed from 22° C. to 30° C.

Figure 21:
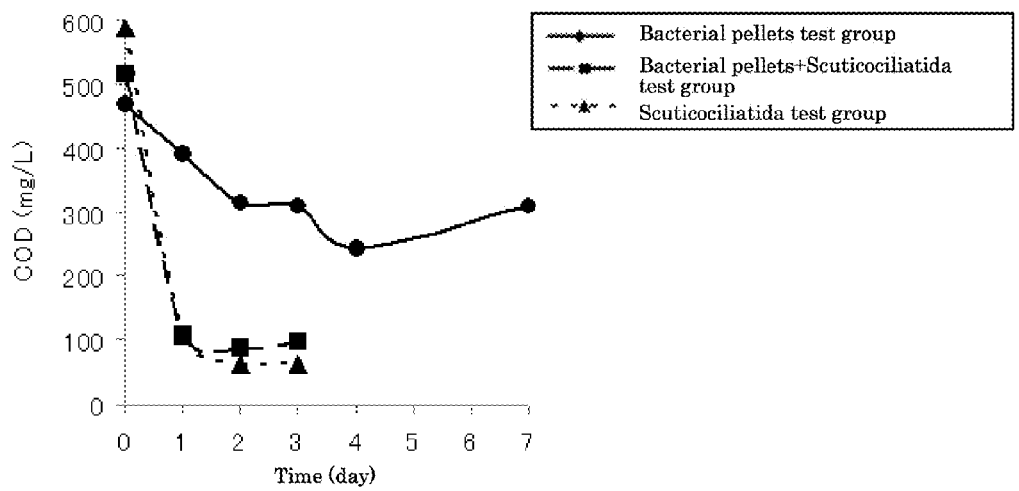
FIG. 21 is a graph of results of Test Example 17, showing results obtained by comparing a treatment method for salt-containing organic waste liquid of the present invention with a conventional treatment method using bacterial pellets. The ordinate denotes COD (mg/L). The abscissa denotes time (h).

The results are shown in FIG. 21. Even at 30° C., similar to Test Example 16, the COD reduction in the Scuticociliatida test group (III) was faster than that in the bacterial pellets test group (I), and the COD reduction in the bacterial pellets+Scuticociliatida test group (II), where the Scuticociliatida and the bacterial pellets had been mixed together, was almost the same as that in the Scuticociliatida test group (III). However, the bacterial pellets+Scuticociliatida test group (II) required one more day than the Scuticociliatida test group (III) for making the COD reduction rate 80%.

Test Example 18

The following test was performed to apply Scuticociliatida for treatment of waste liquid of high-salt-concentration food.

Fish sauce (Noto fish sauce: manufactured by YAMATO SOYSAUCE CO., LTD.), light soysauce (organic light soysouce: manufactured by HIGASHIMARU SHOYU CO., LTD.) or dark soysauce (Amaminosato: AMAMI SANGYO CO., LTD.) was diluted with distilled water so as to have a salt concentration of 70, which is the highest salt concentration shown in Test Example 8 at which the Scuticociliatida can treat waste liquid. The Scuticociliatida stored at 4° C. was mixed with the diluted soysauce so as to be 10% by volume ($6.0 \times 10^4$ individuals/mL), and the mixture was aerobically treated with shaking at 30° C. and 180 rpm. The following three kinds of soysauce were used in Test Example 18.

As a result of measurement of the COD value of each original soysauce, the COD value of the fish sauce was 21,216 mg/L, that of the light soysauce was 91,140 mg/L, and that of the dark soysauce was 92,000 mg/L.

Figure 22:
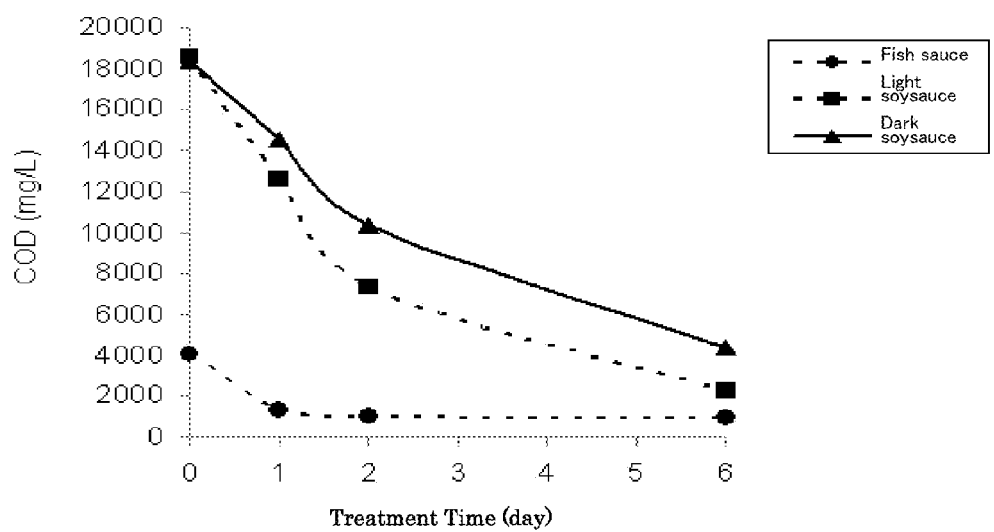
FIG. 22 is a graph of results of Test Example 18, showing results of treatment of waste water of foods having a high salt concentration using a treatment method for salt-containing organic waste liquid of the present invention. The ordinate denotes COD (mg/L). The abscissa denotes treatment day (day).

The results are shown in FIG. 22. The results of FIG. 22 indicate that the COD value was reduced in any of the test groups as time passed. At 6 days after the start of the treatment, the COD reduction rate in the test group of fish sauce was about 77%, the COD reduction rate in the test group of light soysauce was about 88%, and the COD reduction rate in the test group of dark soysauce was about 77%. These results indicate that Scuticociliatida can also treat food waste liquid having a high COD value and a high salt concentration as the salt-containing organic waste liquid.

Test Example 19

Studies were made on treatment of well-boiled broths of marine animals with Scuticociliatida. Specifically, Test Example 19 studied the relationship between the treatment time and the COD value when a broth of *Mytilus galloprovincialis*, *Mizuhopecten yessoensis* or *Hemigrapsus sanguineus* as salt-containing organic waste liquid was treated or not treated with Scuticociliatida.
—Preparation of a Broth of *Mytilus galloprovincialis*—

A broth of *Mytilus galloprovincialis* was prepared by immersing *Mytilus galloprovincialis* in distilled water so as to be 30% by mass, and the mixture was treated with high-pressure steam at 121° C. for 20 minutes. The salt concentration of the broth was measured and found to be about 7.
—Preparation of a Broth of *Mizuhopecten yessoensis*—

A broth of *Mizuhopecten yessoensis* was prepared by immersing *Mizuhopecten yessoensis* in distilled water so as to be 11.7% by mass, and the mixture was treated with high-pressure steam at 121° C. for 20 minutes. The salt concentration of the broth was measured and found to be about 9.
—Preparation of a Broth of *Hemigrapsus sanguineus*—

A broth of *Hemigrapsus sanguineus* was prepared by immersing *Hemigrapsus sanguineus* in distilled water so as to be 22.5% by mass, and the mixture was treated with high-pressure steam at 121° C. for 20 minutes. The salt concentration of the broth was measured and found to be about 8.

The Scuticociliatida stored at 4° C. was added to each of the thus-prepared broths of *Mytilus galloprovincialis*, *Mizuhopecten yessoensis* and *Hemigrapsus sanguineus* so as to be 5% by volume ($3.0 \times 10^4$ individuals/mL). The mixtures were aerobically treated with shaking at 22° C. and 180 rpm.

Figure 23A:
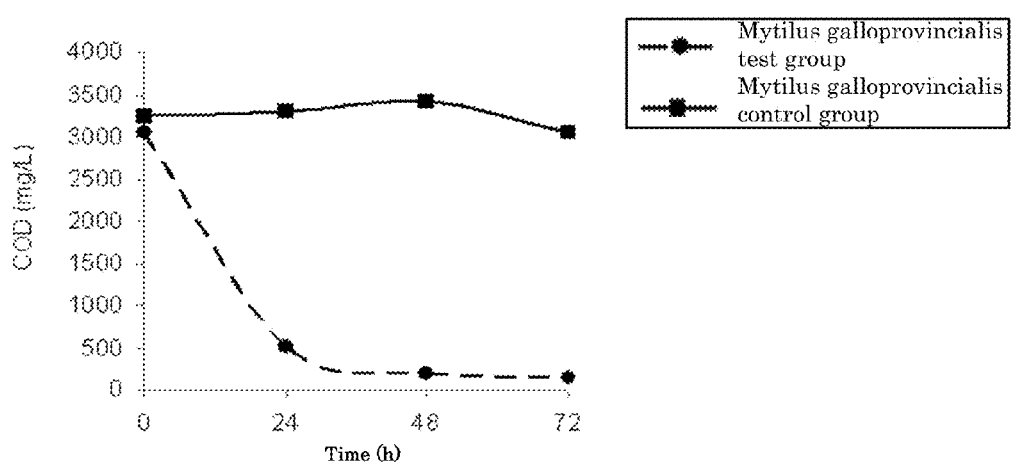
FIG. 23A is a graph of results of Test Example 19, showing results obtained by treating a broth of *Mytilus galloprovincialis* in a treatment method for salt-containing organic waste liquid of the present invention. The ordinate denotes COD (mg/L). The abscissa denotes time (h).
Figure 23B:
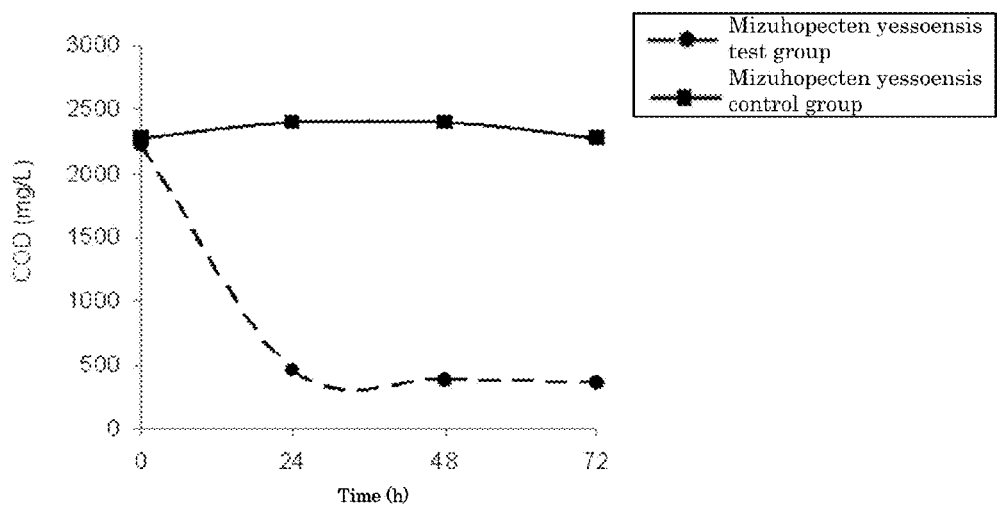
FIG. 23B is a graph of results of Test Example 19, showing results obtained by treating a broth of *Mizuhopecten yessoensis* in a treatment method for salt-containing organic waste liquid of the present invention. The ordinate denotes COD (mg/L). The abscissa denotes time (h).

The results of the COD value of the broth of *Mytilus galloprovincialis* are shown in FIG. 23A. The results of the COD value of the broth of *Mizuhopecten yessoensis* are shown in FIG. 23B. The results of the COD value of the broth of *Hemigrapsus sanguineus* are shown in FIG. 23C.

The results of FIG. 23A indicate that the COD reduction rate was about 83% at 24 hours of the treatment in the *Mytilus galloprovincialis* test group treated with the Scuticociliatida. At 72 hours of the treatment, the COD reduction rate was about 95%. Meanwhile, in the *Mytilus galloprovincialis* control group not treated with Scuticociliatida, the COD reduction rate was only about 6% even at 72 hours of the treatment.

The results of FIG. 23B indicate that the COD reduction rate was about 79% at 24 hours of the treatment in the *Mizuhopecten yessoensis* test group treated with the Scuticociliatida. At 72 hours of the treatment, the COD reduction rate was about 84%. Meanwhile, in the *Mizuhopecten yessoensis* control group not treated with Scuticociliatida, the COD reduction rate remained unchanged at 72 hours of the treatment.

Figure 23C:
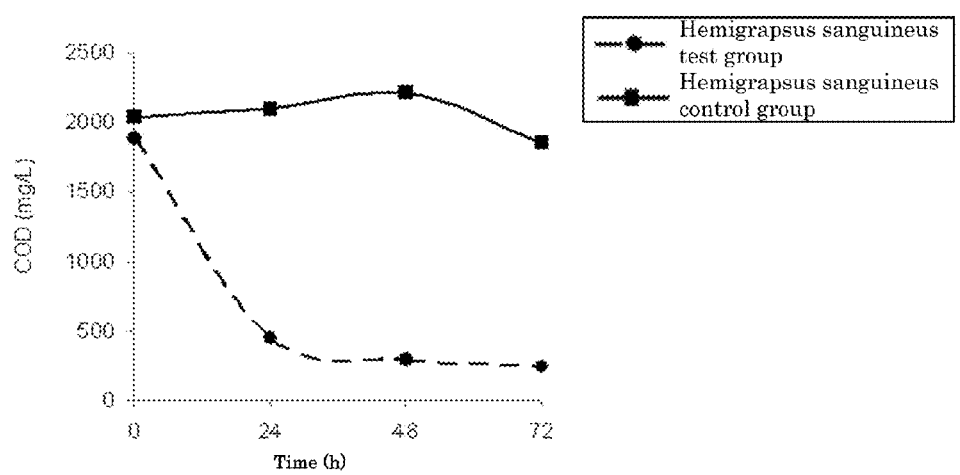
FIG. 23C is a graph of results of Test Example 19, showing results obtained by treating a broth of *Hemigrapsus sanguineus* in a treatment method for salt-containing organic waste liquid of the present invention. The ordinate denotes COD (mg/L). The abscissa denotes time (h).

The results of FIG. 23C indicate that the COD reduction rate was about 76% at 24 hours of the treatment in the *Hemigrapsus sanguineus* test group treated with the Scuticociliatida. At 72 hours of the treatment, the COD reduction rate was about 87%. Meanwhile, in the *Hemigrapsus sanguineus* control group not treated with Scuticociliatida, the COD reduction rate was only about 9%. These results confirm that the Scuticociliatida can reduce the COD value without any problem even when the salt-containing organic waste liquid was broths of other marine animals other jellyfish.

Test Example 20

Studies were made on treatment with Scuticociliatida for salt-containing organic waste liquid previously treated with a thrombolytic enzyme.
—Test Group I (Artificial Seawater+Shellfish Meat+Enzyme+Scuticociliatida)—

50.0 g of shellfish meat of *Mytilus galloprovincialis* separated from its shell was added to 150 mL of distilled water. Then, 5,000 μL of a thrombolytic enzyme, which is a protease produced by *Bacillus subtilis* 104-1-3-1 strain (Accession No: NITE P-680) or a derivative strain thereof, was added to the mixture, and the shellfish meat was treated with the enzyme under stirring at 50° C. for 40 minutes and completely dissolved.

Note that, the enzymatic activity of the original liquid of the thrombolytic enzyme was 5,633 FLV, and the enzymatic activity of the thrombolytic enzyme was 188 FLV upon enzymatic treatment.

Also, in test group I, the residue of the shellfish meat dissolved by the thrombolytic enzyme was 1 g; i.e., about 98% by mass of the shellfish meat was dissolved. The residue contained byssus of *Mytilus galloprovincialis* and part of the shell that could not be removed upon separation of shellfish meat.

The prepared waste liquid of the shellfish meat decomposed by the thrombolytic enzyme was diluted with artificial seawater (salt concentration: 35) so as to be 50% by volume. The Scuticociliatida stored at 4° C. was added to 100 mL of the diluted liquid so as to be 5% by volume ($3.0 \times 10^4$ individuals/mL). The mixture was aerobically treated with shaking at 22° C. and 180 rpm for 72 hours. In the meantime, the COD value was measured over time.
—Test Group II (Artificial Seawater+Shellfish Meat+Scuticociliatida)—

In test group II, 50.0 g of shellfish meat of *Mytilus galloprovincialis* separated from its shell was added to 150 mL of distilled water, and the mixture was stirred at 50° C. for 40 minutes.

The waste liquid of the shellfish meat was diluted with artificial seawater (salt concentration: 35) so as to be 50% by volume. The Scuticociliatida stored at 4° C. was added to 100 mL of the diluted liquid so as to be 5% by volume ($3.0 \times 10^4$ individuals/mL). The mixture was aerobically treated with shaking at 22° C. and 180 rpm for 72 hours. In the meantime, the COD value was measured over time.
—Test Group III (Artificial Seawater+Enzyme+Scuticociliatida)—

In test group III, 5,000 μL of the above thrombolytic enzyme was added to 50 mL of artificial seawater (salt concentration: 35).

The above enzyme solution was diluted with artificial seawater so as to be 50% by volume. The Scuticociliatida stored at 4° C. was added to 100 mL of the diluted liquid so as to be 5% by volume ($3.0 \times 10^4$ individuals/mL). The mixture was aerobically treated with shaking at 22° C. and 180 rpm for 72 hours. In the meantime, the COD value was measured over time.

—Test Group IV (Artificial Seawater+Scuticociliatida)—

In test group IV, 5,000 µL of distilled water was added to 50 mL of artificial seawater (salt concentration: 35).

The above artificial seawater was further diluted with artificial seawater so as to be 50% by volume. The Scuticociliatida stored at 4° C. was added to 100 mL of the diluted liquid so as to be 5% by volume ($3.0 \times 10^4$ individuals/mL). The mixture was aerobically treated with shaking at 22° C. and 180 rpm for 72 hours. In the meantime, the COD value was measured over time.

Figure 24A:
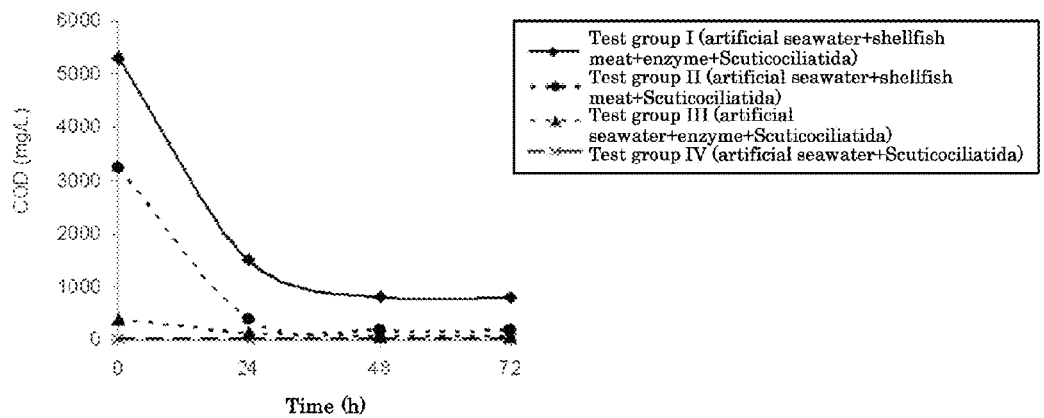
FIG. 24A is a graph of results of Test Example 20, showing results obtained in a case where salt-containing organic waste is treated with a thrombolytic enzyme before use in a treatment method for salt-containing organic waste liquid of the present invention. The ordinate denotes COD (mg/L). The abscissa denotes time (h).

FIG. 24A shows changes in the COD values over time in the test groups I to IV. The results of FIG. 24A indicate that in the test group I using the waste liquid of the shellfish meat decomposed by the enzyme, the COD value was reduced from 5,300 mg/L before the treatment with the Scuticociliatida to 800 mg/L at 72 hours after the start of the test, and the COD reduction rate was about 85%. In the test group II using the waste liquid of the shellfish meat not decomposed by the enzyme (broth at 50° C.), the COD value was reduced from 3,240 mg/L before the treatment with the Scuticociliatida to 185 mg/L at 72 hours after the start of the test, and the COD reduction rate was about 94%. In the test group (test group III) using only the enzyme, the COD value was reduced from 400 mg/L before the treatment with the Scuticociliatida to about 60 mg/L at 72 hours after the start of the test, and the COD reduction rate was about 84%.

Table 2 collectively shows the COD value, salt concentration and pH measured at 72 hours after the start of the treatment.

These results indicate that Scuticociliatida can also treat even a solution of shellfish meat decomposed by an enzyme, similar to the broths of Test Examples 10 and 18.

TABLE 2

| | Test solution | COD (mg/L) | Salt concentration | pH |
|---|---|---|---|---|
| Test group I | Artificial seawater + shellfish meat + enzyme + Scuticociliatida | 13600 | 27 | 6.4 |
| Test group II | Artificial seawater + shellfish meat + Scuticociliatida | 6120 | 14 | 6.4 |
| Test group III | Artificial seawater + enzyme + Scuticociliatida | 1900 | 9 | 7.2 |
| Test group IV | Artificial seawater + Scuticociliatida | 15 | 8 | 6.4 |

Figure 24B:
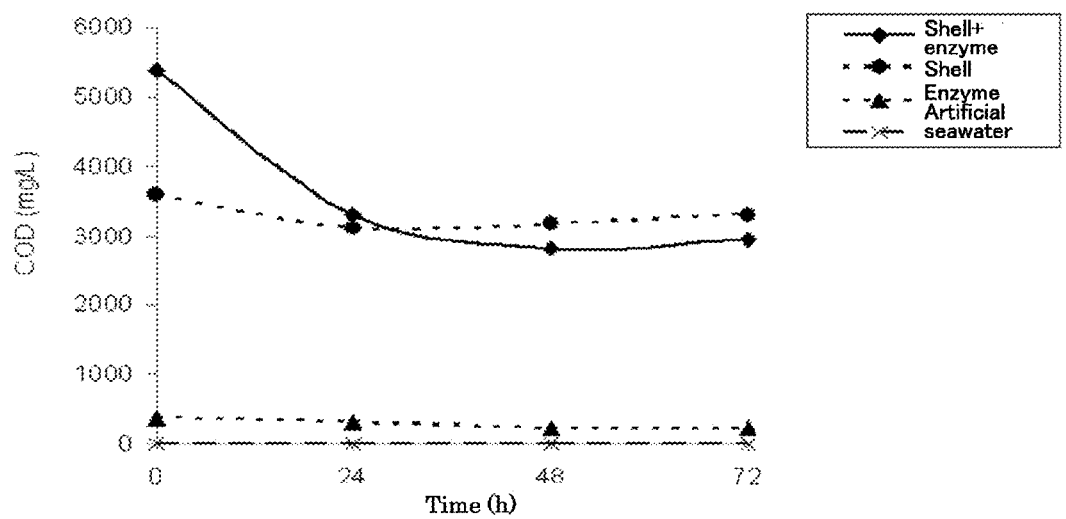
FIG. 24B is a graph of results of Test Example 20, showing results obtained in a case where salt-containing organic waste is treated with a thrombolytic enzyme before use in a treatment method for salt-containing organic waste liquid of the present invention. The ordinate denotes COD (mg/L). The abscissa denotes time (h).

Next, the same test as in the test groups I to IV was performed except that the treatment with Scuticociliatida was not performed in the test groups I to IV. The results are shown in FIG. 24B. The results of FIG. 24B indicate that in the test group I using the waste liquid of the shellfish meat decomposed by the enzyme, the COD value was reduced from 5,400 mg/L before the treatment with the Scuticociliatida to 3,300 mg/L at 24 hours after the start of the test. However, the COD value at 72 hours after the start of the test was 2,980 mg/L and did not change very much from the COD value 24 hours after the start of the test. The COD reduction rate at 72 hours after the start of the test was about 46%. In the test group II using the waste liquid of the shellfish meat not decomposed by the enzyme (broth at 50° C.), the COD value was reduced from 3,600 mg/L before the treatment with the Scuticociliatida to 3,300 mg/L at 72 hours after the start of the test, and the COD reduction rate was about 8%.

These results indicate that although a certain degree of the COD reduction was observed, the COD reduction rates without the treatment with the Scuticociliatida were lower by about 40% to about 50% at 72 hours after the start of the treatment than those shown in FIG. 24A including the treatment with Scuticociliatida.

Test Example 21

Polyaluminum chloride (PAC) was added to the liquid treated by the Scuticociliatida or the supernatant obtained through solid-liquid separation of the liquid treated by the Scuticociliatida so as to be 0.3 g/L or 0.9 g/L relative to the salt-containing organic waste liquid at the start of the treatment of the salt-containing organic waste liquid with Scuticociliatida, at 6.5 hours after the start thereof, or at 22.5 hours after the start thereof. After the treatment, the supernatants resulting from coagulation/precipitation were compared with each other in terms of the COD value, pH and amount of formed sludge.

Specifically, 5 mL of Scuticociliatida ($3.0 \times 10^4$ individuals/mL) was mixed with 95 mL of the salt-containing organic waste liquid. PAC was added to the mixture at the start of the treatment, at 6.5 hours after the start thereof, or at 22.5 hours after the start thereof. The mixture was aerobically treated with shaking at 37° C. and 180 rpm, and measured for the COD value. The amount of formed sludge was measured by placing the entire waste liquid to a measuring cylinder after completion of the treatment and measuring the amount of precipitated sludge.

Figure 25A:
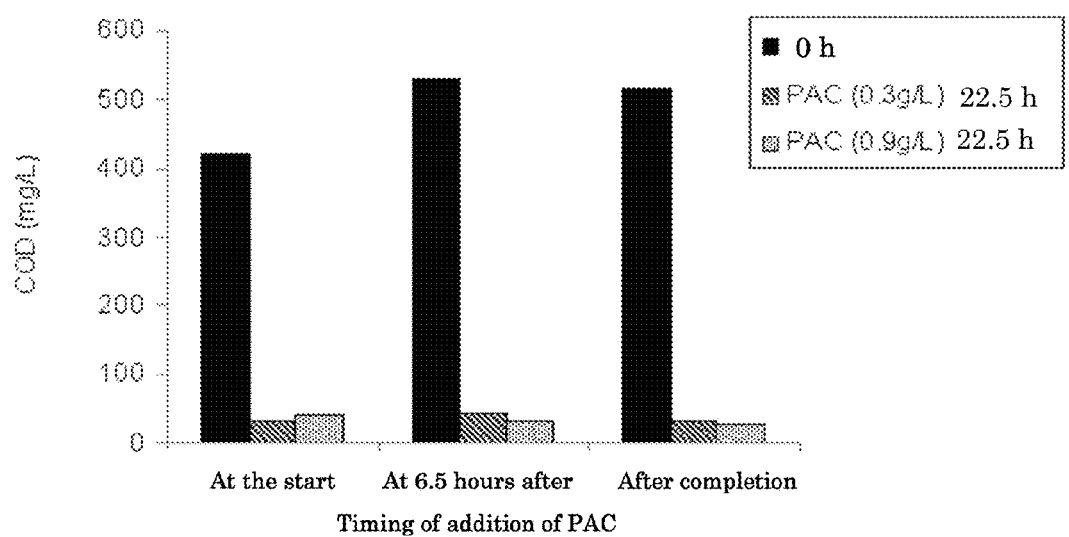
FIG. 25A is a graph of results of Test Example 21, showing results obtained in a case where a coagulant is used in a treatment method for salt-containing organic waste liquid of the present invention. The ordinate denotes COD (mg/L). The abscissa denotes timing of addition of polyaluminum chloride (PAC).

FIG. 25A shows comparison results of changes in COD value depending on the timing of addition of PAC in Test Example 21.

In the case where the PAC added was 0.3 g/L, the COD values were 50 mg/L or lower and almost the same in all of the test groups after 22.5 hours had passed. However, the transparency of the supernatant was higher in the test group to which the PAC had been added after completion of the treatment than in the test groups to which the PAC had been added at the start of the treatment and at 6.5 hours after that.

In the case where the PAC added was 0.9 g/L, the COD values were 40 mg/L or lower and almost the same in all of the test groups after 22.5 hours had passed. However, the COD value of the test group to which the PAC had been added after completion of the treatment was somewhat lower than those of the other test groups. The transparency of the supernatant was higher in the test group to which the PAC had been added after completion of the treatment than in the test groups to which the PAC had been added at the start of the treatment and at 6.5 hours after that.

Figure 25B:
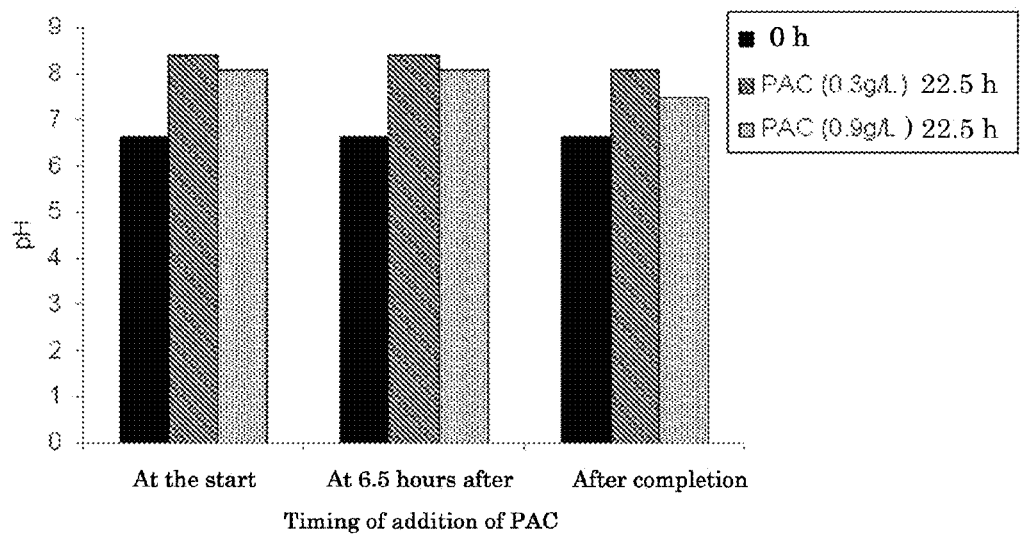
FIG. 25B is a graph of results of Test Example 21, showing results obtained in a case where a coagulant is used in a treatment method for salt-containing organic waste liquid of the present invention. The ordinate denotes pH. The abscissa denotes timing of addition of polyaluminum chloride (PAC).

FIG. 25B shows comparison results of changes in pH depending on the timing of addition of PAC in Test Example 21.

In the case where the PAC added was 0.3 g/L, the pHs were about 8 and almost the same in all of the test groups after 22.5 hours had passed.

In the case where the PAC added was 0.9 g/L, the pH of the test group to which the PAC had been added after completion of the treatment was 7.5 and somewhat lower than those of the other test groups. In the other test groups, the pHs were about 8 and almost the same.

Figure 25C:
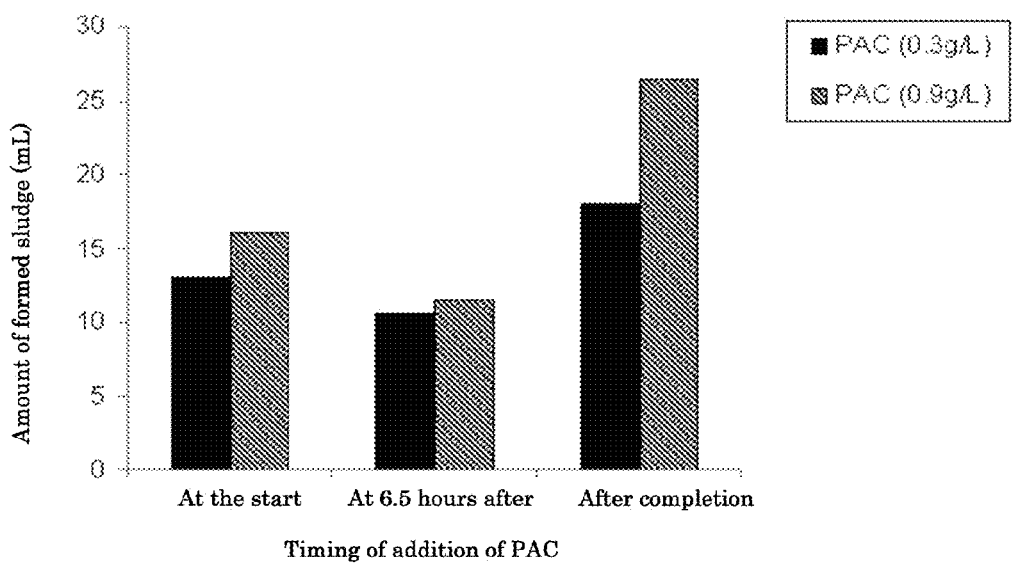
FIG. 25C is a graph of results of Test Example 21, showing results obtained in a case where a coagulant is used in a treatment method for salt-containing organic waste liquid of the present invention. The ordinate denotes amount of sludge formed (mL). The abscissa denotes timing of addition of polyaluminum chloride (PAC).

FIG. 25C shows comparison results of changes in amount of formed sludge depending on the timing of addition of PAC in Test Example 21.

In the case where the PAC added was 0.3 g/L, the amount of formed sludge was largest in the test group to which the PAC had been added after 22.5 hours had passed. The amount of formed sludge in the test group to which the PAC had been added at 6.5 hours after the start of the treatment was about 60% relative to that of the test group to which the PAC had been added after 22.5 hours had passed. The amount of formed sludge in the test group to which the PAC had been added at the start of the treatment was about 70% relative to that of the test group to which the PAC had been added after 22.5 hours had passed.

In the case where the PAC added was 0.9 g/L, the amount of formed sludge was largest in the test group to which the PAC had been added after 22.5 hours had passed. The amount of formed sludge in the test group to which the PAC had been added at 6.5 hours after the start of the treatment was about 40% relative to that of the test group to which the PAC had been added after 22.5 hours had passed. The amount of formed sludge in the test group to which the PAC had been added at the start of the treatment was about 60% relative to that of the test group to which the PAC had been added after 22.5 hours had passed.

These results indicate that the addition of the PAC after completion of the treatment with Scuticociliatida makes the supernatant resulting from solid-liquid separation more transparent than the other test groups, but forms sludge more than the other test group. In conclusion, it is thought to be more preferable that PAC is added in an amount less than 0.3 g/L after completion of the treatment of the salt-containing organic waste liquid to perform coagulation/precipitation.

Test Example 22

Test Example 22 was performed in the same manner as in Test Example 21 except that 3-fold diluted polysilica iron coagulant (solid content: 62.174 g/L, PSI-025: manufactured by SUIDO KIKA KAISHA, LTD.) was added to the salt-containing organic waste liquid so as to be 0.67 mL/L (0.04 g/L on the basis of solid content) or 1.7 mL/L (0.11 g/L on the basis of solid content) instead of adding polyaluminum chloride (PAC) to the salt-containing organic waste liquid so as to be 0.3 g/L or 0.9 g/L.

Figure 26A:
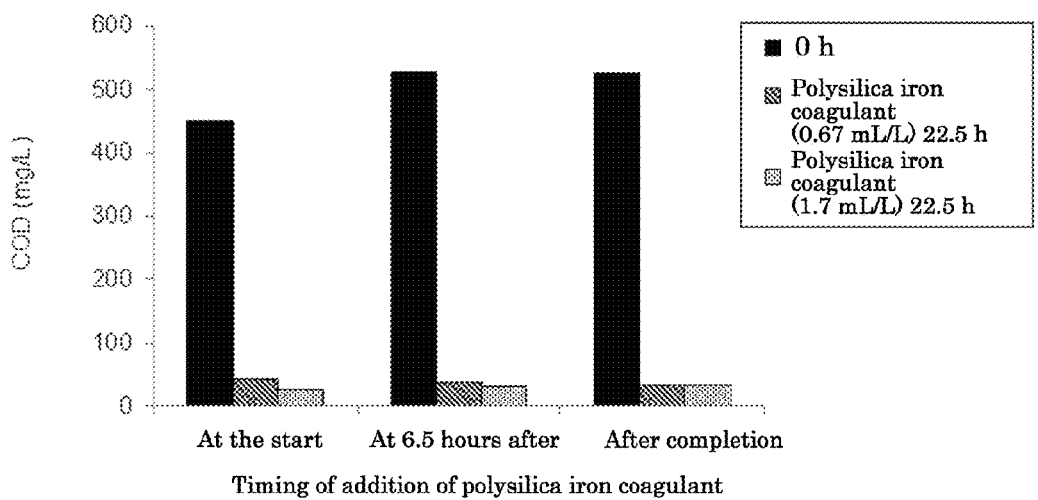
FIG. 26A is a graph of results of Test Example 22, showing results obtained in a case where a coagulant is used in a treatment method for salt-containing organic waste liquid of the present invention. The ordinate denotes COD (mg/L). The abscissa denotes timing of addition of 3-fold diluted polysilica iron coagulant.

FIG. 26A shows comparison results of changes in COD value depending on the timing of addition of 3-fold diluted polysilica iron coagulant in Test Example 22.

In the case where the 3-fold diluted polysilica iron coagulant added was 0.67 mL/L, the COD values were 50 mg/L or lower and almost the same in all of the test groups after 22.5 hours had passed. However, the COD value of the test group to which the PSI-025 had been added after completion of the treatment was somewhat lower than those of the other test groups. The transparency of the supernatant was higher in the test group to which the PSI-025 had been added after completion of the treatment than in the test groups to which the PSI-025 had been added at the start of the treatment and at 6.5 hours after that.

In the case where the 3-fold diluted polysilica iron coagulant added was 1.7 mL/L, the COD values were 40 mg/L or lower and almost the same in all of the test groups after 22.5 hours had passed. However, the COD value of the test group to which the PSI-025 had been added at the start of the treatment was somewhat lower than those of the other test groups. The transparency of the supernatant was higher in the test group to which the PSI-025 had been added after completion of the treatment than in the test groups to which the PSI-025 had been added at the start of the treatment and at 6.5 hours after that.

Figure 26B:
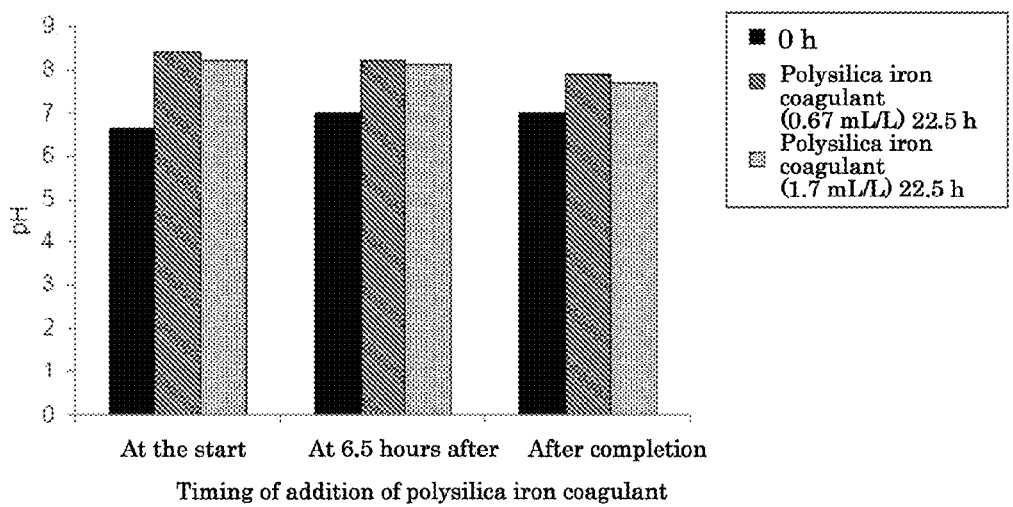
FIG. 26B is a graph of results of Test Example 22, showing results obtained in a case where a coagulant is used in a treatment method for salt-containing organic waste liquid of the present invention. The ordinate denotes pH. The abscissa denotes timing of addition of 3-fold diluted polysilica iron coagulant.

FIG. 26B shows comparison results of changes in pH depending on the timing of addition of 3-fold diluted polysilica iron coagulant in Test Example 22.

In the case where the 3-fold diluted polysilica iron coagulant added was 0.67 mL/L, the pH of the test group to which the PSI-025 had been added after completion of the treatment was 7.9 and somewhat lower than those of the other test groups. In the other test groups, the pHs were about 8 and almost the same.

In the case where the 3-fold diluted polysilica iron coagulant added was 1.7 mL/L, the pH of the test group to which the PSI-025 had been added after completion of the treatment was 7.7 and somewhat lower than those of the other test groups. In the other test groups, the pHs were about 8 and almost the same.

Figure 26C:
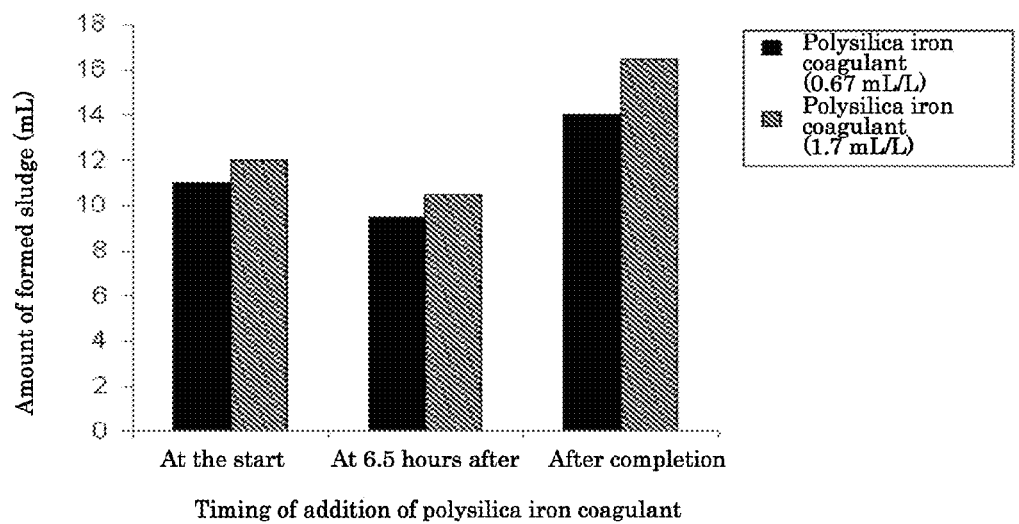
FIG. 26C is a graph of results of Test Example 22, showing results obtained in a case where a coagulant is used in a treatment method for salt-containing organic waste liquid of the present invention. The ordinate denotes amount of sludge formed (mL). The abscissa denotes timing of addition of 3-fold diluted polysilica iron coagulant.

FIG. 26C shows comparison results of changes in amount of formed sludge depending on the timing of addition of 3-fold diluted polysilica iron coagulant in Test Example 22.

In the case where the 3-fold diluted polysilica iron coagulant added was 0.67 mL/L, the amount of formed sludge was largest in the test group to which the PSI-025 had been added after 22.5 hours had passed. The amount of formed sludge in the test group to which the PSI-025 had been added at 6.5 hours after the start of the treatment was about 86% relative to that of the test group to which the PSI-025 had been added after 22.5 hours had passed. The amount of formed sludge in the test group to which the PSI-025 had been added at the start of the treatment was about 78% relative to that of the test group to which the PSI-025 had been added after 22.5 hours had passed.

In the case where the 3-fold diluted polysilica iron coagulant added was 1.7 mL/L, the amount of formed sludge was largest in the test group to which the PSI-025 had been added after 22.5 hours had passed. The amount of formed sludge in the test group to which the PSI-025 had been added at 6.5 hours after the start of the treatment was about 64% relative to that of the test group to which the PSI-025 had been added after 22.5 hours had passed. The amount of formed sludge in the test group to which the PSI-025 had been added at the start of the treatment was about 73% relative to that of the test group to which the PSI-025 had been added after 22.5 hours had passed.

These results indicate that the addition of the 3-fold diluted polysilica iron coagulant after completion of the treatment with Scuticociliatida makes the supernatant resulting from solid-liquid separation more transparent than the other test groups, but forms sludge more than the other test group. In conclusion, it is thought to be more preferable that PSI-025 is added in an amount less than 0.67 mL/L after completion of the treatment of the salt-containing organic waste liquid to perform coagulation/precipitation.

Test Example 23

Studies were made on whether the salt-containing organic waste liquid could be continuously treated with Scuticociliatida.

20 L of the waste liquid of enzymatically decomposed jellyfish and 1,000 mL of the Scuticociliatida ($3.0 \times 10^4$ individuals/mL) were mixed together. The mixture was treated for 24 hours at 30° C. under aeration at an air flow rate of 28 L/minute. The aeration was stopped at 24 hours after the start of the treatment, and the mixture was solid-liquid separated into supernatant and precipitates. Then, the waste liquid of enzymatically decomposed jellyfish was newly added to the mixture cotaining about 2 L to about 3 L of the precipitates containing precipitated Scuticociliatida. Under the same conditions as described above, the treatment of the waste liquid of enzymatically decomposed jellyfish was repeated 4 times.

Here, the first treatment was performed for acclimation (taming, pre-culturing) for activating the growth of Scuticociliatida to promote utilization and consumption of ingredients in the waste liquid of enzymatically decomposed jellyfish.

In each step, COD, BOD, SS, T-N and T-P were measured according to the Japanese Industrial Standards (JIS) K 0102.

Figure 27A:
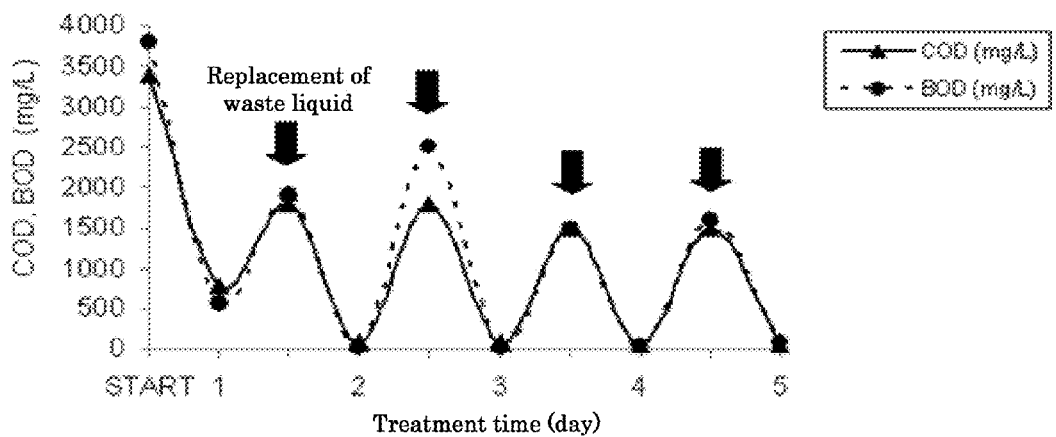
FIG. 27A is a graph of results of Test Example 23, showing results obtained in a case where treatment is repeated in a treatment method for salt-containing organic waste liquid of the present invention. The ordinate denotes COD and BOD (mg/L). The abscissa denotes period of treatment (days).
Figure 27B:
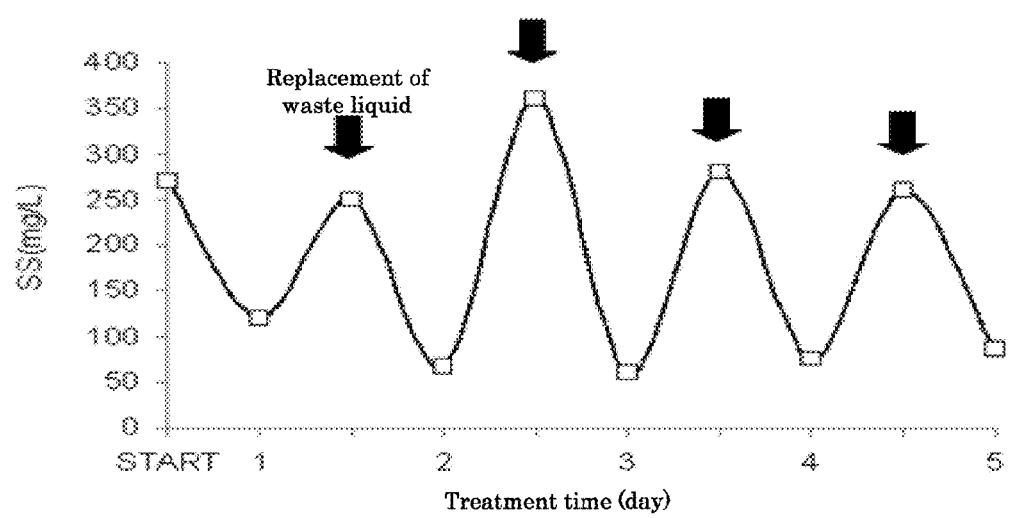
FIG. 27B is a graph of results of Test Example 23, showing results obtained in a case where treatment is repeated in a treatment method for salt-containing organic waste liquid of the present invention. The ordinate denotes SS (mg/L). The abscissa denotes period of treatment (days).
Figure 27C:
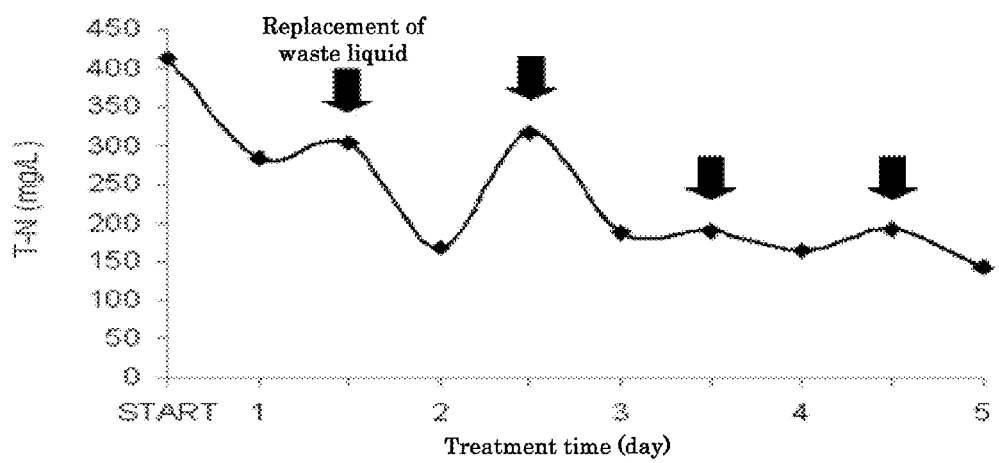
FIG. 27C is a graph of results of Test Example 23, showing results obtained in a case where treatment is repeated in a treatment method for salt-containing organic waste liquid of the present invention. The ordinate denotes T-N (mg/L). The abscissa denotes period of treatment (days).
Figure 27D:
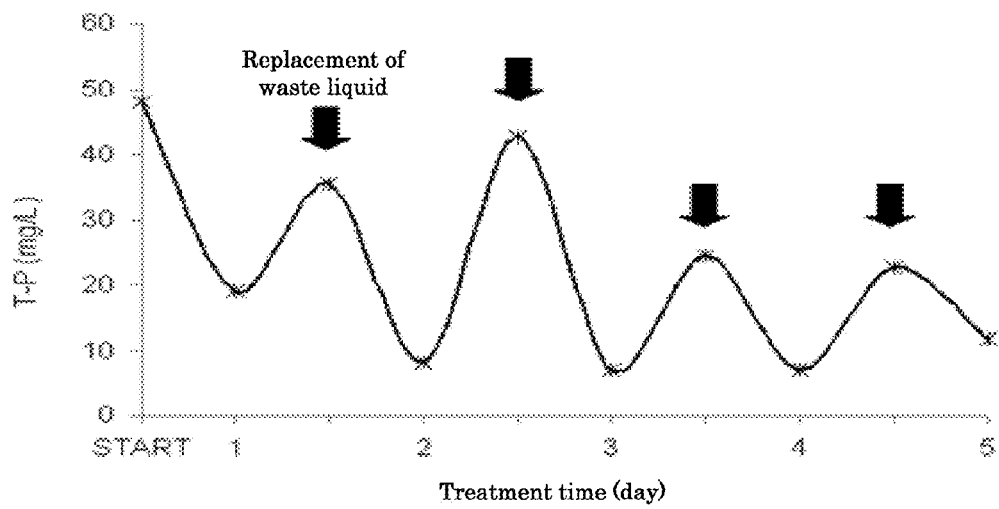
FIG. 27D is a graph of results of Test Example 23, showing results obtained in a case where treatment is repeated in a treatment method for salt-containing organic waste liquid of the present invention. The ordinate denotes T-P (mg/L). The abscissa denotes period of treatment (days).

The measurement results of the COD values and the BOD values are shown in FIG. 27A. The measurement results of SS are shown in FIG. 27B. The measurement results of T-N are shown in FIG. 27C. The measurement results of T-P are shown in FIG. 27D.

The results of FIG. 27A indicate that at 24 hours after the acclimation, the COD value was reduced from 3,400 mg/L to 780 mg/L and the BOD value was reduced from 3,800 mg/L to 570 mg/L. In the subsequent repeated treatments, both of the COD value and the BOD value were 90 or less in the 4 repeated treatments, confirming that Scuticociliatida can continuously treat waste liquid.

The results of FIG. 27B indicate that the SS value was 90 mg/L in the repeated treatments, suggesting stable treatment of waste liquid is possible.

The results of FIG. 27C indicate probability that stable treatment can be achieved in terms of T-N.

The results of FIG. 27D indicate that the T-P was 30 mg/L or less after the treatment.

Test Example 24

The waste liquid of enzymatically decomposed jellyfish was subjected to treatment with Scuticociliatida, coagulation/precipitation treatment, and treatment with activated carbon, in the order mentioned. In each step, BOD, COD, SS, T-N and T-P of the waste liquid of enzymatically decomposed jellyfish were measured according to JIS K 0102.
—Treatment with Scuticociliatida—
The Scuticociliatida was mixed with 20 L of the waste liquid of enzymatically decomposed jellyfish so as to be 5% by volume ($3.0 \times 10^4$ individuals/mL). The mixture was treated for 24 hours at 30° C. under aeration at an air flow rate of 28 L/minute. The aeration was stopped and the mixture was left to stand still for 60 minutes, followed by solid-liquid separation. The resultant supernatant was used as Scuticociliatida treatment liquid.
—Coagulation/Precipitation Treatment—
The 3-fold diluted polysilica iron coagulant (PSI-025) shown in Test Example 22 was added to the Scuticociliatida treatment liquid so as to be 400 mL/L for coagulation/precipitation treatment. The resultant supernatant was used as a coagulation/precipitation treatment liquid.
—Activated Carbon Treatment—
The coagulation/precipitation treatment liquid was caused to pass through activated carbon 300 mL in volume (KURARAY COAL: manufactured by KURARAY CO., LTD.). The resultant liquid was used as an activated carbon treatment liquid.

Figure 28:
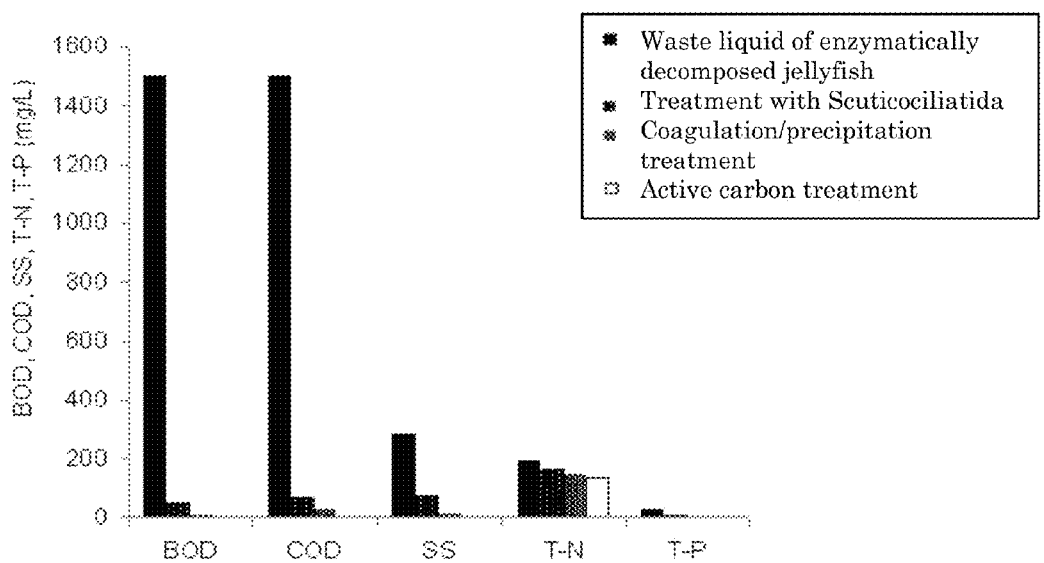
FIG. 28 is a graph of results of Test Example 24, showing results obtained in a case where salt-containing organic waste liquid is treated sequentially with Scuticociliatida, a coagulant, and activated carbon in a treatment method for salt-containing organic waste liquid of the present invention. The ordinate denotes mg/L of each parameter. The abscissa denotes each treatment step.

The results of FIG. 28 indicate that after the activated carbon treatment, the BOD value was 0.8 mg/L (reduction rate: about 99.9%) and the COD value was 2.4 mg/L (reduction rate relative to the waste liquid before the treatment: about 99.8%). The SS value was as low as 1 mg/L (reduction rate: about 99.6%) and the T-P value was as low as about 0.3 mg/L (reduction rate: about 98.8%). However, the T-N value was reduced from 189 mg/L of the waste liquid of enzymatically decomposed jellyfish to 165 mg/L after the biological treatment (reduction rate: about 12.7%), to 146 mg/L after the coagulation/precipitation treatment (reduction rate: about 22.8%) and to 135 mg/L after the activated carbon treatment (reduction rate: about 28.6%). Although the T-N value was reduced, the T-N value did not show a high reduction rate unlike the other measurements of waste liquid.

Test Example 25

Studies were made on COD reduction and change in salt concentration of the salt-containing organic waste liquid when Scuticociliatida was used to treat broths of *Mytilus galloprovincialis* having the *Mytilus galloprovincialis* concentrations of 25% by mass, 50% by mass, 75% by mass and 100% by mass, which were prepared by diluting the original broth of *Mytilus galloprovincialis* with artificial seawater.

The broth of *Mytilus galloprovincialis* was prepared as follows. Specifically, *Mytilus galloprovincialis* was immersed in distilled water so as to be 80% by mass, and treated with high-pressure steam at 121° C. for 20 minutes.

As a result of measurement of the COD value of the diluted broths having the above concentrations, the COD value of the broth having the *Mytilus galloprovincialis* concentration of 25% by mass was 2,080 mg/L, the COD value of the broth having the *Mytilus galloprovincialis* concentration of 50% by mass was 3,600 mg/L, the COD value of the broth having the *Mytilus galloprovincialis* concentration of 75% by mass was 4,800 mg/L, and the COD value of the broth having the *Mytilus galloprovincialis* concentration of 100% by mass was 6,400 mg/L.

Also, as a result of measurement of the salt concentration of the diluted broths having the above concentrations, the salt concentration of the broth having the *Mytilus galloprovincialis* concentration of 25% by mass was 5, the salt concentration of the broth having the *Mytilus galloprovincialis* concentration of 50% by mass was 10, the salt concentration of the broth having the *Mytilus galloprovincialis* concentration of 75% by mass was 15, and the salt concentration of the broth having the *Mytilus galloprovincialis* concentration of 100% by mass was 20.

Figure 29A:
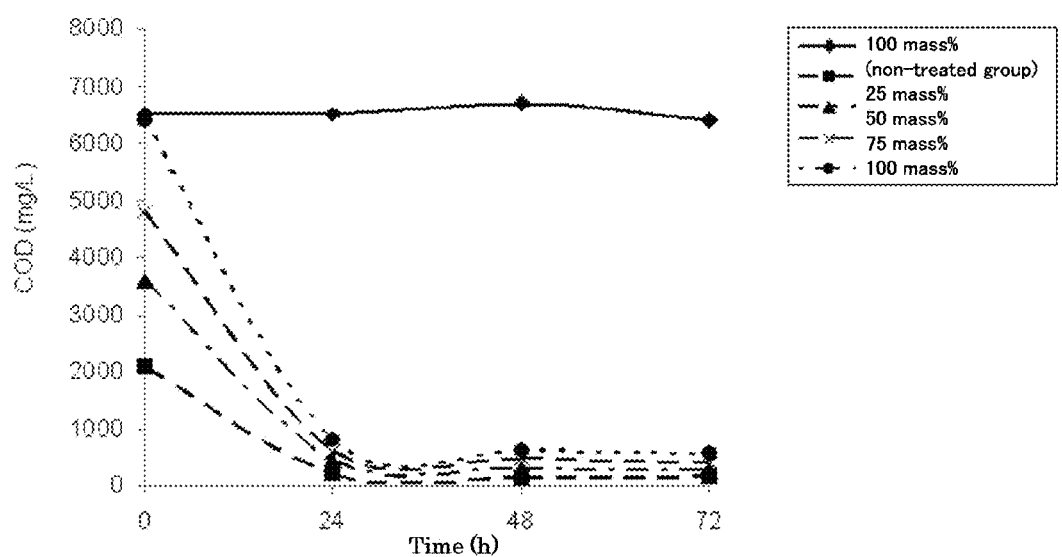
FIG. 29A is a graph of results of Test Example 25, showing results obtained by treating a broth of *Mytilus galloprovincialis* in a treatment method for salt-containing organic waste liquid of the present invention. The ordinate denotes COD (mg/L). The abscissa denotes time (h).

The Scuticociliatida stored at 4° C. was mixed with each of the broths of *Mytilus galloprovincialis* so as to be 5% by volume ($3.0 \times 10^4$ individuals/mL) and the mixture was aerobically treated with shaking at 22° C. and 180 rpm. The measurement results of the COD value are shown in FIG. 29A. The changes in salt concentration are shown in FIG. 29B.

The results of FIG. 29A indicate that the COD reduction rates were about 91% to about 93% finally in all of the diluted broths at 72 hours of the treatment and were almost the same. In contrast, in a control group, almost no change was observed in the COD value. It was found that the broths having the salt concentrations before the treatment of 5 to 20 could be treated with Scuticociliatida without any problem.

Figure 29B:
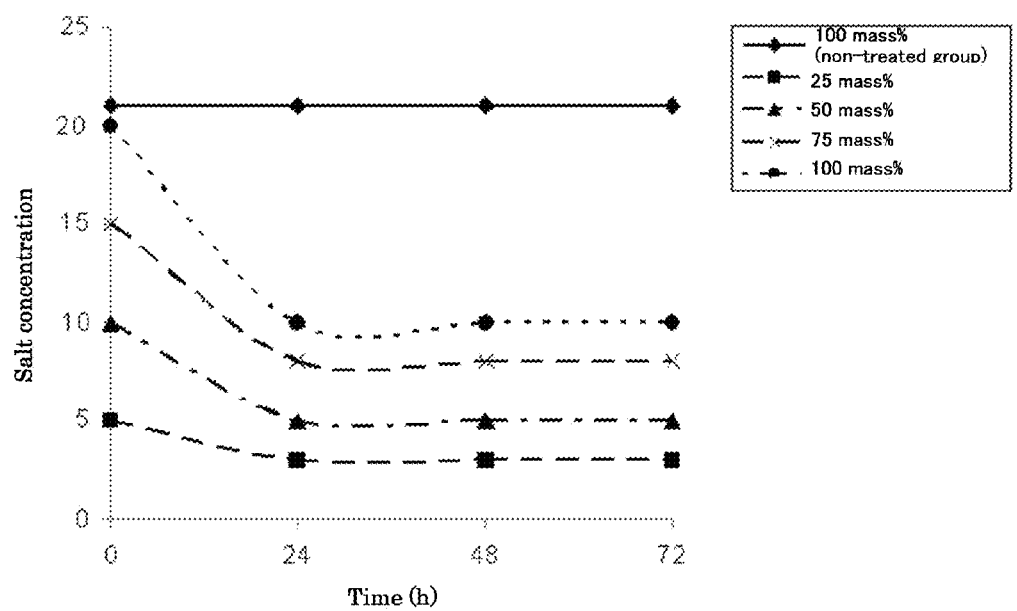
FIG. 29B is a graph of results of Test Example 25, showing results obtained by treating a broth of *Mytilus galloprovincialis* in a treatment method for salt-containing organic waste liquid of the present invention. The ordinate denotes salt concentration. The abscissa denotes time (h).

The results of FIG. 29B indicate that salt in the salt-containing organic waste liquid was taken by the Scuticociliatida and the salt concentration in the waste liquid was reduced in all of the test groups. In particular, the salt concentration of the broth having the *Mytilus galloprovin-* cialis concentration of 25% by mass was reduced by the treatment with the Scuticociliatida to be lower than 4-diluted concentration (0.5% by mass) of the broth having the *Mytilus galloprovincialis* concentration of 100% by mass, indicating that the treatment with Scuticociliatida can reduce the salt concentration of waste liquid.

Test Example 26

The COD values were measured before and after repeated treatments of the salt-containing organic waste liquid with Scuticociliatida entrapped and immobilized on a carrier.

This entrapment immobilization carrier was a carrier whose inner portion was liquid but whose outer portion was solid (gel) in order for the Scuticociliatida to be able to move in some degrees in the carrier to keep an ability to treat waste liquid. Specifically, the entrapment immobilization carrier was formed by entrapping and immobilizing the Scuticociliatida liquid with a composite material of sodium alginate and sodium polyacrylate. The column used for the preparation of the entrapment immobilization carrier had a dual-layered structure, and 50 mL of the Scuticociliatida solution acclimated in the salt-containing waste liquid (hereinafter, also referred to as an "inner-shell solution") was injected to the inner column from the top of the column using a syringe. Meanwhile, 200 mL of a solution containing 2% by mass sodium alginate solution and 0.3% by mass sodium polyacrylate solution (hereinafter, referred to as an "outer-shell solution") was injected to the outer column in the following manner. Specifically, a glass tube was branched from an intermediate portion of the outer column and then was connected with a filling column for filling the outer column. A pinchcock was provided at the intermediate portion and was used to adjust flow of the entrapment immobilization carrier liquid.

Of the inner-shell solution and the outer-shell solution, the outer-shell solution was first charged to the outer column by opening the pinchcock at an intermediate portion between the outer column and the filling column. At the same time, the inner-shell solution was charged to the inner column and mixed with the outer-shell solution at the lower ends of the inner and outer columns, thereby forming a liquid droplet whose inner portion was the inner-shell solution and whose outer portions was the outer-shell solution. This liquid droplet was dropped to 1 L of 3% by mass calcium chloride liquid (under slow stirring) at the bottom of the column to form entrapment immobilization gel. The entrapment immobilization gel was stirred for one day as it was in the calcium chloride liquid. After through immobilization, the entrapment immobilization gel was thoroughly washed with running water, and then immersed in 0.9% by mass sodium chloride solution at 6° C. and stored for about 2 months. The resultant product was used as the Scuticociliatida entrapment immobilization carrier.

The treatment of the salt-containing organic waste liquid with Scuticociliatida entrapment immobilization carrier was performed as follows. Specifically, 5 mL of the Scuticociliatida entrapment immobilization carrier and 95 mL of the waste liquid of enzymatically decomposed jellyfish were added to three 500-mL flasks, and the mixtures were treated for 18 hours with shaking at 27° C. and 180 rpm under aerobic conditions.

The COD values before and after the treatment were obtained by measuring 1 mL of the treatment liquid sampled from the waste liquid of enzymatically decomposed jellyfish. After that, all of the waste liquid of enzymatically decomposed jellyfish was transferred to a 100-mL measuring cylinder and left to stand still, to thereby precipitate the Scuticociliatida entrapment immobilization carrier. The resultant supernatant was discarded, and the waste liquid of enzymatically decomposed jellyfish was newly added to the precipitates, followed by treating repeatedly. The treatment was repeated 4 times to study whether the repeated treatment was possible.

Figure 30:
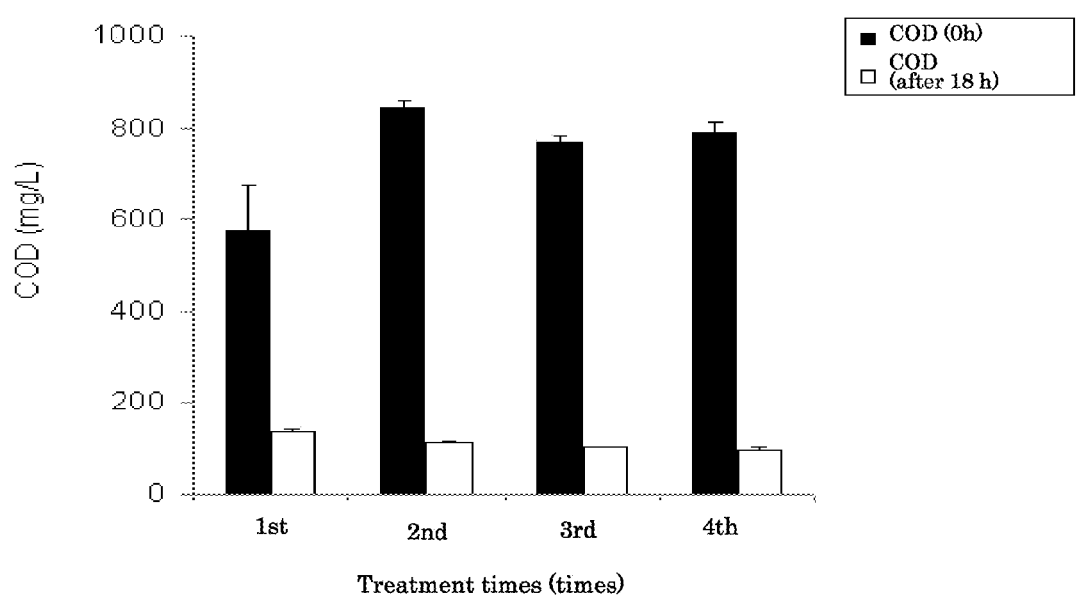
FIG. 30 is a graph of results of Test Example 26, showing results obtained by treating a broth of *Mytilus galloprovincialis* in a treatment method for salt-containing organic waste liquid of the present invention. The ordinate denotes COD (mg/L). The abscissa denotes times of treatment (times).

FIG. 30 shows the COD values of the waste liquid of enzymatically decomposed jellyfish before and after the treatment with the Scuticociliatida entrapment immobilization carrier. The COD of the waste liquid of enzymatically decomposed jellyfish was 577 mg/L before the treatment and reduced to 139 mg/L after the treatment, where the COD reduction rate was 76%. As a result of the similar treatment repeated at the 2nd time, the 3rd time and the 4th time, the COD reduction rate was 87% at the 2nd time, 87% at the 3rd time and 88% at the 4th time, indicating a stable treatment performance. Also, the waste liquid of enzymatically decomposed jellyfish after the treatment was favorably separated into solid and liquid, and numerous Scuticociliatida were observed under a microscope. The Scuticociliatida survived in the interior of the entrapment immobilization carrier, which indicates availability of the Scuticociliatida entrapment immobilization carrier as a starter easier to handle than a liquid starter in treating the waste liquid of enzymatically decomposed jellyfish.

Test Example 27

Studies were made on storageability of Scuticociliatida stored for a long time at different temperatures. The storageability was confirmed based on the growing state of the Scuticociliatida after long-term storage and on COD reducing performance.

Specifically, 5 mL of Scuticociliatida (samples A to E) stored at the storage temperature, for the storage period and under the storage state shown in Table 3 was mixed with 95 mL of the waste liquid of enzymatically decomposed jellyfish. The mixtures were treated for 48 hours with shaking at 30° C. and 180 rpm under aerobic conditions. The state of the Scuticociliatida was observed over time and the COD value was measured. The results are shown in Table 4.

TABLE 3

| Sample | Storage temp. | Storage period | Storage state |
|---|---|---|---|
| A | −20° C. | 5 months | Scuticociliatida |
| B | 6° C. | 6 months | Scuticociliatida + waste liquid of enzymatically decomposed jellyfish |
| C | 8° C. | 4 months | Scuticociliatida + waste liquid of enzymatically decomposed jellyfish |
| D | 12° C. | 4 months | Scuticociliatida + waste liquid of enzymatically decomposed jellyfish |
| E | 16° C. | 4 months | Scuticociliatida + waste liquid of enzymatically decomposed jellyfish |

TABLE 4

| Sample | Storage temp. | 0 hours COD | 24 hours COD | 24 hours Motile | 24 hours Cyst | 48 hours COD | 48 hours Motile | 48 hours Cyst |
|---|---|---|---|---|---|---|---|---|
| A | −20° C. | 924 | 84 | +++ | − | 54 | ++ | + |
| B | 6° C. | 888 | 162 | + | (+++) | 62 | +++ | (+++) |

TABLE 4-continued

| Sample | Storage temp. | 0 hours COD | 24 hours COD | Motile | Cyst | 48 hours COD | Motile | Cyst |
|---|---|---|---|---|---|---|---|---|
| C | 8° C. | 876 | 278 | + | (+++) | 120 | +++ | (+++) |
| D | 12° C. | 864 | 134 | +++ | (+++) | 92 | +++ | (+++) |
| E | 16° C. | 948 | 398 | + | (+++) | 135 | ++ | (++) |

The results of Table 4 indicate that most Scuticociliatida turned into a cyst form at 24 hours after the start of the treatment and did not completely turn into a motile form. However, at 48 hours after that, most Scuticociliatida turned into a motile form. As for the COD value, the COD reduction rate of 91% was observed at 24 hours after the start of the treatment in the test group of sample A stored at −20° C., but the COD reduction rate of the test group of sample E stored at 16° C. was as low as 58%. At 2 days after the start of the test, the COD reduction rates of the test groups of the samples stored at −20° C. and 6° C. were 93% or higher, but the COD reduction rates of the other test groups were lower than 90%.

The waste liquid of enzymatically decomposed jellyfish treated for 48 hours was separated into solid and liquid. 5 mL of the separated Scuticociliatida sludge was mixed with 95 mL of the waste liquid of enzymatically decomposed jellyfish, and the mixture was treated for 22 hours with shaking at 30° C. and 180 rpm under aerobic conditions. The state of the Scuticociliatida was observed and the COD value was measured. The results are shown in Table 5.

TABLE 5

| Sample | Storage temp. | 0 hours COD | 22 hours COD | Motile form | Cyst form |
|---|---|---|---|---|---|
| A | −20° C. | 804 | 47 | +++ | − |
| B | 6° C. | 828 | 41 | +++ | ++ |
| C | 8° C. | 924 | 71 | +++ | +++ |
| D | 12° C. | 852 | 57 | +++ | ++ |
| E | 16° C. | 804 | 51 | +++ | ++ |

At 22 hours after the start of the test, the COD reduction rate of 92% or higher was observed in all the test groups with respective storage temperatures, and active motility of the Scuticociliatida was observed.

These results indicate that the Scuticociliatida could be stored for at least 4 months at 16° C. or lower and continuously treat the salt-containing organic waste liquid.

The appearance of jellyfish is seasonal. Thus, the treatment for its waste liquid is not continuous but sporadic, and a period for the treatment is limited.

According to the present invention, Scuticociliatida can be stored at low temperatures without the need of a special method or apparatus for a period for which the treatment of the salt-containing organic waste liquid such as jellyfish is not required, suggesting that the present invention is a simple technique useful for the treatment of the salt-containing organic waste liquid.

INDUSTRIAL APPLICABILITY

The treatment agent for salt-containing organic waste liquid, the salt concentration-reducing agent, the treatment method for salt-containing organic waste liquid, and the entrapment immobilization carrier of the present invention can simply, efficiently and inexpensively treat salt-containing organic waste liquid for a short time at low energy without the need of a special apparatus, and is highly safe and can continuously treat the salt-containing organic waste liquid for a long time. Therefore, they can suitably be used for purification of waste liquid such as sewage, human waste, waste liquid from food factories, waste liquid from waterfront plant facilities such as power plants and ironworks, other industrial waste liquid, and salt-containing waste liquid such as marine waste. In particular, the treatment method for salt-containing organic waste liquid can be used for purification of a lysate of jellyfish.

Aspects of the present invention are as follows.

<1> A treatment agent for salt-containing organic waste liquid, the treatment agent including:
Scuticociliatida,
wherein the treatment agent treats salt-containing organic waste liquid.

<2> The treatment agent for salt-containing organic waste liquid according to <1>, further including: a coagulant.

<3> The treatment agent for salt-containing organic waste liquid according to <2>, wherein the coagulant includes polyaluminum chloride, polysilica iron or any combination thereof.

<4> A salt concentration-reducing agent, including:
Scuticociliatida,
wherein the salt concentration-reducing agent reduces a salt concentration of salt-containing organic waste liquid.

<5> A treatment method for salt-containing organic waste liquid, the treatment method including:
bringing Scuticociliatida and salt-containing organic waste liquid into contact with each other to treat the salt-containing organic waste liquid.

<6> The treatment method for salt-containing organic waste liquid according to <5>, wherein a COD value of the salt-containing organic waste liquid after the Scuticociliatida and the salt-containing organic waste liquid are brought into contact with each other in the bringing is 30% or less relative to a COD value of the salt-containing organic waste liquid before the Scuticociliatida and the salt-containing organic waste liquid are brought into contact with each other.

<7> The treatment method for salt-containing organic waste liquid according to <5> or <6>, wherein a COD value of the salt-containing organic waste liquid after the Scuticociliatida and the salt-containing organic waste liquid are brought into contact with each other in the bringing is 30% or less relative to a COD value of the salt-containing organic waste liquid before the Scuticociliatida and the salt-containing organic waste liquid are brought into contact with each other within 7 hours after the Scuticociliatida and the salt-containing organic waste liquid are brought into contact with each other.

<8> The treatment method for salt-containing organic waste liquid according to any one of <5> to <7>, wherein the bringing is performed by bringing the salt-containing organic waste liquid into contact with the Scuticociliatida in motile form of $1.2 \times 10^4$ individuals/mL to $3.2 \times 10^6$ individuals/mL relative to the salt-containing organic waste liquid.

<9> The treatment method for salt-containing organic waste liquid according to any one of <5> to <8>, wherein the salt-containing organic waste liquid has a temperature of lower than 45° C.

<10> The treatment method for salt-containing organic waste liquid according to any one of <5> to <9>, wherein the salt-containing organic waste liquid has a pH of 4.5 to 10.5.

<11> The treatment method for salt-containing organic waste liquid according to any one of <5> to <10>, wherein the salt-containing organic waste liquid has a salt concentration as measured with an electroconductivity meter of 5 or more but less than 80.

<12> The treatment method for salt-containing organic waste liquid according to any one of <5> to <11>, further including: separating a mixture obtained after the bringing into a solid phase containing the Scuticociliatida and a liquid phase containing a treated liquid of the salt-containing organic waste liquid.

<13> The treatment method for salt-containing organic waste liquid according to <12>, further including: adding a coagulant to the liquid phase separated in the separating to coagulate and precipitate sludge.

<14> The treatment method for salt-containing organic waste liquid according to <12> or <13>, further including: filtrating the liquid phase separated in the separating.

<15> The treatment method for salt-containing organic waste liquid according to any one of <12> to <14>, wherein the salt-containing organic waste liquid is further added to the solid phase separated in the separating to repeatedly perform the bringing.

<16> The treatment method for salt-containing organic waste liquid according to any one of <5> to <15>, wherein the salt-containing organic waste liquid comprises jellyfish, fishery products, crustaceans, food waste liquid or any combination thereof.

<17> The treatment method for salt-containing organic waste liquid according to any one of <5> to <16>, wherein the salt-containing organic waste liquid contains liquid of decomposed jellyfish.

<18> The treatment method for salt-containing organic waste liquid according to any one of <5> to <17>, wherein the bringing is performed by an activated sludge method using activated sludge where the Scuticociliatida is a dominant species.

<19> The treatment method for salt-containing organic waste liquid according to <18>, wherein the activated sludge where the Scuticociliatida is a dominant species contains the Scuticociliatida in motile form at $1.2 \times 10^4$ individuals/mL to $3.2 \times 10^6$ individuals/mL.

<20> An entrapment immobilization carrier, including:
Scuticociliatida; and
a carrier,
wherein at least the Scuticociliatida is entrapped and immobilized on the carrier.

The invention claimed is:

1. A treatment agent for salt-containing organic waste liquid, the treatment agent comprising:
Scuticociliatida and a coagulant,
wherein the treatment agent treats salt-containing organic waste liquid.

2. The treatment agent for salt-containing organic waste liquid according to claim 1, wherein the coagulant comprises polyaluminum chloride, polysilica iron or any combination thereof.

3. A method for reducing salt concentration, in salt-containing organic waste liquid, comprising:
bringing Scuticociliatida and salt-containing organic waste liquid into contact with each other to reduce a salt concentration in the salt-containing organic waste liquid,
wherein the salt containing organic waste liquid comprises jellyfish, fishery products, crustaceans, food waste liquid or any combination thereof.

4. A treatment method for salt-containing organic waste liquid, the treatment method comprising:
bringing Scuticociliatida and salt-containing organic waste liquid into contact with each other to treat the salt-containing organic waste liquid,
wherein the salt-containing organic waste liquid comprises jellyfish, fishery products, crustaceans, food waste liquid or any combination thereof.

5. The treatment method for salt-containing organic waste liquid according to claim 4, wherein a COD value of the salt-containing organic waste liquid after the Scuticociliatida and the salt-containing organic waste liquid are brought into contact with each other in the bringing is 30% or less relative to a COD value of the salt-containing organic waste liquid before the Scuticociliatida and the salt-containing organic waste liquid are brought into contact with each other.

6. The treatment method for salt-containing organic waste liquid according to claim 5, wherein a COD value of the salt-containing organic waste liquid after the Scuticociliatida and the salt-containing organic waste liquid are brought into contact with each other in the bringing is 30% or less relative to a COD value of the salt-containing organic waste liquid before the Scuticociliatida and the salt-containing organic waste liquid are brought into contact with each other within 7 hours after the Scuticociliatida and the salt-containing organic waste liquid are brought into contact with each other.

7. The treatment method for salt-containing organic waste liquid according to claim 4, wherein the bringing is performed by bringing the salt-containing organic waste liquid into contact with the Scuticociliatida in motile form of $1.2 \times 10^4$ individuals/mL to $3.2 \times 10^6$ individuals/mL relative to the salt-containing organic waste liquid.

8. The treatment method for salt-containing organic waste liquid according to claim 4, wherein the salt-containing organic waste liquid has a temperature of lower than 45° C.

9. The treatment method for salt-containing organic waste liquid according to claim 4, wherein the salt-containing organic waste liquid has a pH of 4.5 to 10.5.

10. The treatment method for salt-containing organic waste liquid according to claim 4, wherein the salt-containing organic waste liquid has a salt concentration as measured with an electroconductivity meter of 5 or more but less than 80.

11. The treatment method for salt-containing organic waste liquid according to claim 4, further comprising: separating a mixture obtained after the bringing into a solid phase containing the Scuticociliatida and a liquid phase containing a treated liquid of the salt-containing organic waste liquid.

12. The treatment method for salt-containing organic waste liquid according to claim 11, further comprising: adding a coagulant to the liquid phase separated in the separating to coagulate and precipitate sludge.

13. The treatment method for salt-containing organic waste liquid according to claim 11, further comprising: filtrating the liquid phase separated in the separating.

14. The treatment method for salt-containing organic waste liquid according to claim 11, wherein the salt-containing organic waste liquid is further added to the solid phase separated in the separating to repeatedly perform the bringing.

* * * * *